United States Patent
Yu et al.

(10) Patent No.: US 12,114,300 B2
(45) Date of Patent: Oct. 8, 2024

(54) RESOURCE SHARING METHOD AND APPARATUS

(71) Applicant: Huawei Technologies Co., Ltd., Guangdong (CN)

(72) Inventors: Haifeng Yu, Beijing (CN); Bo Lin, Shenzhen (CN); Kun Yang, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 358 days.

(21) Appl. No.: 17/680,696

(22) Filed: Feb. 25, 2022

(65) Prior Publication Data

US 2022/0183009 A1 Jun. 9, 2022

Related U.S. Application Data

(63) Continuation of application No. PCT/CN2019/103385, filed on Aug. 29, 2019.

(51) Int. Cl.
*H04W 72/0453* (2023.01)
*H04W 72/0446* (2023.01)

(52) U.S. Cl.
CPC ... *H04W 72/0453* (2013.01); *H04W 72/0446* (2013.01)

(58) Field of Classification Search
CPC ............ H04W 72/0453; H04W 72/04; H04W 72/0446; H04W 92/20; H04W 16/10
See application file for complete search history.

(56) References Cited

U.S. PATENT DOCUMENTS

| 2019/0182716 A1 | 6/2019 | Futaki et al. |
| 2019/0261425 A1 | 8/2019 | Kyungmin et al. |
| 2020/0022143 A1* | 1/2020 | Abdoli ............... H04L 1/1887 |

(Continued)

FOREIGN PATENT DOCUMENTS

| CN | 109391426 A | 2/2019 |
| CN | 109561471 A | 4/2019 |

OTHER PUBLICATIONS

ZTE, Sanechips, About dynamic resource sharing. 3GPP TSG RAN1 Meeting 91, Reno, USA, Nov. 27-Dec. 1, 2017, R1-1719495, 4 pages.

(Continued)

*Primary Examiner* — Mohamed A Kamara
(74) *Attorney, Agent, or Firm* — WOMBLE BOND DICKINSON (US) LLP

(57) ABSTRACT

A resource sharing method and apparatus are disclosed. The method includes: A first apparatus notifies a second apparatus of a frequency domain resource of a first initial bandwidth part (BWP) in a candidate shared resource, where the frequency domain resource of the first initial BWP is not shared between the first apparatus and the second apparatus; the second apparatus notifies the first apparatus of a frequency domain resource of a second initial BWP in the candidate shared resource, where the frequency domain resource of the second initial BWP is not shared between the second apparatus and the first apparatus; and the first apparatus notifies the second apparatus of a resource that is in the candidate shared resource and that is expected by the first apparatus to be used for data transmission.

20 Claims, 25 Drawing Sheets

(56) References Cited

U.S. PATENT DOCUMENTS

2021/0337517 A1* 10/2021 Li .................. H04W 72/02

OTHER PUBLICATIONS

3GPP TS 38.214 V15.6.0 (Jun. 2019), 3rd Generation Partnership Project; Technical Specification Group Radio Access Network; NR; Physical layer procedures for data(Release 15), 105 pages.
3GPP TS 38.213 V15.6.0 (Jun. 2019), 3rd Generation Partnership Project; Technical Specification Group Radio Access Network; NR; Physical layer procedures for control(Release 15), 107 pages.
3GPP TS 38.211 V15.6.0 (Jun. 2019), 3rd Generation Partnership Project; Technical Specification Group Radio Access Network; NR; Physical channels and modulation(Release 15), 97 pages.
Sharp, Remaining issues on BWP. 3GPP TSG RAN WG1 Meeting #94bis, Chengdu, China, Oct. 8-12, 2018, R1-1811144, 6 pages.

* cited by examiner

Coverage area of an LTE cell and a coverage area of an NR cell completely overlap Coverage area of an LTE cell and a coverage
area of an NR cell partially overlap Bandwidth is 20M, and a quantity of first RBs $N_{BWP1}^{size} = 100$ Frequency domain range of a first initial BWP Bandwidth is 20M, and a quantity of first RBs $N_{BWP1}^{size} = 100$ Frequency domain range of a first initial BWP

RESOURCE SHARING METHOD AND APPARATUS

CROSS-REFERENCE TO RELATED APPLICATIONS

This application is a continuation of International Application No. PCT/CN2019/103385, filed on Aug. 29, 2019, the disclosure of which is hereby incorporated by reference in its entirety.

TECHNICAL FIELD

This application relates to the wireless communications field, and in particular, to a resource sharing method and apparatus.

BACKGROUND

In the future, when an operator builds a 5th generation (5G) mobile communications system, an enterprise and an industry such as industry also want to build respectively private networks. Deployment of the private network becomes a huge potential market in the future. The operator is greatly interested in the deployment of the private network. Some operators have established a mobile private network (MPN) project, to prepare for the private network.

It is a trend to implement a service of the private network by using a next-generation cellular technology (for example, a 5G network). For example, the operator establishes both a public network (public network) and a private network in some areas (for example, an industrial park or office building) to support different services. From a use perspective of a frequency, there is a limited quantity of existing spectrum resources. A frequency of the operator needs to be shared between the public network and the private network. For some burst services, a specific bandwidth of the frequency needs to be reserved, to guarantee running of these services, for example, an ultra-reliable and low latency communications (URLLC) service and a positioning service. In conclusion, a mechanism needs to be provided to coordinate a spectrum resource of the private network and the public network, to improve utilization of a shared spectrum resource.

SUMMARY

Embodiments of this application provide a resource sharing method and apparatus. Network apparatuses in a wireless network share a resource through information exchange or coordination performed by using a centralized control unit, to implement efficient spectrum sharing among a plurality of network devices.

The embodiments of this application provide at least the following technical solutions:

According to a first aspect, an embodiment of this application provides a resource sharing method. The method may be applied to a network apparatus or a chip in the network apparatus, and the method may include:

A first apparatus sends first indication information to a second apparatus. The first indication information is used to indicate a frequency domain resource of a first initial bandwidth part BWP, the frequency domain resource of the first initial BWP is a resource that is not shared between the first apparatus and the second apparatus, and the frequency domain resource of the first initial BWP is a part of a first candidate shared resource of the first apparatus and the second apparatus. The frequency domain resource of the first initial BWP is a resource reserved by the first apparatus.

The first apparatus receives second indication information from the second apparatus. The second indication information is used to indicate a frequency domain resource of a second initial BWP, the frequency domain resource of the second initial BWP is a resource that is not shared between the second apparatus and the first apparatus, and the frequency domain resource of the second initial BWP is a part of the first candidate shared resource. The frequency domain resource of the second initial BWP is a resource reserved by the second apparatus.

The first apparatus sends third indication information to the second apparatus. The third indication information is used to indicate a time-frequency resource that is in the first candidate shared resource and that is expected by the first apparatus to be used for data transmission. The time-frequency resource that is expected by the first apparatus to be used for data transmission does not overlap the reserved resource indicated by the first indication information.

The first apparatus receives fourth indication information from the second apparatus. The fourth indication information is used to indicate a time-frequency resource that is in the first candidate shared resource and that is expected by the second apparatus to be used for data transmission. The time-frequency resource that is expected by the second apparatus to be used for data transmission does not overlap the reserved resource indicated by the second indication information.

In the method provided in this aspect, the first apparatus uses the first indication information to indicate a frequency domain resource of an initial BWP, and the second apparatus uses the second indication information to indicate a frequency domain resource of an initial BWP. The frequency domain resource of the initial BWP includes at least one type of reserved resource. Therefore, the first apparatus and the second apparatus indicate all reserved resources by indicating the initial BWP. In addition, compared with a manner of indicating a position and a size of each type of reserved resource, such a unified indication method is simple and easy to implement, and signaling overheads are further reduced.

In addition, the first apparatus indicates, by using the third indication information, the resource that is expected by the first apparatus to be used for data transmission, and the second apparatus indicates, by using the fourth indication information, the resource that is expected by the second apparatus to be used for data transmission, so that the first apparatus and the second apparatus mutually learn of a resource that is expected by a peer end to be used, to provide a basis for proper allocation of a shared resource of the first apparatus and the second apparatus, and further implement efficient sharing of a spectrum resource between apparatuses at both ends.

It should be noted that, in this embodiment of this application, resources used by the first apparatus include a public network resource and a private network resource, and resources used by the second apparatus also include a public network resource and a private network resource. Therefore, according to the method in this embodiment, a spectrum resource is efficiently shared between the first apparatus and the second apparatus, to implement efficient sharing of a public network resource and a private network resource between the two apparatuses.

In an embodiment, the frequency domain resource of the first initial BWP and the frequency domain resource of the second initial BWP do not overlap.

In an embodiment, that the first indication information is used to indicate a frequency domain resource of a first initial bandwidth part BWP includes:

the first indication information is used to indicate at least one of a frequency domain start position of the first initial BWP, a frequency domain end position of the first initial BWP, and a frequency domain width of the first initial BWP; and that the second indication information is used to indicate a frequency domain resource of a second initial BWP includes:

the second indication information is used to indicate at least one of a frequency domain start position of the second initial BWP, a frequency domain end position of the second initial BWP, and a frequency domain width of the second initial BWP.

In an embodiment, the frequency domain start position of the first initial BWP is determined in Manner 1 or Manner 2, and Manner 1 and Manner 2 are as follows:

Manner 1: Determine the frequency domain start position of the first initial BWP based on a frequency domain start position of a first downlink bandwidth and an offset between the frequency domain start position of the first downlink bandwidth and the frequency domain start position of the first initial BWP.

Manner 2: Determine the frequency domain start position of the first initial BWP based on a frequency domain start position of a synchronous broadcast block SSB, an offset between the frequency domain start position of the SSB and a frequency domain start position of a first downlink bandwidth, and an offset between the frequency domain start position of the first downlink bandwidth and the frequency domain start position of the first initial BWP; and the frequency domain start position of the second initial BWP is determined in Manner 3 or Manner 4, and Manner 3 and Manner 4 are as follows:

Manner 3: Determine the frequency domain start position of the second initial BWP based on a frequency domain start position of a second downlink bandwidth and an offset between the frequency domain start position of the second downlink bandwidth and the frequency domain start position of the second initial BWP.

Manner 4: Determine the frequency domain start position of the second initial BWP based on a frequency domain start position of an SSB, an offset between the frequency domain start position of the SSB and a frequency domain start position of a second downlink bandwidth, and an offset between the frequency domain start position of the second downlink bandwidth and the frequency domain start position of the second initial BWP.

The first downlink bandwidth is a system bandwidth corresponding to the first apparatus, and the second downlink bandwidth is a system bandwidth corresponding to the second apparatus.

In an embodiment, the frequency domain width of the first initial BWP satisfies a formula:

$$RIV1 = N_{BWP1}^{size} \times (L_{RBs1} - 1) + RB_{start}.$$

Herein, $L_{RBs1}$ is a quantity of consecutive RBs occupied by the frequency domain width of the first initial BWP, RIV1 is a first resource indication value parameter, $RB_{start1}$ is a start resource block position of the first initial BWP, and $N_{BWP1}^{size}$ represents a quantity of first resource blocks RBs. The quantity of first RBs is a quantity of RBs included in the first downlink bandwidth.

Further, it can be understood that $N_{BWP1}^{size}$ represents a bandwidth that may be used as the first downlink bandwidth, or represents a candidate frequency domain range of the first initial BWP.

The frequency domain width of the second initial BWP satisfies a formula:

$$RIV2 = N_{BWP2}^{size} \times (L_{RBs2} - 1) + RB_{start2}.$$

Herein, $L_{RBs2}$ is a quantity of consecutive RBs occupied by the frequency domain width of the second initial BWP, RIV2 is a second resource indication value parameter, $RB_{start2}$ is a start resource block position of the second initial BWP, and $N_{BWP2}^{size}$ represents a quantity of second RBs. The quantity of second RBs is a quantity of RBs included in the second downlink bandwidth.

Further, it can be understood that $N_{BWP2}^{size}$ represents a bandwidth that may be used as the second downlink bandwidth, or represents a candidate frequency domain range of the second initial BWP.

In an embodiment, the time-frequency resource that is expected by the first apparatus to be used for data transmission and that is indicated by the third indication information does not include the frequency domain resource of the first initial BWP and the frequency domain resource of the second initial BWP. In other words, the resource that is expected by the first apparatus to be used for data transmission does not overlap the resource of the first initial BWP, and the resource that is expected by the first apparatus to be used for data transmission does not overlap the resource of the second initial BWP.

In an embodiment, the third indication information includes a first field and a second field.

Further, the first field is used to indicate a resource type of the time-frequency resource that is expected by the first apparatus to be used for data transmission, and the resource type includes at least one of an uplink UL resource type, a supplementary uplink SUL resource type, and a downlink DL resource type; and the second field is used to indicate a position of a time-frequency resource corresponding to each resource type.

In this manner in this embodiment, the first field and the second field are configured in the third indication information, so that the first apparatus indicates a type of the time-frequency resource that is expected to be used for data transmission.

In an embodiment, the third indication information further includes a third field, and the third field is used to indicate an effective moment of a time-frequency resource that is in the second field and that is expected to be used for data transmission.

In an embodiment, the second field further includes a fourth field; and the fourth field is used to indicate whether the position of the time-frequency resource corresponding to each resource type changes.

In a specific example, when a position of the time-frequency resource that is expected to be used for data transmission changes, the second field further includes a fifth field, the fifth field is used to indicate a position that is of a time-frequency resource that is expected to be used for data transmission and that is obtained after the change, and the fifth field is sent if the position of the time-frequency resource changes.

If a position of the time-frequency resource that is expected to be used for data transmission does not change, the fifth field does not need to be included, and the time-frequency resource indicated by a latest third field is still used for data transmission, to avoid repeatedly sending indication information of a same position of a time-frequency resource.

In this implementation, the fifth field is sent only when the position of the time-frequency resource that is expected by the first apparatus to be used for data transmission changes. Compared with an indication method in which whether a position of a time-frequency resource changes is not distinguished, repeated sending of indication information of a same position of a time-frequency resource is avoided, and signaling overheads are reduced.

In an embodiment, the first apparatus sends the first indication information and the third indication information to the second apparatus by using a first request message. In this implementation, the first indication information and the third indication information are sent by using one request message. Compared with a manner in which the first apparatus separately sends the first indication information and the third indication information, signaling overheads are reduced.

In an embodiment, before the first apparatus sends the third indication information to the second apparatus, the method further includes: The first apparatus determines, based on the first initial BWP and the second initial BWP, the time-frequency resource that is in the first candidate shared resource and that is expected by the first apparatus to be used for data transmission.

In an embodiment, that the first apparatus determines the time-frequency resource that is in the first candidate shared resource and that is expected by the first apparatus to be used for data transmission includes: The first apparatus determines, based on the first initial BWP, the second initial BWP, and the time-frequency resource that is expected by the second apparatus to be used for data transmission, the time-frequency resource that is in the first candidate shared resource and that is expected by the first apparatus to be used for data transmission.

In an example, when the resource that is expected by the first apparatus to be used for data transmission does not overlap the resource that is expected by the second apparatus to be used for data transmission, the resource that is expected by the first apparatus to be used for data transmission is a part or all of a resource that remains after the frequency domain resource of the first initial BWP, the frequency domain resource of the second initial BWP, and the resource that is expected by the second apparatus to be used for data transmission are removed from the first candidate shared resource.

In another example, when the resource that is expected by the first apparatus to be used for data transmission overlaps the resource that is expected by the second apparatus to be used for data transmission, the resource that is expected by the first apparatus to be used for data transmission may be determined based on a service requirement or a specific principle. A specific requirement and principle of a service are not limited in this embodiment.

In an embodiment, the first apparatus determines a shared resource of the first apparatus in the first candidate shared resource based on the first initial BWP, the second initial BWP, and the time-frequency resource that is expected by the second apparatus to be used for data transmission.

In another embodiment, the first apparatus determines a shared resource of the first apparatus in the first candidate shared resource based on the first initial BWP, the second initial BWP, the time-frequency resource that is expected by the first apparatus to be used for data transmission, and the time-frequency resource that is expected by the second apparatus to be used for data transmission.

The shared resource of the first apparatus in the first candidate shared resource may be the same as or different from the resource that is expected by the first apparatus to be used for data transmission and that is indicated by the third indication information.

According to a second aspect, an embodiment of this application further provides a resource sharing method. The method includes:

A third apparatus receives first indication information from a first apparatus. The first indication information is used to indicate a resource reserved by the first apparatus.

The third apparatus receives second indication information from a second apparatus. The second indication information is used to indicate a resource reserved by the second apparatus.

The third apparatus receives third indication information from the first apparatus. The third indication information is used to indicate a time-frequency resource that is in a first candidate shared resource and that is expected by the first apparatus to be used for data transmission.

The third apparatus receives fourth indication information from the second apparatus. The fourth indication information is used to indicate a time-frequency resource that is in the first candidate shared resource and that is expected by the second apparatus to be used for data transmission.

The third apparatus sends fifth indication information to the first apparatus. The fifth indication information is used to indicate a shared resource of the first apparatus in the first candidate shared resource. Further, the shared resource that is indicated by the fifth indication information may be determined from the first candidate shared resource based on one or more of the first indication information, the second indication information, the third indication information, and the fourth indication information.

In an embodiment, when a resource of a first initial BWP includes the resource reserved by the first apparatus, the first indication information may be used to indicate a frequency domain resource of the first initial BWP, and the frequency domain resource of the first initial BWP is a resource that is not shared between the first apparatus and the second apparatus. Further, the frequency domain resource of the first initial BWP is a part of the first candidate shared resource.

when a resource of a second initial BWP includes the resource reserved by the second apparatus, the second indication information may be used to indicate a frequency domain resource of the second initial BWP, and the frequency domain resource of the second initial BWP is a resource that is not shared between the second apparatus and the first apparatus. Further, the frequency domain resource of the second initial BWP is a part of the first candidate shared resource.

In this implementation, a third apparatus manages a spectrum resource of the first apparatus and the second apparatus based on indication information respectively reported by the first apparatus and the second apparatus, so that the spectrum resource can be shared more fairly, and centralized management, charging, and a profit increase of an operator can be facilitated.

In a specific example, the shared resource of the first apparatus in the first candidate shared resource may be determined based on the following indication information, including:

determining the shared resource of the first apparatus in the first candidate shared resource based on the first indication information and the second indication information;

determining the shared resource of the first apparatus in the first candidate shared resource based on the first indication information, the second indication information, and the third indication information;

determining the shared resource of the first apparatus in the first candidate shared resource based on the first indication information, the second indication information, and the fourth indication information; or determining the shared resource of the first apparatus in the first candidate shared resource based on the first indication information, the second indication information, the third indication information, and the fourth indication information.

In an embodiment, the method further includes:

The third apparatus sends sixth indication information to the second apparatus. The sixth indication information is used to indicate a shared resource of the second apparatus in the first candidate shared resource.

Further, the shared resource indicated by the sixth indication information is determined by the third apparatus from the first candidate shared resource based on one or more of the first indication information, the second indication information, the third indication information, and the fourth indication information.

In an embodiment, that a third apparatus receives first indication information from a first apparatus includes: The third apparatus periodically receives the first indication information from the first apparatus.

That the third apparatus receives second indication information from a second apparatus includes: The third apparatus periodically receives the second indication information from the second apparatus.

In this implementation, the first apparatus and the second apparatus periodically report information used to indicate a reserved resource of the first apparatus and the second apparatus, so that the third apparatus can periodically obtain the reserved resource of the first apparatus and the second apparatus, to prepare for a subsequent dynamic indication.

In addition, if the reserved resource configured by the first apparatus or the second apparatus changes, a change in the corresponding reserved resource may also be indicated by using the first indication information or the second indication information, to improve indication flexibility.

In an embodiment, that the third apparatus receives third indication information from the first apparatus includes: The third apparatus periodically receives the third indication information from the first apparatus; and that the third apparatus receives fourth indication information from the second apparatus includes: The third apparatus periodically receives the fourth indication information from the second apparatus.

In this implementation, the first apparatus and the second apparatus periodically report a time-frequency resource that is expected to be used for data transmission, so that the third apparatus can periodically obtain a resource requirement of the first apparatus and the second apparatus, to periodically allocate a resource to the first apparatus and the second apparatus.

In an embodiment, before the third apparatus receives the fourth indication information from the second apparatus, the method further includes: The third apparatus sends a message to the second apparatus, where the message is used to indicate the second apparatus to report the time-frequency resource that is in the first candidate shared resource and that is expected by the second apparatus to be used for data transmission.

In an embodiment, the message is a query message. Further, the query message includes at least one of an identifier of the second apparatus and a type of a query resource.

According to the method provided in this aspect, the third apparatus is used to centrally manage and allocate a spectrum resource of the first apparatus and the second apparatus, so that the operator can perform centralized management and charging, to guide the operator to increase a profit through spectrum sharing.

According to a third aspect, an embodiment of this application further provides a resource sharing apparatus. The apparatus is configured to implement the resource sharing method in the first aspect and the implementations of the first aspect.

The apparatus is a first apparatus or a second apparatus.

Further, the first apparatus or the second apparatus is a network device.

In an embodiment, the apparatus includes at least one functional unit or module. Further, the at least one functional unit is a receiving unit, a processing unit, a sending unit, or the like.

According to a fourth aspect, an embodiment of this application further provides another resource sharing apparatus. The apparatus is configured to implement the resource sharing method in the second aspect and the implementations of the second aspect.

The apparatus is a third apparatus. Further, the third apparatus is a network device, such as a centralized controller, a centralized control unit, or a server.

According to a fifth aspect, an embodiment of this application further provides a communications apparatus, including a processor and a memory, where the processor is coupled to the memory, where the memory is configured to store instructions; and the processor is configured to invoke the instructions to enable the communications apparatus to perform the method in the first aspect and the implementations of the first aspect, or the processor is configured to invoke the instructions to enable the communications device to perform the method in the second aspect and the implementations of the second aspect.

In an embodiment, the communications apparatus further includes a transceiver, and the transceiver is configured to receive or send a message, data, and the like of a peer device.

Further, the communications apparatus is the apparatus in the third aspect or the fourth aspect.

In an embodiment, when the communications apparatus is used as the apparatus in the third aspect, the communications apparatus may be a network device, for example, a first base station or a second base station.

In another embodiment, when the communications apparatus is used as the apparatus in the fourth aspect, the communications apparatus may be a network device, for example, a server or a centralized controller.

According to a sixth aspect, an embodiment of this application further provides a computer-readable storage medium. The storage medium stores instructions. When the instructions are run on a computer or a processor, the instructions are used to perform the method in the first aspect and the implementations of the first aspect, or used to perform the method in the second aspect and the implementations of the second aspect.

According to a seventh aspect, an embodiment of this application further provides a computer program product. The computer program product includes computer instructions. When the instructions are executed by a computer or a processor, the method in the first aspect and the implementations of the first aspect or the method in the second aspect and the implementations of the second aspect can be implemented.

According to an eighth aspect, an embodiment of this application further provides a chip system. The chip system includes a processor and an interface circuit, the interface circuit is coupled to the processor, and the processor is configured to execute a computer program or instructions, to implement the method in the first aspect and the implementations of the first aspect, or implement the method in the second aspect and the implementations of the second aspect.

The interface circuit is configured to communicate with another module other than the chip system.

According to a ninth aspect, an embodiment of this application further provides a communications system, including at least two communications apparatuses. The at least two communications apparatuses include at least one first communications apparatus and at least one second communications apparatus, and the first communications apparatus or the second communications apparatus may be the apparatus in the third aspect and is configured to implement the method in the first aspect and the implementations of the first aspect.

In an embodiment, the communications system further includes a third communications apparatus.

The third communications apparatus may be the apparatus in the fourth aspect, and is configured to implement the method in the second aspect and the implementations of the second aspect.

In an example, the first communications apparatus is a first apparatus, for example, a first base station. The second communications apparatus is a second apparatus, for example, a second base station.

In an example, the third communications apparatus is a third apparatus, for example, a server or a centralized controller.

DESCRIPTION OF EMBODIMENTS

Figure 1:
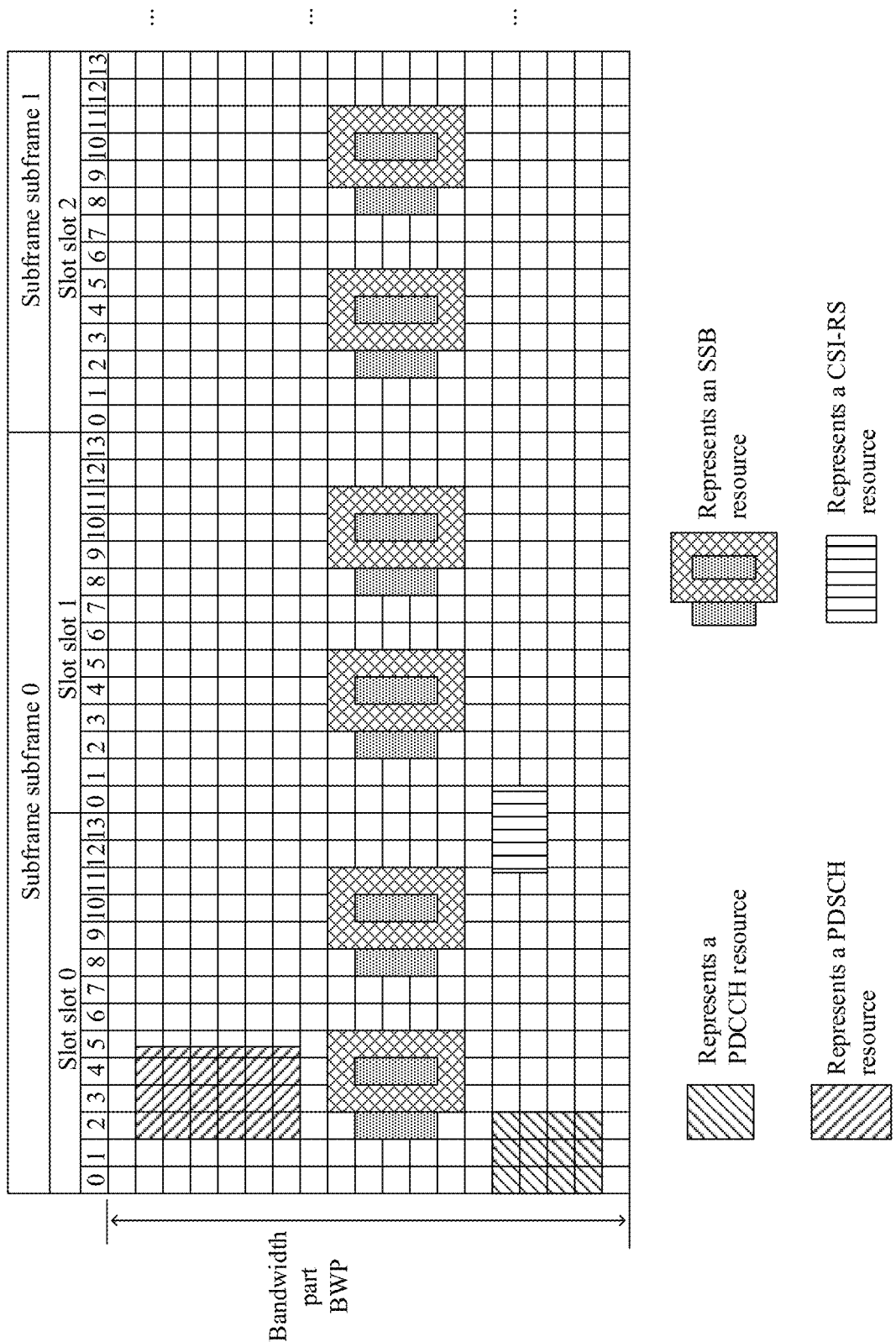
FIG. 1 is a schematic diagram of a time-frequency domain distribution of a physical downlink channel and a signal according to an embodiment of this application.

The following describes the technical solutions in embodiments of this application with reference to the accompanying drawings in the embodiments of this application. Before the technical solutions in the embodiments of this application are described, an application scenario in the embodiments of this application is first described with reference to the accompanying drawings.

The technical solutions of this application are mainly applied to a future scenario in which a resource is shared between an industrial private network and a public network. The industrial private network may be briefly referred to as a "private network", and includes but is not limited to an industrial manufacturing factory, an industrial park, a production park, and the like. The public network may be briefly referred to as a "public network", for example, a long term evolution (LTE) system, a 5th generation (5G) mobile communications system, a new radio (NR) communications system, and a future mobile communications system. The new radio may also be referred to as a new air interface.

In an embodiment, the private network is also referred to as a dedicated network, or briefly referred to as a "dedicated network".

The technical solutions of this application are mainly to coordinate a public network spectrum resource and a private network spectrum resource that are allocated to different network devices, so that each device properly uses the spectrum resource. The spectrum resource includes a spectrum resource occupied by a channel and a signal in a 5G NR communications system. For ease of understanding of a subsequent solution, a related background technology is first described, including a name and a function of a 5G NR physical channel and signal, a position and a size of time-frequency resource on which the 5G NR physical channel is located, a bandwidth part (BWP), and the like.

Table 1 is a table of a correspondence between a physical downlink channel/signal and a function of a 5G network. Table 2 is a table of a correspondence between an uplink physical channel/signal and a function of a 5G network. The physical channel may be classified into a common channel and a dedicated channel based on a use object, and may be classified into a control channel and a data channel based on a use. Further, the common channel and the control channel may be used to transmit and receive the data channel. The common channel includes a synchronization signal (SS), a physical broadcast channel (PBCH), and a physical random access channel (PRACH). The control channel includes a physical downlink control channel (PDCCH) and a physical uplink control channel (PUCCH). The data channel includes a physical downlink shared channel (PDSCH) and a physical uplink shared channel (PUSCH). For details, refer to Table 1 and Table 2.

TABLE 1

Table of a correspondence between a physical downlink channel/signal and a function

| Name of a physical downlink channel and a signal | | Brief function description |
|---|---|---|
| SS | Synchronization signal (Synchronization Signal) | Used for a cell search and synchronization |
| PBCH | Physical broadcast channel (Physical broadcast channel) | Used to carry a system broadcast message |
| PDCCH | Physical downlink control channel (Physical Downlink Control Channel) | Used for uplink and downlink scheduling and control command transmission |
| PDSCH | Physical downlink shared channel (Physical Downlink Shared Channel) | Used to carry downlink user data |
| DMRS | Demodulation reference signal (Demodulation Reference Signal) | Used for downlink data demodulation, time-frequency synchronization, or the like |
| PT-RS | Phase tracking reference signal (Phase Tracking Reference Signal) | Used for tracking and compensation of downlink phase noise |
| CSI-RS | Channel state information-reference signal (Channel State Information Reference Signal) | Used for downlink channel measurement and beam management: radio link management (RLM) or radio resource management (RRM) measurement, refined time-frequency tracking, or the like |

TABLE 2

Table of a correspondence between an uplink physical channel/signal and a function

| Name of an uplink physical channel and a signal | | Brief function description |
|---|---|---|
| PRACH | Physical random access channel (Physical Random Access Channel) | Used to carry random access request information of a user |
| PUCCH | Physical uplink control channel (Physical Uplink Control Channel) | Used for a hybrid automatic repeat request (HARQ) feedback, a channel quality indicator (CQI) feedback, a scheduling request indication, L1/L2 (layer 1/layer 2) control signaling, or the like |
| PUSCH | Physical uplink shared channel (Physical Uplink Shared Channel) | Used to carry uplink user data |
| DMRS | Demodulation reference signal (Demodulation Reference Signal) | Used for uplink data demodulation, time-frequency synchronization, or the like |
| PT-RS | Phase tracking reference signal (Phase Tracking Reference Signal) | Used for tracking and compensation of uplink phase noise |
| SRS | Sounding reference signal (Sounding Reference Signal) | Used for uplink channel measurement, time-frequency synchronization, beam management, or the like |

FIG. 1 is a schematic diagram of a time-frequency domain distribution of a physical downlink channel and a signal. The physical downlink channel is divided into a plurality of blocks of resources. The resources obtained through division include a PDCCH, a PDSCH, an SS/PBCH, a CSI-RS, or the like. The PDSCH may be used to carry a DMRS or a PT-RS.

As shown in FIG. 1, a downlink slot 0 of a subframe 0 is used as an example. A PDCCH resource is configured to occupy the first three symbols of the slot 0 in time domain, to be specific, a symbol 0 to a symbol 2. A resource used as the PDCCH resource in frequency domain may be configured. In addition, frequency division multiplexing (FDM) is supported on a same symbol of the PDCCH resource and a PDSCH resource.

For a PDSCH resource that carries a DMRS (DMRS for PDSCH), a time domain position and a frequency domain position of the PDSCH resource and a size of a time-frequency resource each may be configured during division. In addition, frequency division multiplexing is supported on a same symbol of a DMRS resource and the PDSCH resource.

A time domain position of a synchronization signal/physical broadcast channel (SS/PBCH, SSB) resource obtained through division is usually fixed, and a frequency domain position may be configured. For example, a start position of the SSB in frequency domain is configured to be an RE, but the SSB occupies 20 resource blocks (RB) in frequency domain. In addition, frequency division multiplexing is supported on a same symbol of an SSB resource and the PDSCH resource.

A time domain position, a frequency domain position, and a size of a bandwidth of a CSI-RS resource obtained through division each may be configured. In addition, frequency division multiplexing is supported on a same symbol of the CSI-RS and the PDSCH.

In addition, a block of resource is further obtained through division from the physical downlink channel, to transmit the PT-RS. The resource used to transmit the PT-RS is not shown in FIG. 1. A time domain position, a frequency domain position, and a size of a bandwidth of the resource of the PT-RS each may be configured. In an embodiment, the resource of the PT-RS is configured in the PDSCH resource.

In the following embodiments, after the resources such as the PDCCH, the PDSCH, the SSB, and the CSI-RS shown in FIG. 1 are obtained through division, positions and sizes of these resources are notified to a receiving device at a peer end by using indication information. A process in which a transmit end configures the indication information and content carried in the indication information are described in detail in subsequent embodiments. A time-frequency position and a size of these resources obtained through division such as an SSB resource may be set in a unified manner.

Figure 2:
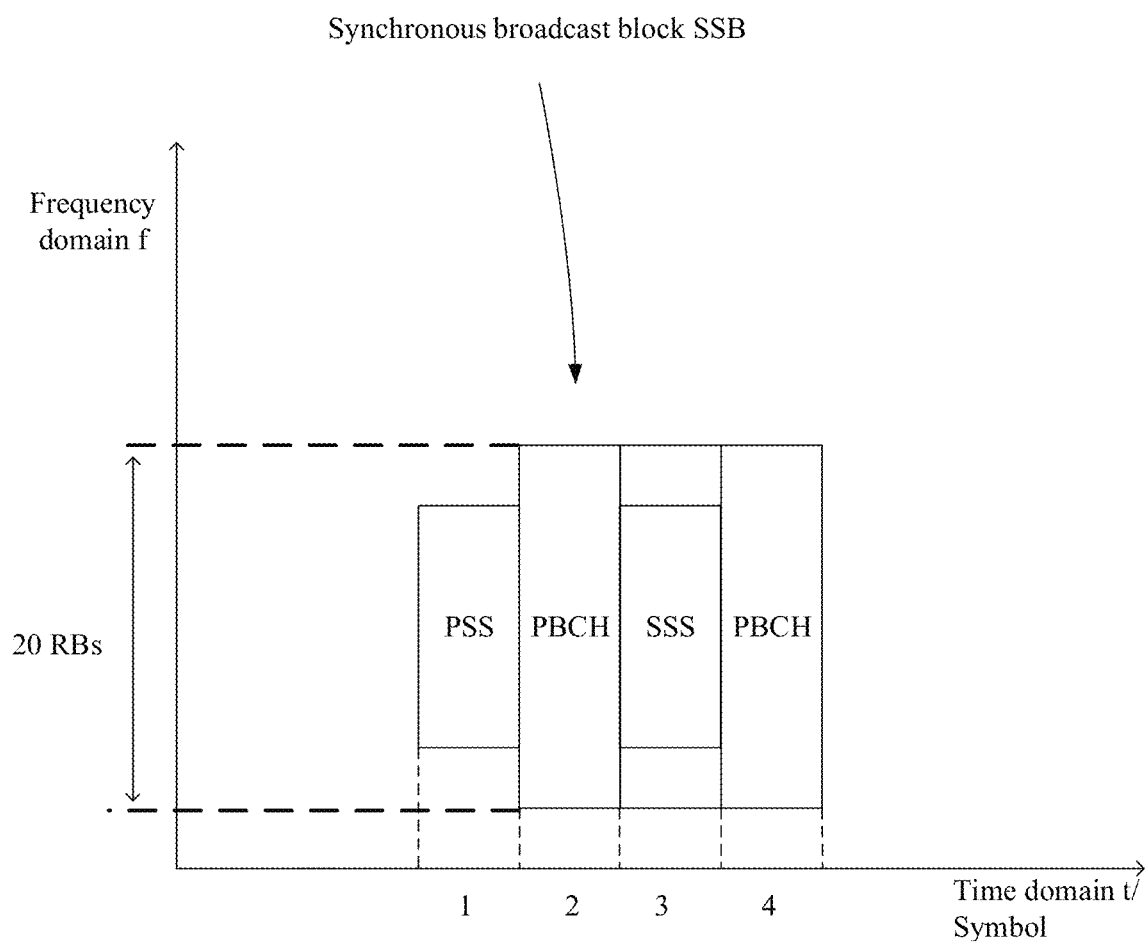
FIG. 2 is a schematic diagram of an SSB resource according to an embodiment of this application.

For example, FIG. 2 is a schematic diagram of an SSB resource. An SSB may be referred to as a synchronous broadcast block (SS PBCH Block). One SSB occupies 20 RBs in frequency domain, and occupies four consecutive symbols in time domain. One SSB includes a primary synchronization signal (PSS), a secondary synchronization signal (SSS), and a PBCH. In the four consecutive symbols in time domain, the PSS is located in the $1^{st}$ symbol, the SSS is located in the $3^{rd}$ symbol, and the PBCH is located in the $2^{nd}$ symbol and the $4^{th}$ symbol.

Figure 3:
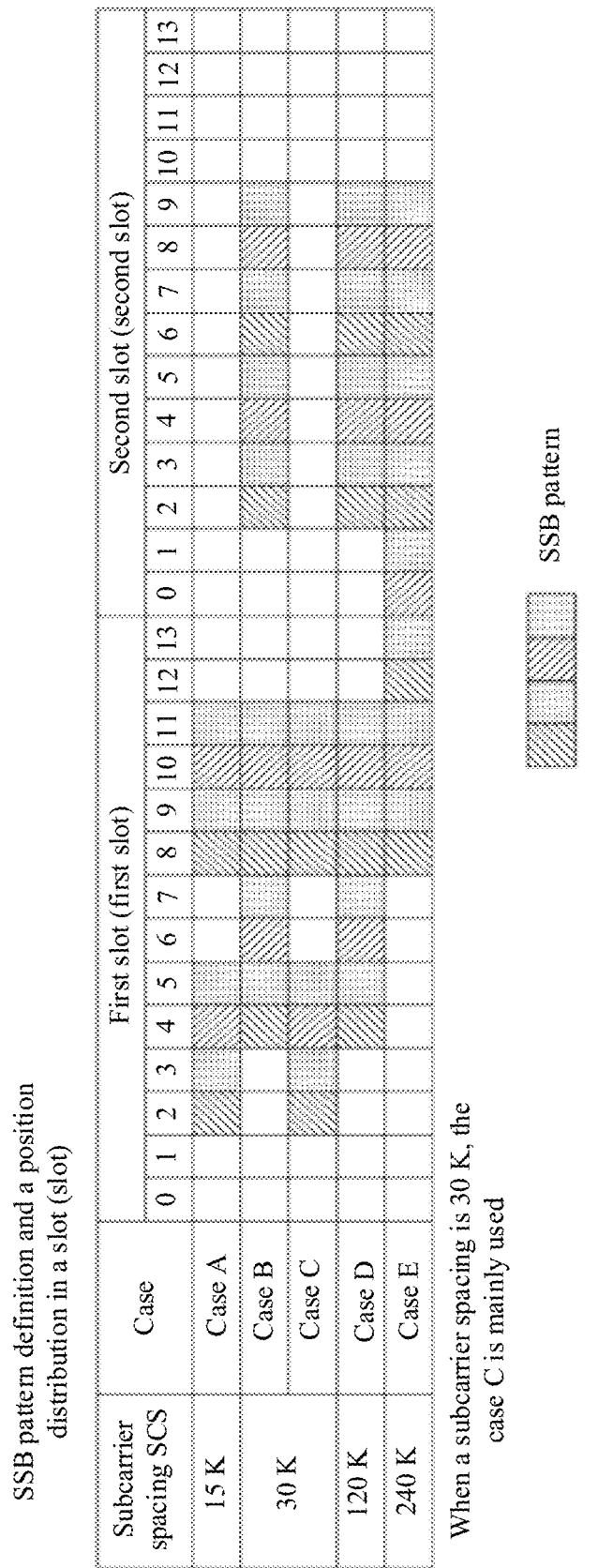
FIG. 3 is a schematic diagram of an SSB pattern definition and a position distribution in a slot according to an embodiment of this application.

In 5G NR, a frequency domain position of each SSB may be flexibly configured, and user equipment (UE) may obtain the frequency domain position of the SSB through channel blind detection. However, a time domain position of the SSB may also be configured. For example, correspondences between different subcarrier spacings (SCS) and different SSB time domain patterns are specified in a protocol, and the time domain position of the SSB may be determined based on the SSB time domain pattern. Table 3 shows a correspondence between an SCS and an SSB time domain pattern. The SSB time domain pattern reflects a distribution of time domain symbols of all SSBs on the physical downlink channel, and each time domain pattern may be represented in different cases. FIG. 3 is a schematic diagram of five different time domain patterns in a case A to a case E.

TABLE 3

Correspondence between an SCS and an SSB time domain pattern

| NR operating band (NR Operation Band) | | Synchronous broadcast block subcarrier spacing (SSB SCS) | SSB time domain pattern |
|---|---|---|---|
| 800M | n1 | 15 kHz | Case A |
| | n2 | 15 kHz | Case A |
| | n3 | 15 kHz | Case A |
| | n5 | 15 kHz | Case A |
| | | 30 kHz | Case B |
| | n7 | 15 kHz | Case A |
| | n8 | 15 kHz | Case A |
| | n20 | 15 kHz | Case A |
| | n28 | 15 kHz | Case A |
| 2.6 G | n38 | 15 kHz | Case A |
| | n41 | 15 kHz | Case A |
| | | 30 kHz | Case C |
| | n50 | 15 kHz | Case A |
| | n51 | 15 kHz | Case A |
| | n66 | 15 kHz | Case A |
| | | 30 kHz | Case B |
| | n70 | 15 kHz | Case A |
| | n71 | 15 kHz | Case A |
| | n74 | 15 kHz | Case A |
| | n75 | 15 kHz | Case A |
| | n76 | 15 kHz | Case A |
| 3.5 G | n77 | 30 kHz | Case C |
| | n78 | 30 kHz | Case C |
| | n79 | 30 kHz | Case C |
| . . . | . . . | . . . | . . . |
| | n260 | 120 kHz | Case D |
| | | 240 kHz | Case E |

For example, the UE determines, based on an NR operating band of the UE and the correspondence shown in Table 3, an SSB subcarrier spacing of the UE and an SSB time domain pattern corresponding to the SSB subcarrier spacing, where SSB time domain pattern is one of the case A to the case E, and then obtains a time domain position of each SSB based on a determined case.

It should be noted that two SCSs of 15 kHz and 30 kHz may be supported on an operating band (800 M) of n5. When the UE operates on the frequency band of n5, the two SCSs of 15 kHz and 30 kHz need to be separately used to perform SSB channel blind detection, and a target SCS is determined based on an SSB channel blind detection result. For example, if an SSB is detected by using 15 kHz, it is determined that the target SCS is 15 kHz. Then, the UE determines, based on the correspondence shown in Table 3, that an SSB time domain pattern corresponding to the SCS of 15 kHz is the case A. Finally, the UE determines the time domain position of each SSB based on the case A.

FIG. 3 is a schematic diagram of SSB pattern definitions and position distributions in a slot that correspond to the case A to the case E. As shown in FIG. 3, each SSB pattern occupies four consecutive OFDM symbols in time domain, and SSB patterns corresponding to different cases have different distribution positions in time domain. For example, when the case A is used, the $1^{st}$ SSB pattern is located on an OFDM symbol 2 to an OFDM symbol 5 of the $1^{st}$ slot, and the $2^{nd}$ SSB pattern is located on an OFDM symbol 8 to an OFDM symbol 11 of the $1^{st}$ slot.

It should be noted that, when a subcarrier spacing is 30 kHz, an SSB pattern includes the case B and the case C. In this case, the case C is configured to be a mainly used SSB pattern.

In an embodiment, an SSB period may be configured by using a system information block (SIB). For example, a network device configures an SSB broadcast period by using an SIB 1. Further, the SSB broadcast period may be 5 ms, 10 ms, 20 ms, 40 ms, 80 ms, 160 ms, or the like.

In addition, a maximum quantity of blocks supported by an SSB is specified in a protocol. For example, for sub-3G, a maximum of four SSBs are defined; for sub-3G to sub-6G, a maximum of eight SSBs are defined, and for sub-6G or above, a maximum of 64 SSBs are defined. When a quantity of SSBs that are actually sent in a cell is less than a maximum quantity of SSBs defined in the protocol, a remaining SSB resource is not used. To fully use the resource, a base station may indicate to send a PDSCH resource on the remaining SSB resource. In an implementation, system information (SI) or radio resource control (RRC) signaling is used to indicate a position of the SSB resource that is not used.

It can be understood that the SSB time domain pattern may be determined based on an NR operating band and an SCS value. Further, the SCS value may be determined through blind channel detection performed by the UE. However, in this embodiment, devices that interact at two ends are peer-to-peer devices. For example, interaction is performed between base stations. Therefore, a base station at each end does not learn of an NR operating band and an SCS value of a peer base station. To indicate a position of an SSB resource, in a specific implementation, the base stations at two ends exchange respective NR operating bands, SCS values, SSB periods, and the like. Further, a process in which the devices at the two ends indicate the SSB resource to each other and determine the SSB resource is described in detail in a subsequent embodiment.

In the foregoing process of indicating the SSB time domain pattern, a 5G NR radio frame structure and a correspondence between a quantity of subframes included in a radio frame, a quantity of slots, and a symbol are involved. Table 4 shows a correspondence among an NR subcarrier configuration, a quantity of symbols per slot, and a quantity of slots per subframe. Different from a fixed quantity of slots included in each LTE subframe, a quantity of slots included in each 5G NR subframe is variable, and a quantity of slots included in each subframe is related to a value of a subcarrier spacing.

Figure 4:
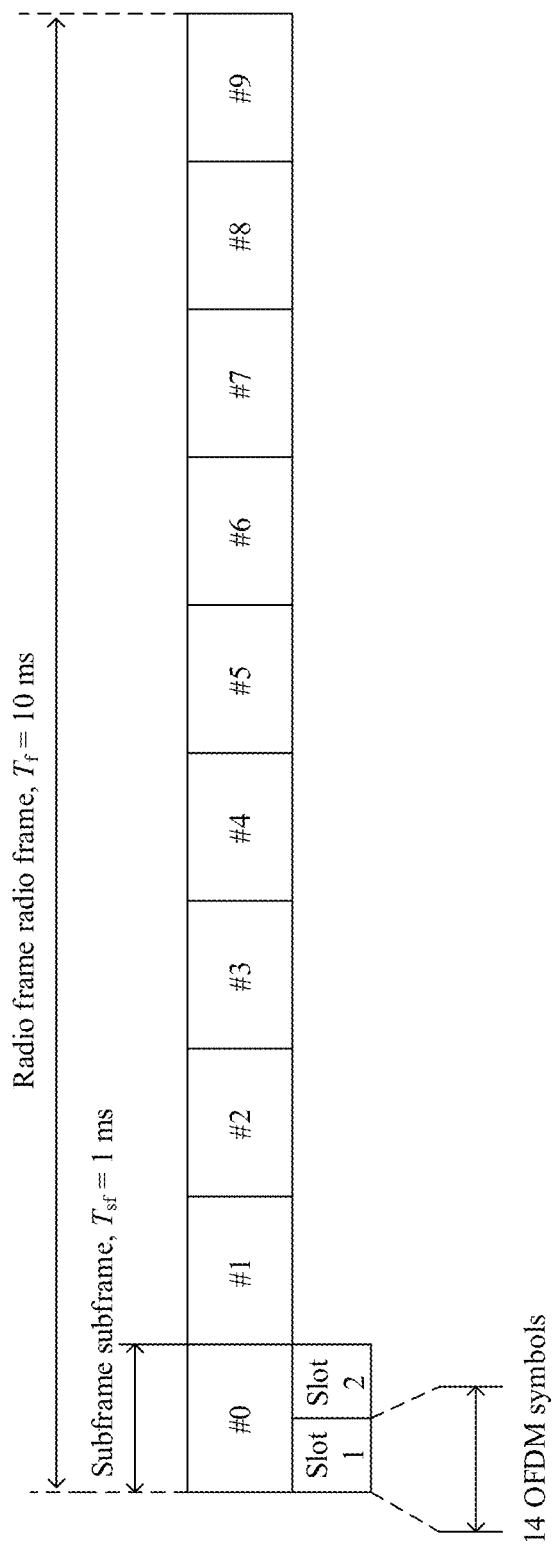
FIG. 4 is a schematic diagram of a radio frame structure according to an embodiment of this application.

For ease of understanding, FIG. 4 is a schematic diagram of a radio frame structure of a 5G NR network when a subcarrier spacing is 30 kHz. As shown in FIG. 4, a length of one radio frame $T_f=10$ ms, and $T_f$ indicates a length of one radio frame. Each radio frame includes 10 subframes, a length of each subframe $T_{sf}=1$ ms, and $T_{sf}$ indicates a length of one subframe. Each subframe includes two slots. In other words, 1 subframe=2 slots. Each slot includes 14 OFDM symbols. In other words, 1 slot=14 OFDM.

TABLE 4

Correspondence among an NR subcarrier configuration, a quantity of symbols per slot, and a quantity of slots per subframe

| Subcarrier configuration μ | Subcarrier spacing $2^\mu \cdot 15$ KHz | Cyclic prefix | Quantity $N_{symb}^{slot}$ of symbols per slot | Quantity $N_{slot}^{frame, \mu}$ of slots per frame | Quantity $N_{slot}^{subframe, \mu}$ of slots per subframe |
|---|---|---|---|---|---|
| 0 | 15 | Normal | 14 | 10 | 1 |
| 1 | 30 | Normal | 14 | 20 | 2 |
| 2 | 60 | Normal | 14 | 40 | 4 |
| 3 | 120 | Normal | 14 | 80 | 8 |
| 4 | 240 | Normal | 14 | 160 | 16 |
| 2 | 60 | Extended | 12 | 40 | 4 |

Based on the correspondence in Table 4, when the subcarrier spacing is 60 kHz and the cyclic prefix is a normal cyclic prefix, a quantity $N_{slot}^{subframe, \mu}$ of slots in each subframe is 4, a quantity $N_{symb}^{slot}$ of symbols in each slot is 14, and a quantity $N_{slot}^{frame, \mu}$ of slots in each radio frame is 40.

Because there are various of types of 5G NR services and different services also have different requirements for a spectrum resource, a concept of a bandwidth part (BWP) is introduced. The BWP may be configured based on requirements of different services in a system. The BWP may be classified into an initial BWP, a dedicated BWP, an active BWP, and a default BWP based on types.

The initial BWP is a BWP used by the UE in an initial access phase. To be specific, a signal and a channel in the initial access phase are transmitted in the initial BWP. The dedicated BWP is a BWP used by the UE when the UE is in an RRC connected mode. Usually, a maximum of four dedicated BWPs may be configured for one UE. The active BWP is a BWP that is activated at a moment at which the UE is in the RRC connected mode, and the active BWP may be one or more of a plurality of dedicated BWPs. In an existing standard release of the R15 protocol, when the UE is in the RRC connected mode, only one active BWP is configured at a moment. The default BWP means that when the UE is in the RRC connected mode, the UE returns from the active BWP to the default BWP after a BWP inactivity timer of the UE expires. The default BWP may be one of a plurality of dedicated BWPs. RRC signaling may be used to indicate the UE to select a specific dedicated BWP as the default BWP.

Figure 5:
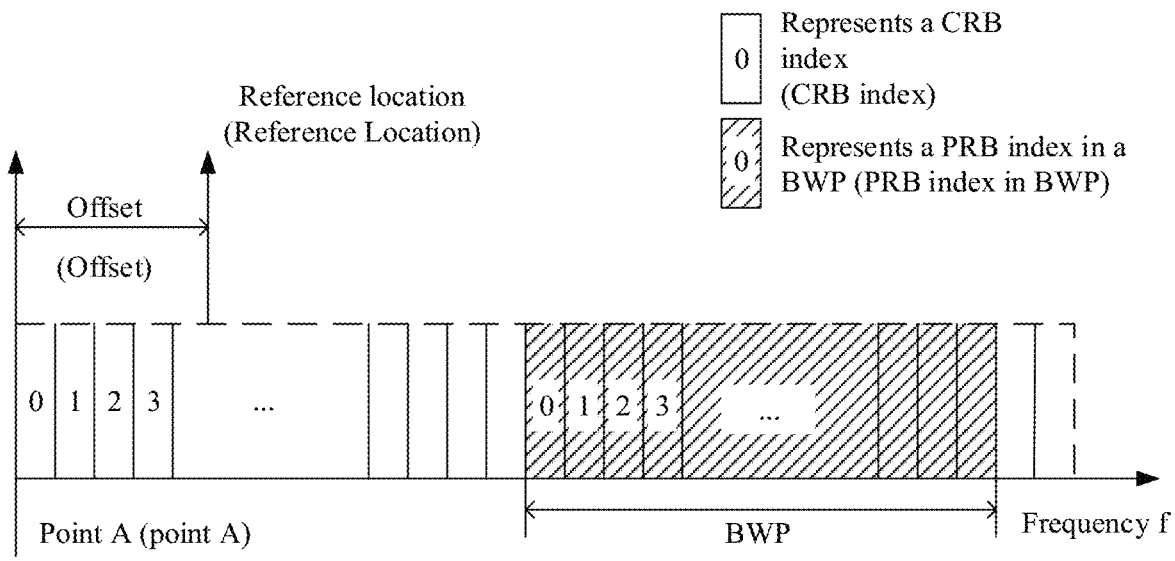
FIG. 5 is a schematic diagram of a frequency domain position of a BWP according to an embodiment of this application.

In an embodiment, a frequency domain position of a BWP is indicated by using a resource block (RB) index. A point A is set as a basic reference point. The point A is a basic reference point of all RBs in a resource group (RG), and the point A may be obtained through calculation based on a reference location and an offset. As shown in FIG. 5, a position of a point A in frequency domain is equal to a sum of a reference location and an offset. In other words, an expression is: point A=Reference Location+Offset. The reference location is a start position of a first SSB. Further, the start position of the SSB may be obtained when the first apparatus and the second apparatus exchange an SSB. Further, for the RB and the RG, refer to the section 4.4 in TS 38.211.

In an embodiment, a value of the offset may be a positive value or may be a negative value.

A common resource block (CRB) may be used as an index of the RB in the RG, and a subcarrier 0 of the CRB is aligned with the point A. A physical resource block (PRB) may be used as an index of an RB in the BWP, and a count is started from 0 in each BWP. Usually, the PRB and the CRB have a same resource configuration parameter (numerology). The resource configuration parameter may include at least one of the following: a subcarrier spacing, a slot length, and a cyclic prefix (CP). In addition, for different resource configuration parameters, a position of the point A is usually fixed, and positions of subcarriers 0 of CRBs of different resource configuration parameters are also the same, and are the same as the position of the point A, but are independently numbered.

Figure 6A:
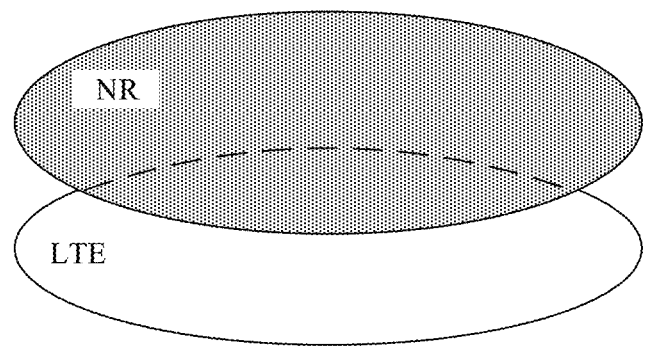
FIG. 6a is a schematic diagram in which a coverage area of an LTE cell and a coverage area of an NR cell completely overlap according to an embodiment of this application.
Figure 6B:
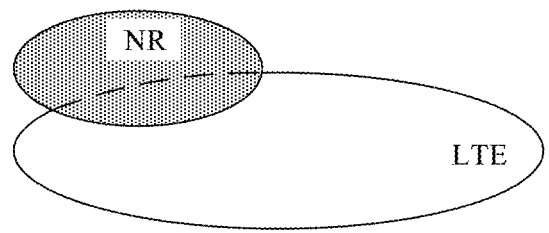
FIG. 6b is a schematic diagram in which a coverage area of an LTE cell and a coverage area of an NR cell partially overlap according to an embodiment of this application.

An existing LTE and NR spectrum sharing solution is mainly used for an LTE cell and an NR cell whose cell coverage areas completely overlap or partially overlap. As shown in FIG. 6a and FIG. 6b, in an LTE and NR spectrum sharing procedure, a base station (eNB) of an LTE cell and a base station (gNB) of an NR cell send a message to each other, to notify a resource that is expected by each other to be used. For example, the eNB sends a resource request message to the gNB. The resource request message includes a resource that is expected by the eNB to be used. After receiving the resource request message, the gNB returns a resource response message to the eNB. The resource response message is used to feed back to the eNB that the gNB receives a resource that is expected by the eNB to be used. In an embodiment, the resource response message is further used to indicate a resource expected by the gNB to be used.

For example, the resource request message is an evolved universal terrestrial radio access—new radio cell resource coordination request (E-UTRA-NR CELL RESOURCE COORDINATION REQUEST), and the resource response message is an evolved universal terrestrial radio access—new radio cell resource coordination response (E-UTRA-NR CELL RESOURCE COORDINATION RESPONSE). E-UTRA is LTE and evolved universal terrestrial radio access (E-UTRA).

Table 5 shows a difference between two types of resource sharing: LTE and NR resource sharing and resource sharing between a public network and a private network. For example, LTE and NR resource sharing is applied to a limited scenario, and a private network (for example, a private network identifier) and some NR features (for example, an initial BWP and an SSB resource) are not considered. Therefore, an existing LTE and NR spectrum sharing solution cannot be directly used for resource sharing between the public network and the private network. Therefore, a new spectrum sharing solution needs to be designed, to implement spectrum sharing between the public network and the private network.

TABLE 5

Difference between resource sharing between a public network and a private network and LTE-NR resource sharing

| Difference | Resource sharing between a public network and a private network | LTE-NR resource sharing |
| --- | --- | --- |
| Cell identifier (cell ID) | Different from a gNB cell ID and an eNB cell ID, a private network identifier may be a closed access group ID or a non-public network ID | gNB cell ID (length: 36 bits) and an eNB cell ID (length: 28 bits) |

TABLE 5-continued

Difference between resource sharing between a public network and a private network and LTE-NR resource sharing

| Shared resource type | A shared resource may be an E-UTRAN resource, or may be an NR resource. In addition, a BWP is further included in NR, and therefore, a resource of the BWP may be shared. | A shared resource is an LTE resource. |
| --- | --- | --- |
| Different frame structures | An uplink-downlink UL-DL ratio of time division duplex (TDD); and a special slot configuration and a frame structure are related to an SCS | Exchange an LTE TDD uplink-downlink UL-DL ratio. |
| Shared resource indication granularity | A flexible slot (flexible slot) is supported in NR. A resource may be allocated by symbol (symbol). A finer shared resource indication granularity is required. | An X2 interface protocol between LTE base stations is used to indicate information about a protected time-frequency resource, and a granularity is an RE; information about an expected resource exchanged between base stations during coordination of a resource |

In conclusion, when a spectrum resource needs to be shared between a private network service and a public network service, in consideration of a scarce spectrum resource in the future and different requirements of different service for a spectrum resource, the spectrum resource needs to be efficiently shared. However, an existing spectrum sharing technology is not applicable to a scenario of sharing performed between the public network and the private network. In view of this, an embodiment of this application provides a resource sharing method, so that the first apparatus and the second apparatus perform signaling interaction or a centralized controller is used to coordinate all spectrum resources of the two apparatuses, to implement efficient spectrum resource sharing between the first apparatus and the second apparatus.

The resource sharing method provided in this embodiment is described in detail below.

Embodiment 1

This embodiment provides a resource sharing method. The method may be applied to a communications system including at least two apparatuses. For example, the system includes a first apparatus and a second apparatus. Further, the first apparatus may be a network device, and the network device includes a base station (BS). Further, the base station may be a base transceiver station (BTS) in a global system for mobile communications (GSM) or code division multiple access (CDMA), a NodeB in wideband code division multiple access (WCDMA), an evolved NodeB (eNB/eNodeB) in LTE, an evolved NodeB (ng-eNB) in next-generation LTE, a gNB in NR, a base station in a future mobile communications system, an access node in a wireless fidelity (Wi-Fi) system, or the like. A specific technology and a specific device form that are used by the network device are not limited in this embodiment of this application.

In this embodiment of this application, the second apparatus and the first apparatus are peer-to-peer devices, and the second apparatus may be a network device that is the same as the first apparatus. In addition, the first apparatus and the second apparatus are peer-to-peer in terms of operations and working principles involved in implementing a manner in the embodiments of the present invention, in other words, need to perform same processing.

In this embodiment of this application, the first apparatus may be a public network base station, or may be a private network base station. Correspondingly, the second apparatus may be a public network base station or a private network base station. For example, in a scenario, the first apparatus is a public network base station, and the second apparatus is a private network base station. In another scenario, the second apparatus is a public network base station, and the first apparatus is a private network base station.

Figure 7:
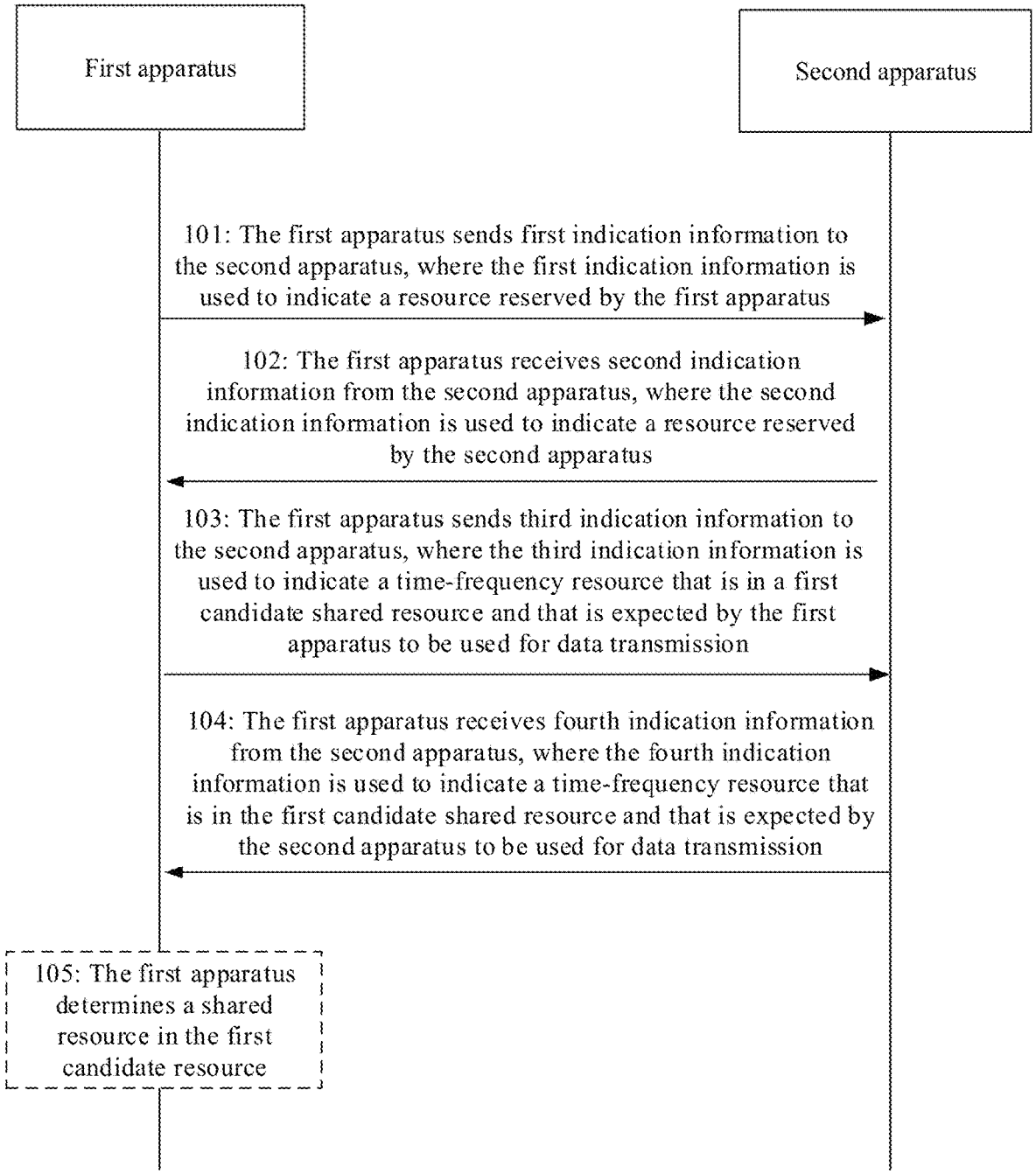
FIG. 7 is a flowchart of a resource sharing method according to an embodiment of this application.

As shown in FIG. 7, an embodiment of this application provides a resource sharing method and apparatus. The method may include at least the following operations.

Operation 101: A first apparatus sends first indication information to a second apparatus.

The first indication information is used to indicate a resource reserved by the first apparatus. For example, the reserved resource is used to transmit important signals such as a PSS, an SSS, a PBCH, a common PDCCH, and a PRACH. Because a resource used to transmit an important signal is not shared with the second apparatus, the first apparatus needs to reserve the reserved resource, and notify the second apparatus of the reserved resource.

In an example, the first indication information is used to indicate a frequency domain resource of a first initial bandwidth part BWP, the frequency domain resource of the first initial BWP is a resource that is not shared between the first apparatus and the second apparatus, and the frequency domain resource of the first initial BWP is a part of a first candidate shared resource of the first apparatus and the second apparatus. The first candidate shared resource is a common resource or a common bandwidth that can be used by the first apparatus and the second apparatus.

In a possible design, the resource of the first initial BWP includes the resource reserved by the first apparatus. When the resource of the first initial BWP is reserved, the resource that is reserved by the first apparatus and that is included in the resource of the first initial BWP is also reserved. Therefore, the resource of the first initial BWP is indicated, to indicate to reserve the reserved resource of the first apparatus. Further, in a process of indicating the resource of the first initial BWP, a time domain position of an initial BWP may be usually configured flexibly, for example, configured to be an entire time domain resource. Therefore, in this embodiment, the first indication information only needs to be used to indicate a frequency domain position of the first initial BWP.

Figure 8:
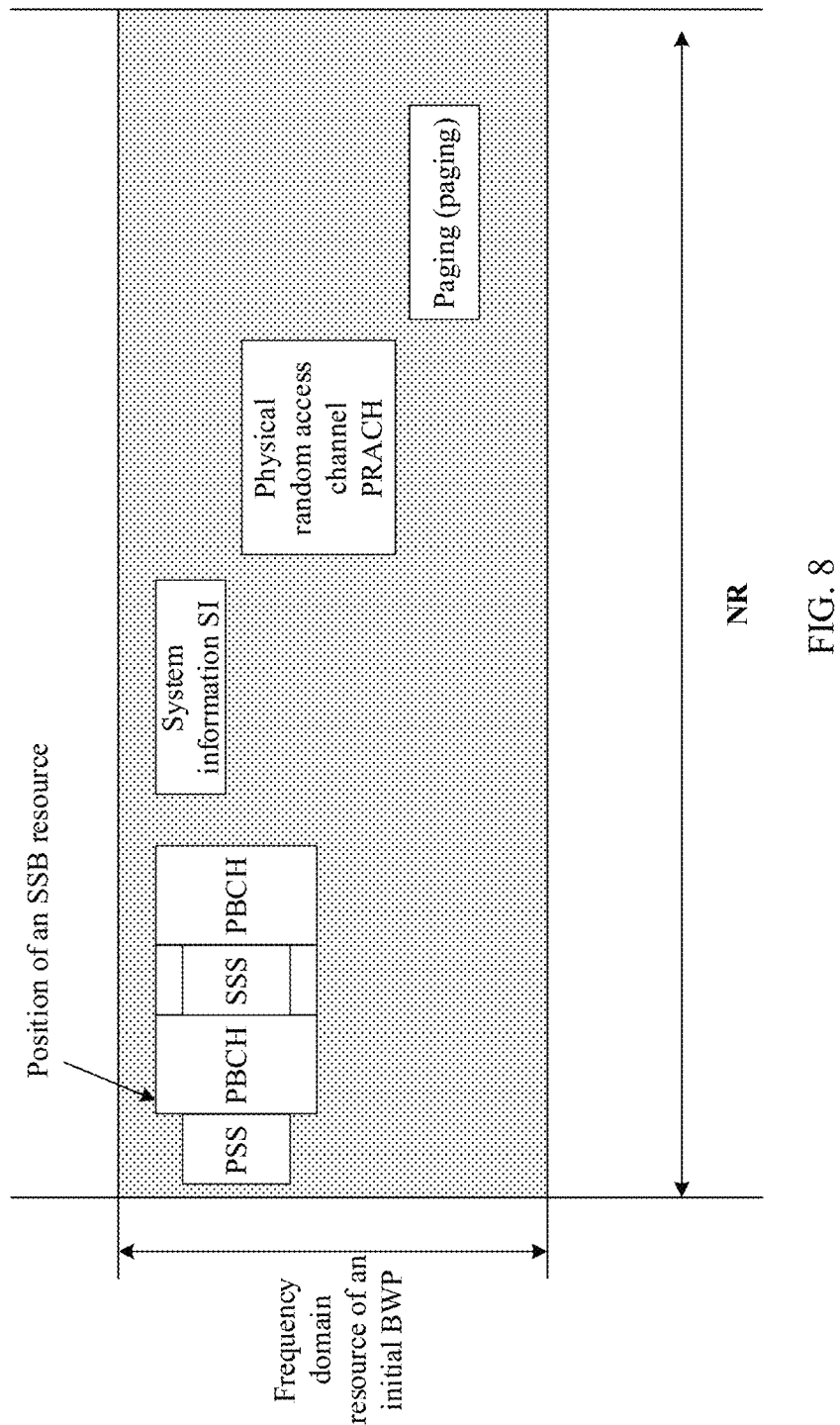
FIG. 8 is a schematic diagram of indicating a frequency domain resource by using an initial BWP according to an embodiment of this application.

For example, in an NR system, a resource of an initial BWP includes a reserved resource, for example, a PSS, an SSS, a PBCH (namely, an SSB), a common PDCCH, or a PRACH. Therefore, the initial BWP may be used to indicate all frequency domain positions of these reserved resources. Referring to FIG. 8, the resource reserved by the first apparatus further includes a resource used by the first apparatus to send a system message SI and a paging message, and the resource may be on a common PDCCH resource.

Operation 102: The first apparatus receives second indication information from the second apparatus.

The second indication information is used to indicate a resource reserved by the second apparatus. For a description of the reserved resource, refer to operation 101. The second apparatus needs to reserve the resource reserved by the second apparatus, and notify the first apparatus of the reserved resource.

In an example, the second indication information is used to indicate a frequency domain resource of a second initial BWP, the frequency domain resource of the second initial BWP is a resource that is not shared between the second apparatus and the first apparatus, and the frequency domain resource of the second initial BWP is a part of the first candidate shared resource. In a possible design, the resource of the second initial BWP includes the resource reserved by the second apparatus.

In an embodiment, when the second indication information indicates the frequency domain resource of the second initial BWP, in a possible case, the frequency domain resource of the first initial BWP and the frequency domain resource of the second initial BWP do not overlap. To be specific, there is no overlapping spectrum resource that is in the first candidate shared resource and that is between the frequency domain resource that is of the first initial BWP and that is indicated by the first apparatus and the frequency domain resource that is of the second initial BWP and that is indicated by the second apparatus.

In an example, the first indication information and the second indication information are also referred to as reserved resource indication information.

Operation 103: The first apparatus sends third indication information to the second apparatus, where the third indication information is used to indicate a time-frequency resource that is in the first candidate shared resource and that is expected by the first apparatus to be used for data transmission.

Figure 9A:
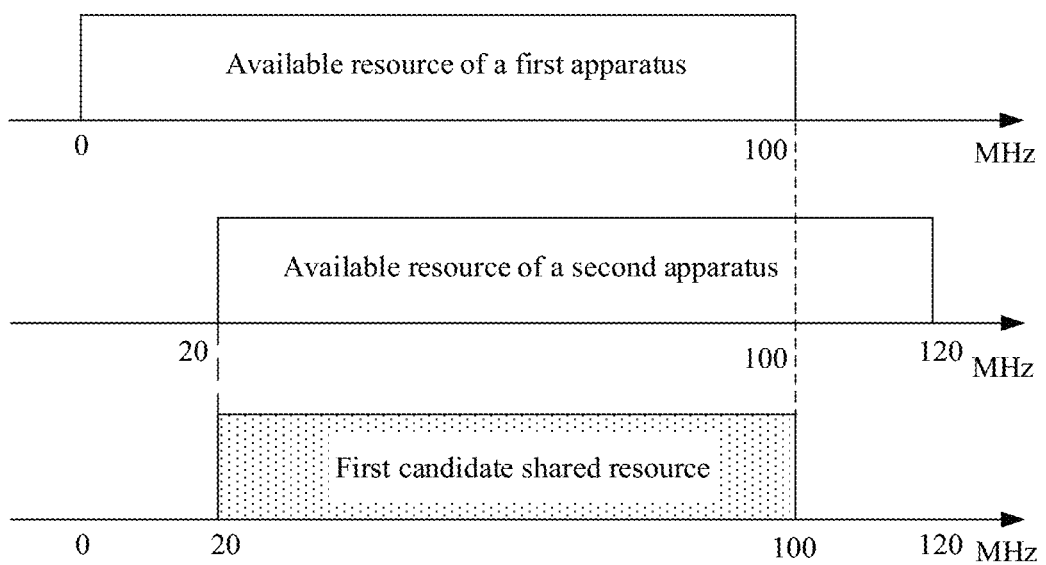
FIG. 9a is a schematic diagram of determining a first candidate shared resource according to an embodiment of this application.
Figure 9B:
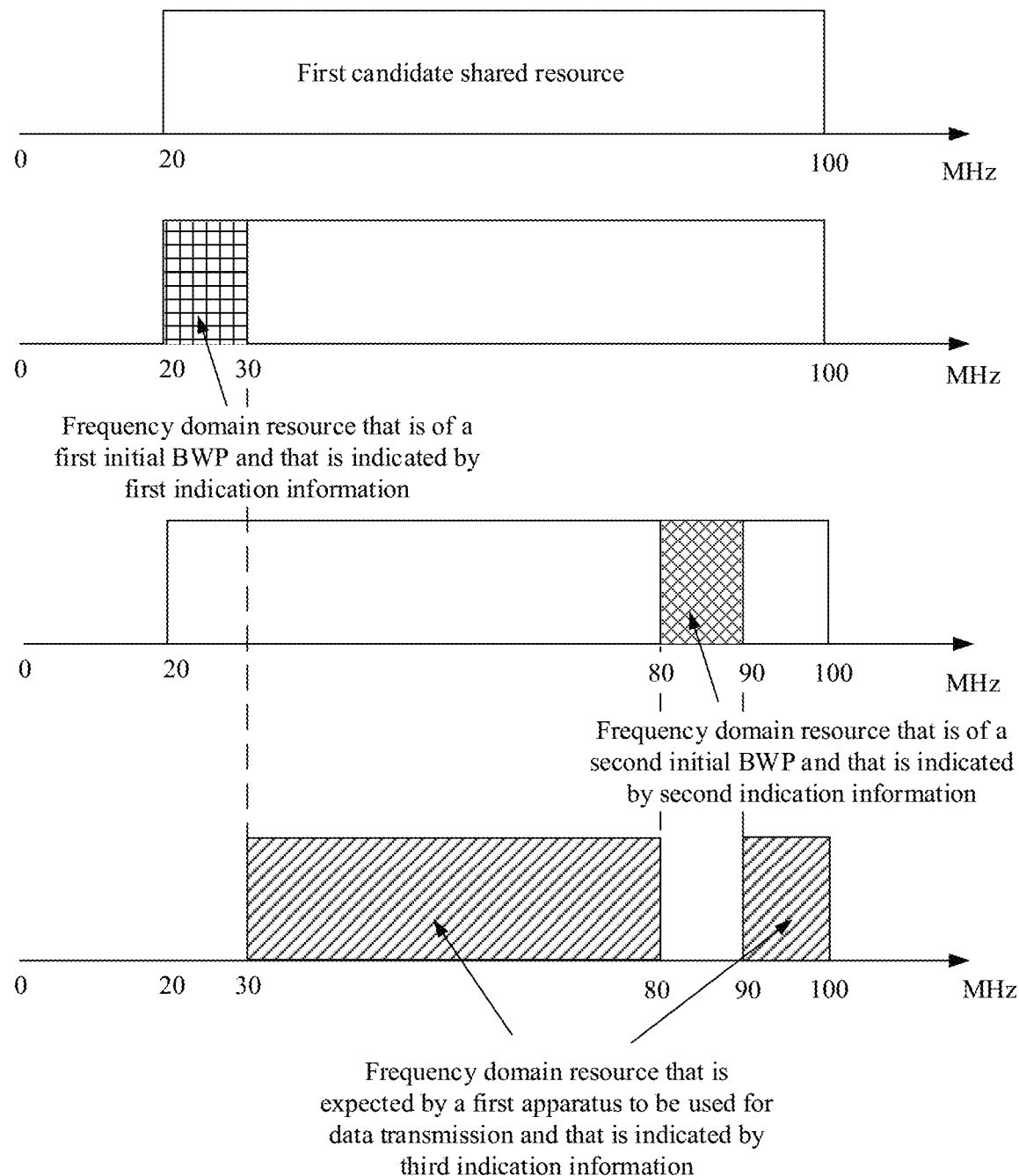
FIG. 9b is a schematic diagram of determining third indication information according to an embodiment of this application.

For example, the first candidate shared resource is an intersection of an available resource of the first apparatus and an available resource of the second apparatus. In an embodiment, the first candidate shared resource may be a full bandwidth of the first apparatus, a full bandwidth of the second apparatus, or a common bandwidth of the first apparatus and the second apparatus. As shown in FIG. 9*a*, the available resource of the first apparatus ranges from 0 megahertz (MHz) to 100 megahertz, the available resource of the second apparatus ranges from 20 MHz to 120 MHz, and a first candidate shared resource of the first apparatus and the second apparatus ranges from 20 MHz to 100 MHz. In addition, as shown in FIG. 9*b*, in the first candidate shared resource 20 MHz to 100 MHz, the frequency domain resource that is of the first initial BWP and that is indicated by the first indication information ranges from 20 MHz to 30 MHz, and the frequency domain resource of the first initial BWP is a part of the first candidate shared resource. The frequency domain resource that is of the second initial BWP and that is indicated by the second indication information ranges from 80 MHz to 90 MHz, and is also a part of the first candidate shared resource.

The time-frequency resource indicated by the third indication information may be a part or all of a resource that remains after the frequency domain resource of the first initial BWP is removed from the first candidate shared resource. Alternatively, the time-frequency resource indicated by the third indication information is a part or all of a resource that remains after the frequency domain resource of the first initial BWP and the frequency domain resource of the second initial BWP are removed from the first candidate shared resource.

In an embodiment, the time-frequency resource that is expected by the first apparatus to be used for data transmission and that is indicated by the third indication information does not include the frequency domain resource of the first initial BWP and the frequency domain resource of the second initial BWP.

After receiving the third indication information, the second apparatus calculates resource allocation of the first apparatus based on the time-frequency resource that is expected by the first apparatus to be used for data transmission and that is indicated by the third indication information and a first reserved resource of the first apparatus. When content indicated by latest received third indication information conflicts with a latest received first reserved resource, the second apparatus preferentially considers the first reserved resource. That the content indicated by the third indication information conflicts with the latest received first reserved resource means that the time-frequency resource that is expected to be used for data transmission and that is indicated by the third indication information overlaps the first reserved resource. In this case, that the second apparatus preferentially considers the first reserved resource means that the second apparatus uses the latest received reserved resource indication to calculate the resource allocation of the first apparatus.

For example, if a latest time-frequency resource that is expected by the first apparatus to be used for data transmission and that is received by the second apparatus ranges from 20 MHz to 60 MHz, and a latest reserved resource of the first apparatus ranges from 20 MHz to 30 MHz, when the second apparatus calculates the resource allocation of the first apparatus, the second apparatus considers that the reserved resource of the first apparatus ranges from 20 MHz to 30 MHz, and the time-frequency resource that is expected by the first apparatus to be used for data transmission ranges from 30 MHz to 60 MHz.

Operation 103 includes the following implementations:

In a first implementation, the third indication information indicates that the frequency domain resource that is expected by the first apparatus to be used for data transmission is a resource that remains after the indicated frequency domain resource 20 MHz to 30 MHz of the first initial BWP and the indicated frequency domain resource 80 MHz to 90 MHz of the second initial BWP are removed from the first candidate shared resource, and the resource that remains includes 30 MHz to 80 MHz and 90 MHz to 100 MHz, as shown in FIG. 9b. In an embodiment, the frequency domain resource that is expected by the first apparatus to be used for data transmission may alternatively be a part of the resource that remains, for example, 30 MHz to 50 MHz or 90 MHz to 100 MHz.

In a second implementation, the frequency domain resource that is expected by the first apparatus to be used for data transmission may alternatively be a resource that remains after the indicated frequency domain resource of the first initial BWP is removed from the first candidate shared resource, for example, a resource that remains after the frequency domain resource 20 MHz to 30 MHz indicated by the first indication information is removed from 20 MHz to 100 MHz, namely, 30 MHz to 100 MHz, or may be a part of the resource that remains, for example, 30 MHz to 50 MHz.

In a third implementation, the frequency domain resource that is expected by the first apparatus to be used for data transmission may alternatively be all or a part of the first candidate shared resource, for example, a resource in 20 MHz to 100 MHz, or may be a part of 20 MHz to 100 MHz, for example, 30 MHz to 60 MHz.

In the foregoing implementation, the frequency domain resource that is expected by the first apparatus to be used for data transmission may be continuous in frequency domain or discontinuous in frequency domain. This is not limited herein.

In addition, after operation 101 to operation 103, the method further includes:

Operation 104: The first apparatus receives fourth indication information from the second apparatus, where the fourth indication information is used to indicate a time-frequency resource that is in the first candidate shared resource and that is expected by the second apparatus to be used for data transmission.

An overlapping resource may or may not exist between the time-frequency resource that is expected by the second apparatus to be used for data transmission and the time-frequency resource that is expected by the first apparatus to be used for data transmission.

The time-frequency resource indicated by the fourth indication information may be a part or all of a resource that remains after the frequency domain resource of the second initial BWP is removed from the first candidate shared resource; may be a part or all of a resource that remains after the frequency domain resource of the first initial BWP and the frequency domain resource of the second initial BWP are removed from the first candidate shared resource; or may be a part or all of a resource that remains after the frequency domain resource of the first initial BWP, the frequency domain resource of the second initial BWP, and the resource indicated by the third indication information are removed from the first candidate shared resource.

In an example, the second apparatus determines that the frequency domain resource that is expected by the second apparatus to be used for data transmission is a resource that remains after the frequency domain resource 20 MHz to 30 MHz of the first initial BWP and the indicated frequency domain resource 80 MHz to 90 MHz of the second initial BWP are removed from the first candidate shared resource 20 MHz to 100 MHz, and the resource that remains includes 30 MHz to 80 MHz and 90 MHz to 100 MHz.

In an example, the second apparatus determines that the frequency domain resource that is expected by the second apparatus to be used for data transmission is indicated in the first candidate shared resource 20 MHz to 100 MHz.

Figure 9C:
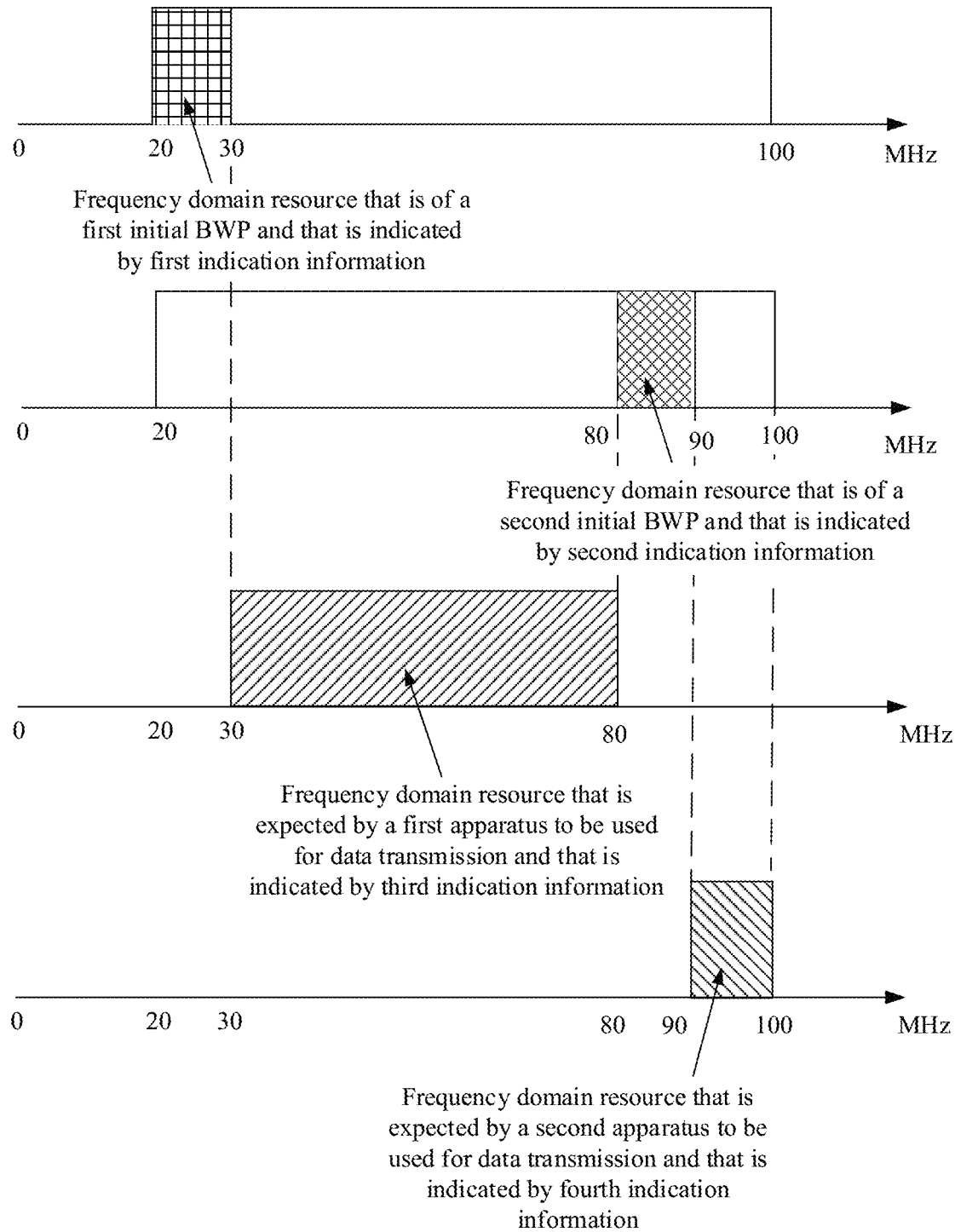
FIG. 9c is a schematic diagram of determining fourth indication information according to an embodiment of this application.

In an example, when the frequency domain resource that is expected by the first apparatus to be used for data transmission does not overlap the frequency domain resource that is expected by the second apparatus to be used for data transmission, a process in which the second apparatus determines the fourth indication information is shown in FIG. 9c. The frequency domain resource of the first initial BWP ranges from 20 MHz to 30 MHz, the frequency domain resource of the second initial BWP ranges from 80 MHz to 90 MHz, and the frequency domain resource that is expected by the first apparatus to be used for data transmission ranges from 30 MHz to 80 MHz. In this case, the second apparatus determines that the frequency domain resource that is expected by the second apparatus to be used for data transmission ranges from 90 MHz to 100 MHz, to be specific, a resource that remains after 20 MHz to 30 MHz, 80 MHz to 90 MHz, and 30 MHz to 80 MHz are removed from the first candidate shared resource 20 MHz to 100 MHz.

Figure 9D:
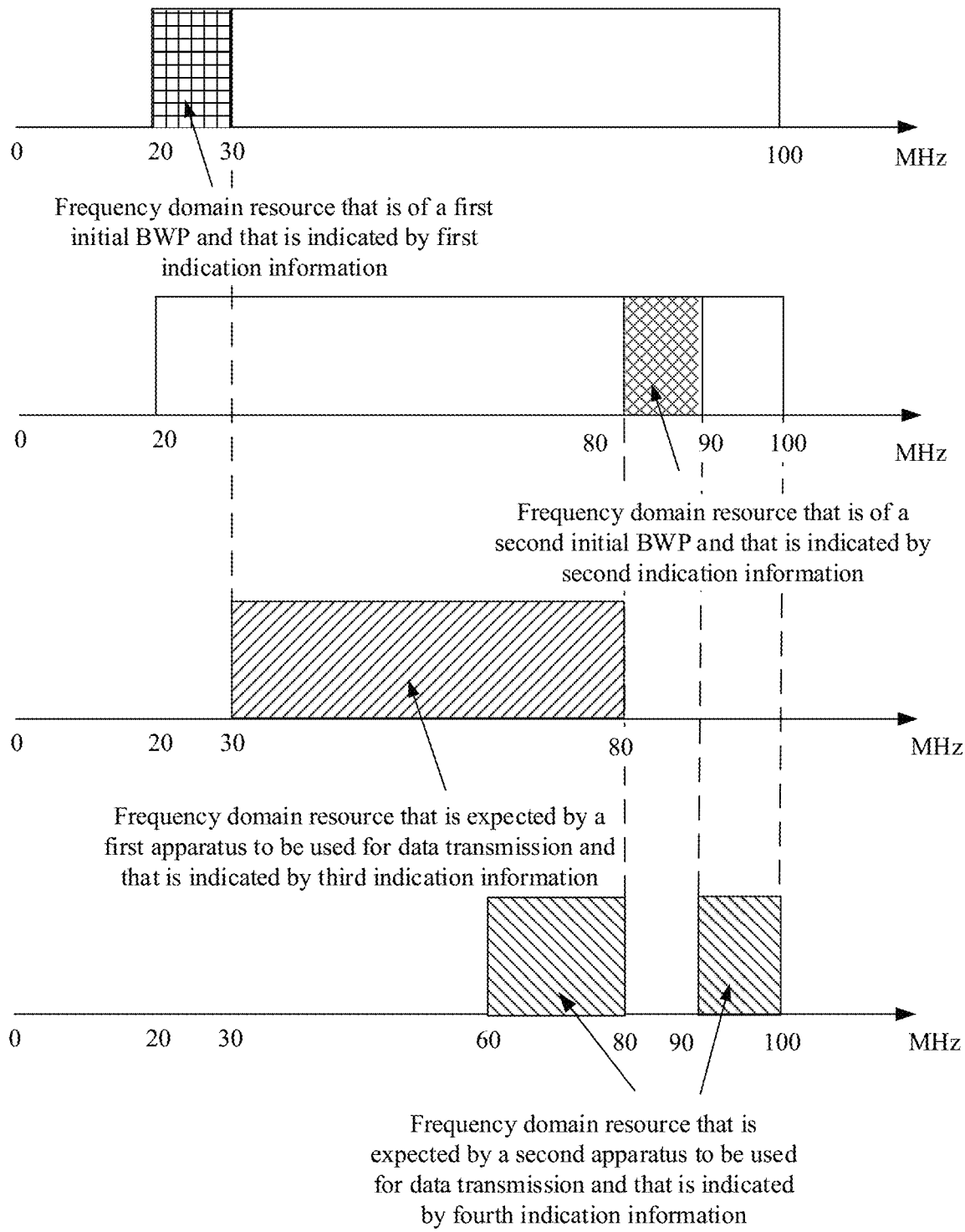
FIG. 9d is another schematic diagram of determining fourth indication information according to an embodiment of this application.

In an example, when there is an overlapping resource between the frequency domain resource that is expected by the first apparatus to be used for data transmission and the frequency domain resource that is expected by the second apparatus to be used for data transmission, a process in which the second apparatus determines the fourth indication information is shown in FIG. 9d. The frequency domain resource of the first initial BWP ranges from 20 MHz to 30 MHz, the frequency domain resource of the second initial BWP ranges from 80 MHz to 90 MHz, the frequency domain resource that is expected by the first apparatus to be used for data transmission ranges from 30 MHz to 80 MHz, and the second apparatus finds that the resource that is expected by the second apparatus to be used for data transmission overlaps the resource that is expected by the first apparatus to be used for data transmission, for example, the overlapping resource ranges from 40 MHz to 80 MHz. In this case, to avoid a conflict, the second apparatus may indicate that the second apparatus expects to occupy a part, for example, 50%, of the overlapping resource. In this example, it is assumed that the second apparatus expects to occupy 60 MHz to 80 MHz in the overlapping resource 40 MHz to 80 MHz plus a resource 90 MHz to 100 MHz that does not overlap the resource of the first apparatus. Therefore, it is learned that the frequency domain resource that is expected by a second resource to be used for data transmission in the fourth indication information ranges from 60 MHz to 80 MHz and from 90 MHz to 100 MHz.

It should be noted that, in this example, for occupation of an overlapping part of an expected resource, the second apparatus may determine, based on a current service requirement or based on another condition, a size of a part that is of the overlapping resource and that is expected to be occupied. This is not limited in this embodiment.

In addition, it should be noted that, in this embodiment, an execution sequence of operations 101 and 102 is not limited, and an execution sequence of operations 103 and 104 is also not limited.

For example, when operation 101 is performed before operation 102, to be specific, the first apparatus receives the second indication information sent by the second apparatus, then configures the first indication information, where the frequency domain resource that is of the first initial BWP and that is indicated by the first indication information does not overlap the frequency domain resource that is of the second initial BWP and that is indicated by the second indication information, and finally sends the first indication information to the second apparatus.

It should be understood that, after performing operations 101 and 102, the first apparatus may perform operation 104 before operation 103, the first apparatus may determine, based on the frequency domain resource of the first initial BWP, the frequency domain resource that is of the second initial BWP and that is indicated by the second indication information, and the fourth indication information, the resource that is expected by the first apparatus to be used for data transmission, and send the resource to the second apparatus by using the third indication information.

Figure 9E:
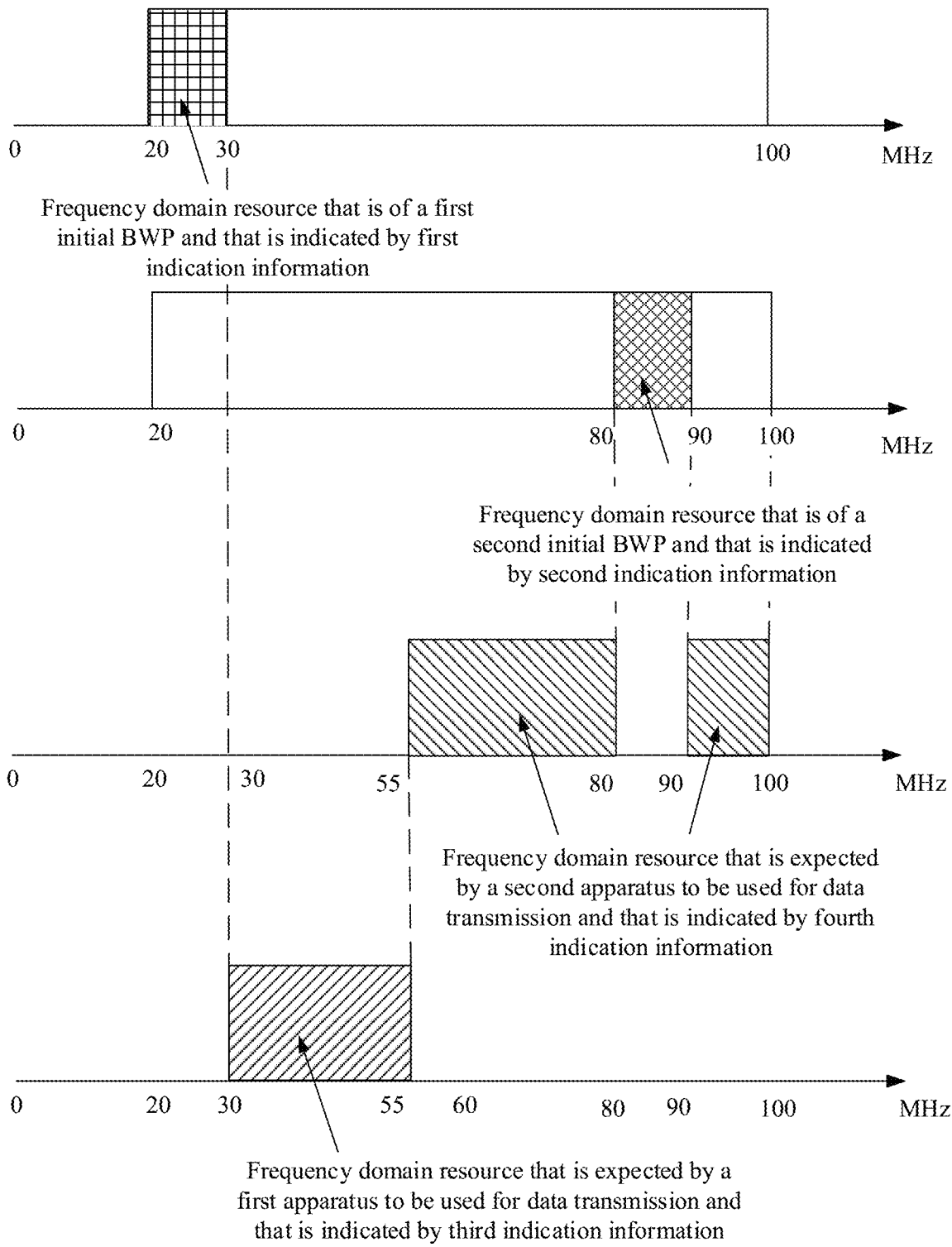
FIG. 9e is another schematic diagram of determining third indication information according to an embodiment of this application.

In an example, as shown in FIG. 9e, the frequency domain resource of the first initial BWP ranges from 20 MHz to 30 MHz, the frequency domain resource that is of the second initial BWP and that is indicated by the second indication information ranges from 80 MHz to 90 MHz, and the frequency domain resource that is expected by the second apparatus to be used for data transmission and that is indicated by the fourth indication information ranges from 55 MHz to 80 MHz and from 90 MHz to 100 MHz. The first apparatus determines that the frequency domain resource that is expected by the first apparatus to be used for data transmission ranges from 30 MHz to 55 MHz. 30 MHz to 55 MHz are a resource that remains after 20 MHz to 30 MHz, 80 MHz to 90 MHz, and a partial resource 55 MHz to 80 MHz and 90 MHz to 100 MHz in the fourth indication information are removed from the first candidate shared resource 20 MHz to 100 MHz. The partial resource 55 MHz to 80 MHz may be determined based on a service requirement of the first apparatus or the second apparatus. This is not limited in this example.

In this embodiment of this application, the resource indicated by the third indication information is determined by the first apparatus based on a requirement of a service of the first apparatus for the shared resource. The resource indicated by the fourth indication information is determined by the second apparatus based on a requirement of a service of the second apparatus for the shared resource. A specific process in which the first apparatus determines the third indication information and a specific process in which the second apparatus determines the fourth indication information are not limited in this embodiment of this application.

In this manner in this embodiment of this application, the first apparatus and the second apparatus uniformly indicate all resource positions of initial BWPs by using the first indication information and the second indication information. Because a frequency domain resource of the initial BWP includes at least one type of reserved resource, all the reserved resources are indicated by using the initial BWP. Compared with a manner in which a specific position and a size of each resource are carried in indication information, this manner is simple and easy to implement, and signaling interaction overheads are reduced.

In addition, the time-frequency resource that is expected by the first apparatus to be used for data transmission and the time-frequency resource that is expected by the second apparatus to be used for data transmission are respectively indicated by using the third indication information and the fourth indication information, so that the two apparatuses mutually learn of a resource that is expected by a peer end to be used, to provide a basis for proper allocation of an actual shared resource of the two apparatuses. In this method, apparatuses at two ends exchange indication signaling in real time, to implement efficient sharing of a spectrum resource between the first apparatus and the second apparatus.

In an embodiment, after operation 101 to operation 104, the method further includes:

Operation 105: The first apparatus determines a shared resource in the first candidate shared resource, where the shared resource is a resource actually shared by the first apparatus.

The shared resource is a part or all of a resource that is actually available for transmission and that is determined by the first apparatus from the first candidate shared resource based on the first initial BWP, the resource that is expected by the first apparatus to be used for data transmission, the second initial BWP, and the resource that is expected by the second apparatus to be used for data transmission.

In an embodiment, the first apparatus determines the shared resource of the first apparatus in the first candidate shared resource based on the first initial BWP, the second initial BWP, and the time-frequency resource that is expected by the second apparatus to be used for data transmission.

Figure 10A:
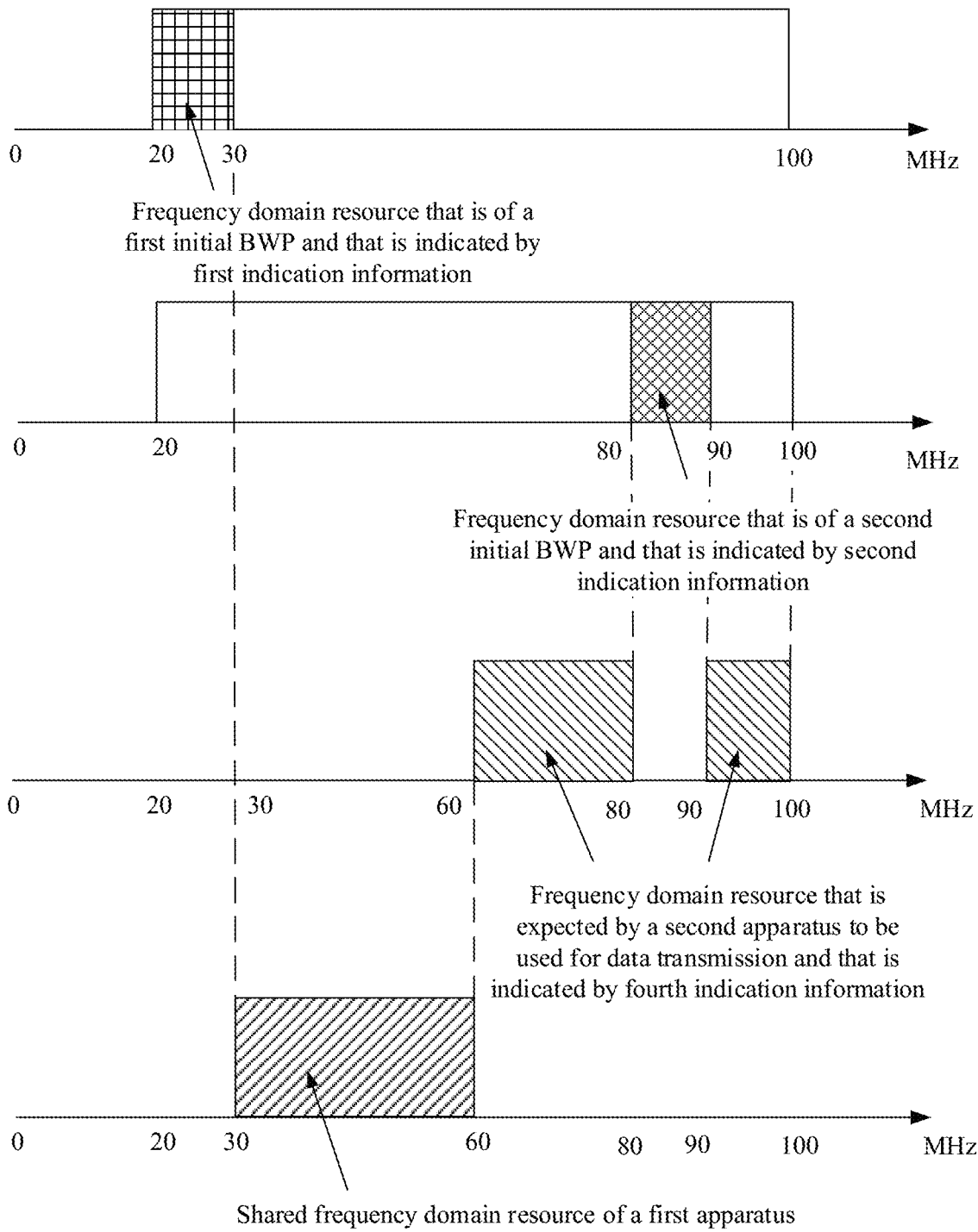
FIG. 10a is a schematic diagram of determining a shared frequency domain resource of a first apparatus according to an embodiment of this application.

As shown in FIG. 10a, the frequency domain resource of the first initial BWP ranges from 20 MHz to 30 MHz, the frequency domain resource of the second initial BWP ranges from 80 MHz to 90 MHz, and the frequency domain resource that is expected by the second apparatus to be used for data transmission and that is indicated by the fourth indication information ranges from 60 MHz to 80 MHz and from 90 MHz to 100 MHz. In this case, the shared frequency domain resource that is of the first apparatus and that is determined from the first candidate shared resource ranges from 30 MHz to 60 MHz, to be specific, a resource that remains after 20 MHz to 30 MHz, 80 MHz to 90 MHz, 60 MHz to 80 MHz, and 90 MHz to 100 MHz are removed from the first candidate shared resource 20 MHz to 100 MHz.

In an embodiment, the first apparatus determines the shared resource of the first apparatus in the first candidate shared resource based on the first initial BWP, the second initial BWP, the time-frequency resource that is expected by the first apparatus to be used for data transmission, and the time-frequency resource that is expected by the second apparatus to be used for data transmission.

Figure 10B:
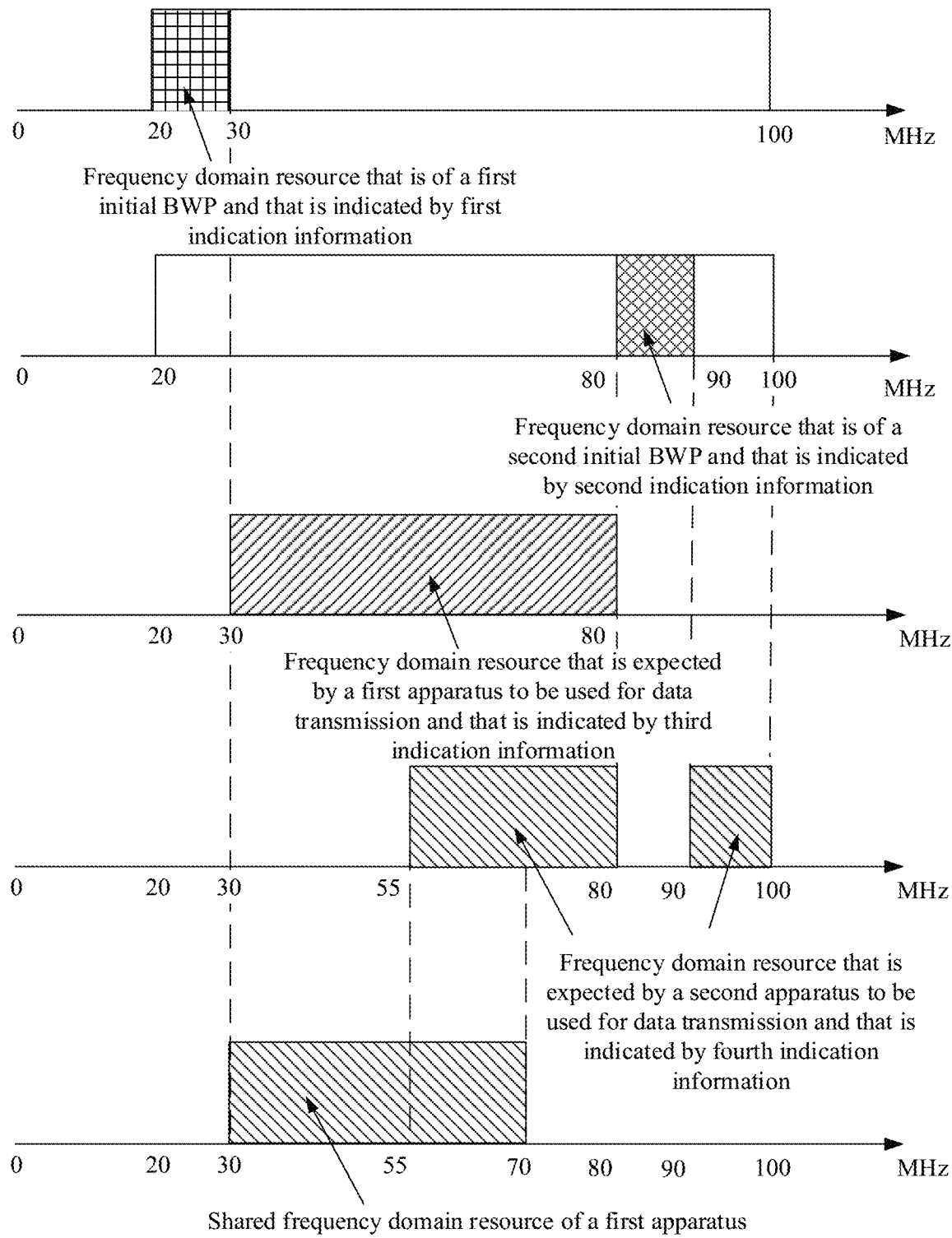
FIG. 10b is another schematic diagram of determining a shared frequency domain resource of a first apparatus according to an embodiment of this application.

As shown in FIG. 10b, the frequency domain resource of the first initial BWP ranges from 20 MHz to 30 MHz, the frequency domain resource of the second initial BWP ranges from 80 MHz to 90 MHz, the frequency domain resource that is expected by the first apparatus to be used for data transmission ranges from 30 MHz to 80 MHz, and the frequency domain resource that is expected by the second apparatus to be used for data transmission and that is indicated by the fourth indication information ranges from 55 MHz to 80 MHz and from 90 MHz to 100 MHz. In this case, there is an overlapping resource between the resources that are respectively expected by the first apparatus and the second apparatus to be used for data transmission. The overlapping resource ranges from 55 MHz to 80 MHz. For the overlapping resource, the first apparatus may occupy a part of the overlapping resource based on a service requirement, for example, occupy 55 MHz to 70 MHz, plus a non-overlapping resource 30 MHz to 55 MHz. Finally, it is determined that a shared frequency domain resource of the first apparatus in the first candidate shared resource ranges from 30 MHz to 70 MHz.

Correspondingly, the method further includes: The second apparatus determines the shared resource of the second apparatus in the first candidate shared resource based on at least one of the first indication information and the third indication information that are sent by the first apparatus, the second initial BWP, and the time-frequency resource that is expected by the second apparatus to be used for data transmission. The determined shared resource is a resource that is actually shared by the first apparatus. For a specific determining process, refer to the description of operation 105 in which the first apparatus determines a shared resource in the first candidate shared resource. Details are not described herein again.

In this embodiment, a spectrum resource sharing method is provided for a shared resource of the first apparatus and the second apparatus. An interaction procedure and interaction information between the first apparatus and the second apparatus are designed. For example, indication information includes an initial BWP or SSB resource position information, or includes the resources that are respectively expected by the first apparatus and the second apparatus to be used for data transmission, so that the first apparatus and the second apparatus mutually learn of a resource that is expected by a peer end to be used, to implement efficient spectrum sharing between the two apparatuses.

The following describes in detail content carried in the first indication information, the second indication information, the third indication information, and the fourth indication information, and a specific indication manner in this embodiment of this application.

That the first indication information is used to indicate the frequency domain resource of the first initial BWP in operation 101 includes: The first indication information is used to indicate at least one of a frequency domain start position of the first initial BWP, a frequency domain end position of the first initial BWP, and a frequency domain width of the first initial BWP.

That the second indication information is used to indicate the frequency domain resource of the second initial BWP in operation 102 includes: The second indication information is used to indicate at least one of a frequency domain start position of the second initial BWP, a frequency domain end position of the second initial BWP, and a frequency domain width of the second initial BWP.

The first indication information sent by the first apparatus in operation 101 is used as an example. A process in which the second apparatus determines the frequency domain resource of the first initial BWP based on the first indication information sent by the first apparatus includes:

In an implementation, when the first indication information includes only one of the foregoing three parameters, the second apparatus determines the frequency domain resource of the first initial BWP based on one parameter carried in current first indication information and at least one another parameter obtained in another manner. The second apparatus obtains the frequency domain start position of the first initial BWP based on the first indication information, and then determines the frequency domain resource of the first initial BWP based on at least one of the frequency domain end position and the frequency domain width that are of the first initial BWP and that are sent by the first apparatus or that are obtained through calculation based on another supplementary parameter. For example, the first indication information indicates that the frequency domain start position of the first initial BWP is 2600 MHz, and then the second apparatus finally determines, based on a frequency domain width agreed on with the first apparatus, for example, 400 MHz, that the frequency domain resource of the first initial BWP ranges from 2600 MHz to 3000 MHz.

In another implementation, when the first indication information includes the foregoing two or three types of parameters, the second apparatus determines the frequency domain resource of the first initial BWP based on any two types of parameters carried in the first indication information. When the first indication information includes two types of parameters: the frequency domain start position and the frequency domain width of the first initial BWP, it is determined that the frequency domain end position of the first initial BWP is equal to the frequency domain start position of the first initial BWP plus the frequency domain width. Further, it may be determined that the frequency domain resource of the first initial BWP is a range from the frequency domain start position of the first initial BWP to the frequency domain end position. For example, if the first indication information received by the second apparatus indicates that the frequency domain start position of the first initial BWP is 2600 MHz and the frequency domain end position is 3000 MHz, the second apparatus may determine that a frequency domain resource range that is of the first initial BWP and that is indicated by the first apparatus is from 2600 MHz to 3000 MHz.

In content included in the first indication information, the frequency domain start position of the first initial BWP or the frequency domain start position of the second initial BWP may be indicated by using an absolute frequency. For example, the absolute frequency is 2600 MHz. Alternatively, the frequency domain start position of the first initial BWP or the frequency domain start position of the second initial BWP may be indicated by using an index identifier, for example, an identifier predetermined in a protocol, for example, a subcarrier index or a resource block index (RB index).

For example, when the frequency domain start position of the first initial BWP is the same as a position corresponding to an RB index identifier, the first indication information is configured to carry the RB index identifier. For example, when the first indication information carries indication information whose RB index is 10, the second apparatus determines, based on the RB index 10, a prestored correspondence between an RB index identifier and a start position of an initial BWP, and a case in which a frequency corresponding to the RB index 10 is 2700 MHz, that the start position of the first initial BWP is 2700 MHz.

It may be understood that the frequency domain end position of the first initial BWP and the frequency domain end position of the second initial BWP may also be indicated by using an absolute frequency. For example, the absolute frequency is 2620 MHz. Alternatively, the frequency domain end position is determined by adding a frequency domain start position of an initial BWP and the frequency domain bandwidth. Further, the frequency domain bandwidth may be determined based on a quantity of RBs and an absolute value of an occupied frequency domain resource. For example, if the first indication information indicates that the frequency domain bandwidth occupies a total of five RBs, and a frequency domain resource occupied by each RB is a fixed value, for example, 180 kHz, it is determined that the frequency domain width is 5×180 kHz=900 kHz.

In this embodiment, the first indication information carries at least one of the frequency domain start position of the first initial BWP, the frequency domain end position, and the frequency domain width, to indicate the frequency domain resource of the first initial BWP, so as to achieve a beneficial effect of high indication efficiency and low overheads.

Figure 11A:
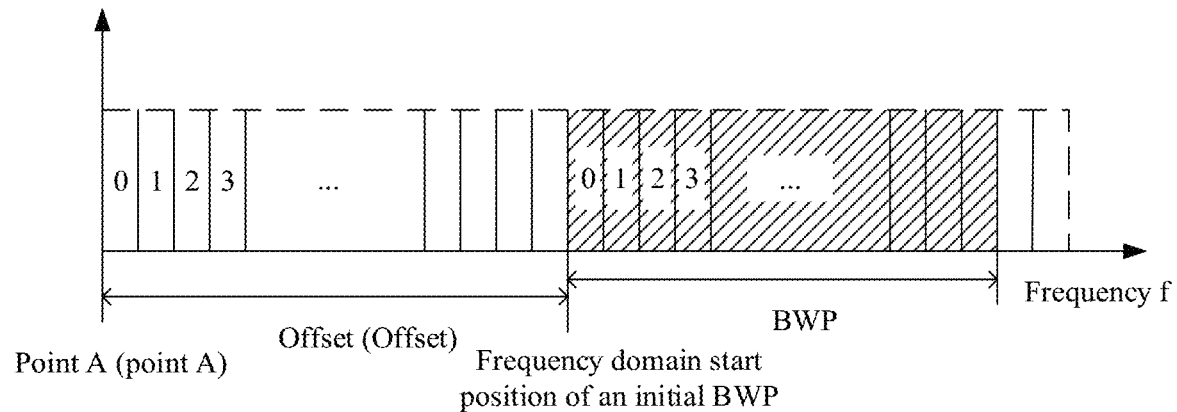
FIG. 11a is a schematic diagram of indicating a frequency domain resource start position of an initial BWP according to an embodiment of this application.

Further, when the frequency domain position of the first initial BWP is indicated, the frequency domain position of the first initial BWP may alternatively be indirectly indicated by using a supplementary parameter. The frequency domain start position of the first initial BWP is determined in Manner 1 or Manner 2:

Manner 1: Determine the frequency domain start position of the first initial BWP based on a start position of a first downlink bandwidth and an offset between a frequency domain start position of the first downlink bandwidth and the frequency domain start position of the first initial BWP. For example, as shown in FIG. 11a, it is assumed that the start position of the first downlink bandwidth is a point A, and an offset between the frequency domain start position of the first downlink bandwidth and the frequency domain start position of the initial BWP is an offset between the point A and the frequency domain start position of the first initial BWP. The frequency domain start position of the first initial BWP is a position obtained after the offset is added to a position of the point A.

In other words, the frequency domain start position of the first initial BWP=point A+offset.

Figure 11B:
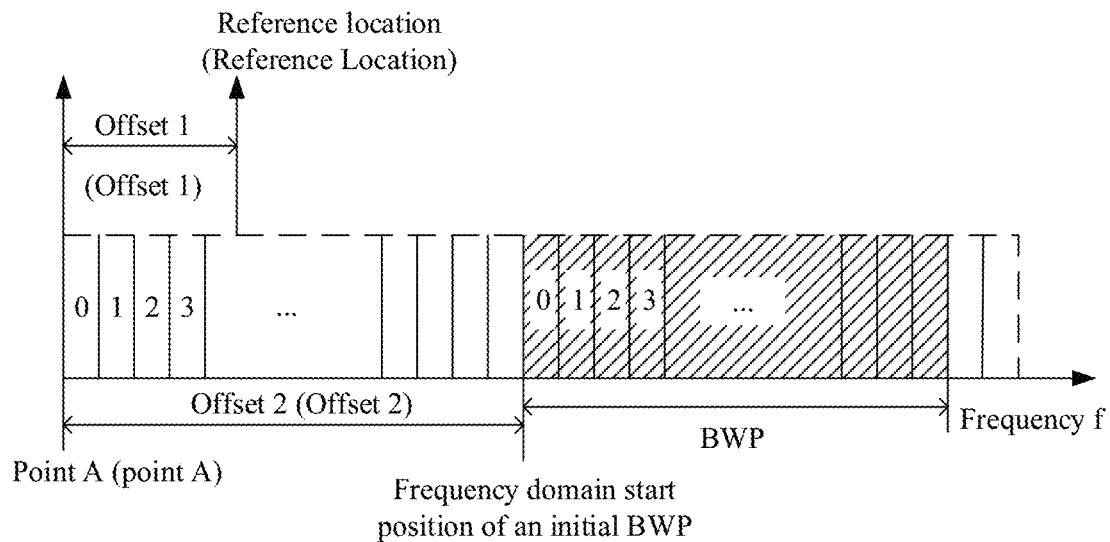
FIG. 11b is another schematic diagram of indicating a frequency domain resource start position of an initial BWP according to an embodiment of this application.

Manner 2: Determine the frequency domain start position of the first initial BWP based on a frequency domain start position of a synchronous broadcast block SSB, an offset between the frequency domain start position of the SSB and a frequency domain start position of a first downlink bandwidth, and an offset between the frequency domain start position of the first downlink bandwidth and the frequency domain start position of the first initial BWP. For example, as shown in FIG. 11b, it is assumed that the frequency domain start position of the SSB is a reference location, an offset between the frequency domain start position of the SSB and the frequency domain start position of the first downlink bandwidth is an offset 1, and the offset between the frequency domain start position of the first downlink bandwidth and the frequency domain start position of the first initial BWP is an offset 2. The frequency domain start position of the first initial BWP is a position obtained after the offset 1 and the offset 2 are added to the position of the point A.

In other words, the frequency domain start position of the first initial BWP=reference location−offset 1+offset 2.

It should be noted that a value of each of the offset, the offset 1, and the offset 2 may be a positive number or a negative number. The position of the reference point the point A or the reference location may be specified in a protocol, or may be notified to each other through signaling between two apparatuses. The first downlink bandwidth is a system bandwidth corresponding to the first apparatus.

In addition, the frequency domain start position of the second initial BWP is determined in Manner 3 or Manner 4:

Manner 3: Determine the frequency domain start position of the second initial BWP based on a frequency domain start position of a second downlink bandwidth and an offset between the frequency domain start position of the second downlink bandwidth and the frequency domain start position of the second initial BWP; and Manner 4: Determine the frequency domain start position of the second initial BWP based on a frequency domain start position of an SSB, an offset between the frequency domain start position of the SSB and a frequency domain start position of a second downlink bandwidth, and an offset between the frequency domain start position of the second downlink bandwidth and the frequency domain start position of the second initial BWP.

Detemining processes in Manner 3 and Manner 4 are the same as those in Manner 1 and Manner 2. Details are not described herein again in this embodiment. The second downlink bandwidth is a system bandwidth corresponding to the second apparatus.

It should be understood that, in operation 102, a method in which the second apparatus determines the frequency domain start position of the second initial BWP is similar to the foregoing method for determining the frequency domain start position of the first initial BWP. Details are not described herein in this embodiment.

In an example, a frequency domain bandwidth of the initial BWP may be determined based on a resource indication value (RIV) corresponding to a position and a bandwidth (location and Bandwidth) and according to the following formula:

$$RIV1 = N_{BWP}^{size} \times (L_{RBs}-1) + RB_{start} \quad \text{(Formula 1)}$$

Herein, $L_{RBs}$ represents a quantity of continuous RBs occupied by the frequency domain width of the initial BWP, $RB_{start2}$ is a start resource block position of the initial BWP, and $N_{BWP}^{size}$ represents a quantity of RBs. Further, the quantity $N_{BWP}^{size}$ of RBs is a quantity of all RBs included in a downlink bandwidth, and the quantity $N_{BWP}^{size}$ of RBs may be configured.

In an embodiment, the RIV is defined as follows:

$$\text{If } (L_{RBs}-1) \leq \lfloor N_{BWP}^{size}/2 \rfloor, RIV1 = N_{BWP}^{size} \times (L_{RBs}-1) + RB_{start} \quad \text{(Formula 1); or}$$

$$\text{if } (L_{RBs}-1) > \lfloor N_{BWP}^{size}/2 \rfloor, RIV1 = N_{BWP1}^{size} \times (N_{BWP1} - L_{RBs1}+1) + (N_{BWP1}^{size}-1-RB_{start1}) \quad \text{(Formula 2).}$$

Herein, $RB_{start} \geq 1$, and $RB_{start} < N_{BWP}^{size} - RB_{start}$.

Figure 11C:
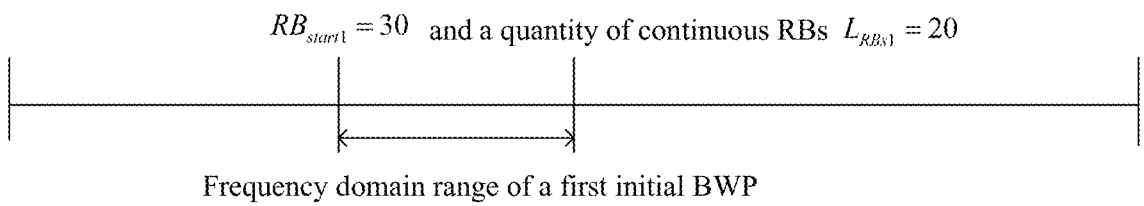
FIG. 11c is a schematic diagram of a frequency domain range of a first initial BWP according to an embodiment of this application.

The first initial BWP is used as an example. As shown in FIG. 11c, when a bandwidth is 20 M, and a corresponding quantity of RBs is 100, in other words, $N_{BWP1}^{size}=100$, the start resource block position of the first initial BWP $RB_{start1}=30$, the quantity of continuous RBs occupied by the frequency domain width of the first initial BWP $L_{RBs1}=20$, and it can be learned from the foregoing numerical values that $(L_{RBs}-1) \leq \lfloor N_{BWP}^{size}/2 \rfloor$. Therefore, the RIV may be calculated according to the formula 1:

$$RIV1 = N_{BWP1}^{size} \times (L_{RBs1}-1) + RB_{start1} = 100 \times (20-1) + 30 = 1930.$$

Figure 11D:
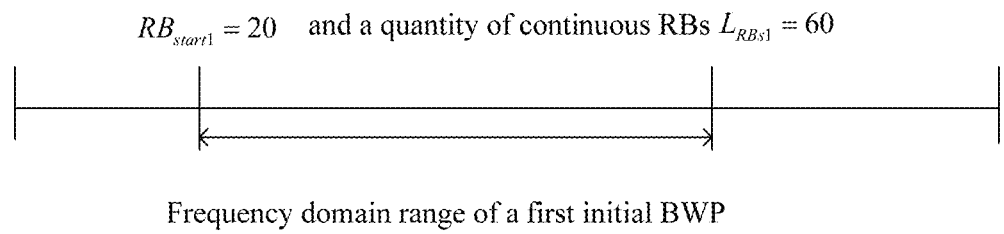
FIG. 11d is another schematic diagram of a frequency domain range of a first initial BWP according to an embodiment of this application.

In another example, as shown in FIG. 11d, when a bandwidth is 20 M, and a corresponding quantity of RBs is 100, in other words, $N_{BWP1}^{size}=100$, the start resource block position of the first initial BWP $RB_{start1}=20$, the quantity of continuous RBs occupied by the frequency domain width of the first initial BWP $L_{RBs1}=60$, and it can be learned from the foregoing numerical values that $(L_{RBs}-1) > \lfloor N_{BWP}^{size}/2 \rfloor$. Therefore, the RIV may be calculated according to the formula 2: $RIV = N_{BWP}^{size}(N_{BWP}^{size}-L_{RBs}+1) + (N_{BWP}^{size}-1-RB_{start})$:

$$RIV1 = N_{BWP1}^{size} \times (N_{BWP1}^{size} - L_{RBs1} + 1) + (N_{BWP1}^{size} - 1 - RB_{start1})$$
$$= 100 \times (100 - 60 + 1) + (100 - 1 - 20) = 4179$$

Further, expressions of $L_{RBs}$ and $RB_{start}$ may be derived according to the formula 1:

If $RIV/N_{BWP}^{size}$(rounding up) + RIV % $N_{BWP}^{size}$(modulo) $\leq N_{BWP}^{size}$, the quantity $L_{RBs}$ of allocated consecutive RBs and the start resource block position RB of the allocated RBs are as follows:

$$L_{RBs} = RIV/N_{BWP}^{size} + 1; \text{ and}$$

$$RB_{start} = RIV \% N_{BWP}^{size}.$$

If $RIV/N_{BWP}^{size}$(rounding up) + RIV % $N_{BWP}^{size}$ (modulo) $\geq N_{BWP}^{size}$, the quantity $L_{RBs}$ of allocated consecutive RBs and the start resource block position $RB_{start}$ of the allocated RBs are as follows:

$$L_{RBs} = N_{BWP}^{size} - RIV/N_{BWP}^{size} + 1; \text{ and}$$

$$RB_{start} = N_{BWP}^{size} - 1 - RIV \% N_{BWP}^{size}.$$

In this embodiment of this application,
the frequency domain width of the first initial BWP satisfies the formula 1:

$$RIV1 = N_{BWP1}^{size} \times (L_{RBs1}-1) + RB_{start1}.$$

Herein, $L_{RBs1}$ is a quantity of consecutive RBs occupied by the frequency domain width of the first initial BWP, RIV1 is a first resource indication value parameter, $RB_{start1}$ is a start resource block position of the first initial BWP, and $N_{BWP1}^{size}$ represents a quantity of first RBs.

The frequency domain width of the second initial BWP satisfies the formula 1:

$$RIV2 = N_{BWP2}^{size} \times (L_{RBs2}-1) + RB_{start2}.$$

Herein, $L_{RBs2}$ is a quantity of consecutive RBs occupied by the frequency domain width of the second initial BWP, RIV2 is a second resource indication value parameter, $RB_{start2}$ is a start resource block position of the second initial BWP, and $N_{BWP2}^{size}$ represents a quantity of second RBs.

In this embodiment of this application, values of RIV1 and RIV2 may be the same, or may be different.

Herein, $N_{BWP1}^{size}$ indicates that a quantity of first RBs is a quantity of all RBs included in the first downlink bandwidth, and $N_{BWP2}^{size}$ indicates that a quantity of second RBs is a quantity of all RBs included in the second downlink bandwidth. The first downlink bandwidth may be the system bandwidth of the first apparatus, and the second downlink bandwidth may be the system bandwidth of the second apparatus. In addition, it should be understood that values of the first downlink bandwidth and the second downlink bandwidth may be the same, or may be different. $N_{BWP1}^{size}$ may be the same, or may be different.

It can be understood that, when the second apparatus has learned of the first resource indication value parameter RIV1 and the quantity $N_{BWP1}^{size}$ of first RBs, the second apparatus may obtain, according to an RIV formula, the quantity $L_{RBs1}$ of continuous RBs occupied by the frequency domain width of the first initial BWP and the start resource block position $RB_{start1}$ of the first initial BWP. When the first apparatus has learned of the second resource indication value parameter RIV2 and the quantity $N_{BWP2}^{size}$ of second RBs, the first apparatus may obtain, according to an RIV formula, the quantity $L_{RBs2}$ of continuous RBs occupied by the frequency domain width of the second initial BWP and the start resource block position $RB_{start2}$ of the second initial BWP.

It should be noted that, values of RIV1 and RIV2 may be obtained by the first apparatus and the second apparatus through signaling interaction, and $N_{BWP1}^{size}$ and $N_{BWP2}^{size}$ may be predefined in a protocol, or may be obtained by the first apparatus and the second apparatus through signaling interaction. In addition to obtaining the parameter value through calculation according to a formula. For example, the first apparatus and the second apparatus may alternatively obtain RIV1 and RIV2 by searching a table. For example, a correspondence among $N_{BWP1}^{size}$, $L_{RBs1}$, RIV1, and $RB_{start1}$ is defined in a table. When the first apparatus (or the second apparatus) has learned of $N_{BWP1}^{size}$ and RIV1, the second apparatus (or the first apparatus) obtains $L_{RBs1}$ and $RB_{start1}$ by searching the table. When the first apparatus (or the second apparatus) has learned of $N_{BWP1}^{size}$, $L_{RBs1}$, and $RB_{start1}$, the first apparatus (or the second apparatus) obtains RIV1 by searching the table. Similarly, the first apparatus (or the second apparatus) may also obtain $L_{RBs2}$, RIV2, $RB_{start2}$, and $N_{BWP2}^{size}$ by searching the table.

In operation 102 in this embodiment, that the second apparatus sends the second indication information includes: The second apparatus sends a first response message. The first response message includes the second indication information. In addition, the first response message may further include an attribute identifier of the second apparatus, and the attribute identifier of the second apparatus is used to indicate whether the second apparatus is a public network device or a private network device.

It should be noted that, that frequency domain resources of the initial BWPs of the first apparatus and the second apparatus are indicated by using the first indication information and the second indication information is described above in this embodiment. In addition, time domain resources of the initial BWPs are further included. A time domain position of an initial BWP of an apparatus at each end may be indicated by using an independent message, or may be predefined by the apparatuses at both ends. For example, the time domain position of the initial BWP is a time domain resource in the entire first candidate shared resource, or may be flexibly configured based on a service requirement. The time domain position of the initial BWP and a configuration process are not limited in this embodiment of this application.

The following describes a process of configuring the third indication information in operation 103 and the fourth indication information in operation 104.

In operation 103, the third indication information includes a first field and a second field, and performs indication by using two levels of information. The first field is used to indicate a resource type of the time-frequency resource that is expected by the first apparatus to be used for data transmission, the resource type includes at least one of an uplink (UL) resource type, a supplementary uplink (SUL) resource type, and a downlink (DL) resource type, and the second field is used to indicate a position of a time-frequency resource corresponding to each resource type. An SUL resource is a low-frequency resource and is less than 6 GHz, and a UL resource is a high-frequency resource and is greater than or equal to 6 GHz.

In an implementation, the first apparatus indicates, by using the first field, that the resource that is expected by the first apparatus to be used for data transmission includes one of a UL shared resource, an SUL shared resource, a UL and SUL shared resource, and a DL shared resource. Then, the second field is used to indicate a specific position of each type of shared resource, and whether the shared resource is a high-frequency resource or a low-frequency resource. For example, after receiving the third indication information, the second apparatus determines, based on the first field in the third indication information, the resource that is expected by the first apparatus to be used for data transmission. For example, the resource that is expected by the first apparatus to be used for data transmission includes a UL shared resource. Then, the second field is used to indicate whether a frequency range of the UL shared resource is an SUL low-frequency resource or a UL high-frequency resource.

In an embodiment, the resource that is expected to be used for data transmission and that is indicated by using the first field may be referred to as a level-1 indication, and the resource that is indicated by using the second field may be referred to as a level-2 indication.

In another embodiment, the third indication information further includes a third field, and the third field is used to indicate an effective moment of a time-frequency resource that is in the second field and that is expected to be used for data transmission. The effective moment of the time-frequency resource that is expected to be used for data transmission means that when receiving an indication of the effective moment, the second apparatus considers that the time-frequency resource that is expected to be used for data transmission and indicated by the first apparatus becomes valid starting from a moment indicated by the effective moment.

In an embodiment, indication precision of the effective moment may be a system frame number (SFN), a subframe number subframe, a slot number slot, or a symbol symbol. If the indication precision of the effective moment is a system frame number, it is equivalent to that the time-frequency resource that is expected to be used for data transmission and that is indicated by the first apparatus becomes valid starting from a moment indicated by the system frame number. Similarly, if the indication precision of the effective moment is a subframe number, the indication of the effective moment includes a system frame number indication and a subframe number indication, and the subframe number is used to indicate a specific subframe that is in the system frame and that is the effective moment. When the second apparatus receives the indication of the effective moment, the second apparatus considers that the time-frequency resource that is expected to be used for data transmission and that is indicated by the first apparatus becomes valid starting from a moment corresponding to the system frame number indication and the subframe number indication. If the indication precision of the effective moment is a slot number, the indication of the effective moment includes a system frame number indication, a subframe number indication, and a slot number indication. The subframe number is used to indicate a specific subframe that is in the system frame and that is the effective moment, for example, a first subframe. The slot number is used to indicate a specific slot that is in the first subframe and that is the effective moment, for example, a first slot.

It should be noted that, at a moment, if a transmission resource that is expected by the first apparatus to be used changes, the method further includes an operation in which the first apparatus indicates a changed transmission resource of the first apparatus. The method includes: The first apparatus adds a fourth field to the second field. The fourth field is used to indicate whether the position of the time-frequency resource corresponding to each resource type changes.

For example, if a resource type used for data transmission changes from a UL to a DL, the first apparatus adds the fourth field to the second field sent by the first apparatus. The fourth field indicates that a resource type used for current transmission is different from a resource type used for previous transmission. When the fourth field indicates that the position changes, the second field further includes a fifth field, and the fifth field is used to indicate a position that is of a time-frequency resource that is expected to be used for data transmission and that is obtained after the change. For example, the fifth field is used to indicate a specific position of a time-frequency resource after the transmission resource changes to the DL.

When the first apparatus indicates a changed transmission resource of the first apparatus, the first apparatus may further directly add the fifth field to the second field, and send the fifth field. The fifth field directly indicates the position that is of the time-frequency resource that is expected by the first apparatus to transmit data and that is obtained after the change.

Further, the third indication information may be indicated in any one of the following manners:

Manner 1: Bitmap Indication

In an implementation, the third indication information includes a second field, the second field includes a binary character string, each character occupies 1-bit space and corresponds to one time-frequency block, and the time-frequency block may represent one PRB in frequency domain, and may represent one subframe, one slot, or one symbol in time domain. A resource corresponding to a position of a character whose bit value is "1" is a resource that is expected by the first apparatus to be used for data transmission, and a resource corresponding to a position of a character whose bit value is "0" is a resource that is not expected by the first apparatus to be used for data transmission.

Figure 12A:
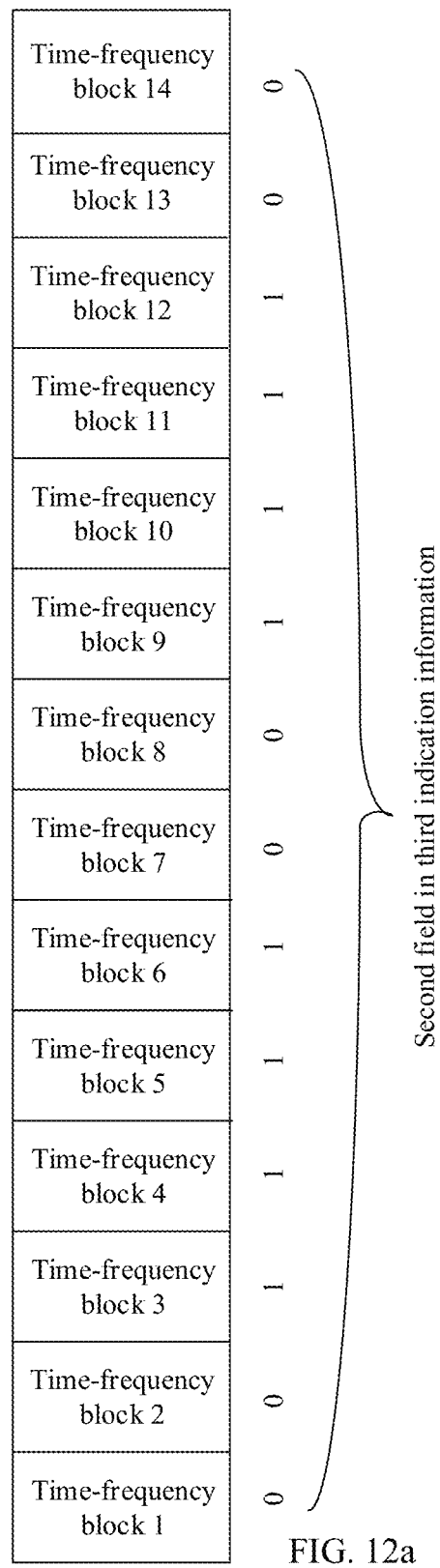
FIG. 12a is a schematic diagram of indicating, by using a second field, a resource that is expected by a first apparatus to be used for data transmission according to an embodiment of this application.

For example, as shown in FIG. 12*a*, the second field "00111100111100" indicates a time-frequency resource of one slot (14 symbols), and corresponds to a time-frequency block 1 to a time-frequency block 14. The time-frequency blocks 3 to 6 and the time-frequency blocks 9 to 12 correspond to the bit value "1", and the bit value "1" indicates that these time-frequency blocks are the resource that is expected by the first apparatus to be used for data transmission. All remaining time-frequency blocks whose bit values are "0", including time-frequency blocks 1, 2, 7, 8, 13, and 14, are the resource that is not expected by the first apparatus to be used for data transmission.

In another implementation, the third indication information may be indicated by using two types of bitmaps. One type of bitmap is used to indicate a frequency domain resource, and the other type of bitmap is used to indicate a time domain resource. In an example, an RB-level bitmap is used to indicate the frequency domain resource. Each RB is represented by using 1 bit, the bit value "1" indicates that the RB is an RB used for data transmission, and the bit value "0" indicates that the RB is not an RB used for data transmission. A symbol-level bitmap is used to indicate the time domain resource. Each symbol (for example, an OFDM symbol) is represented by using 1 bit, the bit value "1" indicates that the symbol is used for data transmission, and the bit value "0" indicates that the symbol is not used for data transmission.

Figure 12B:
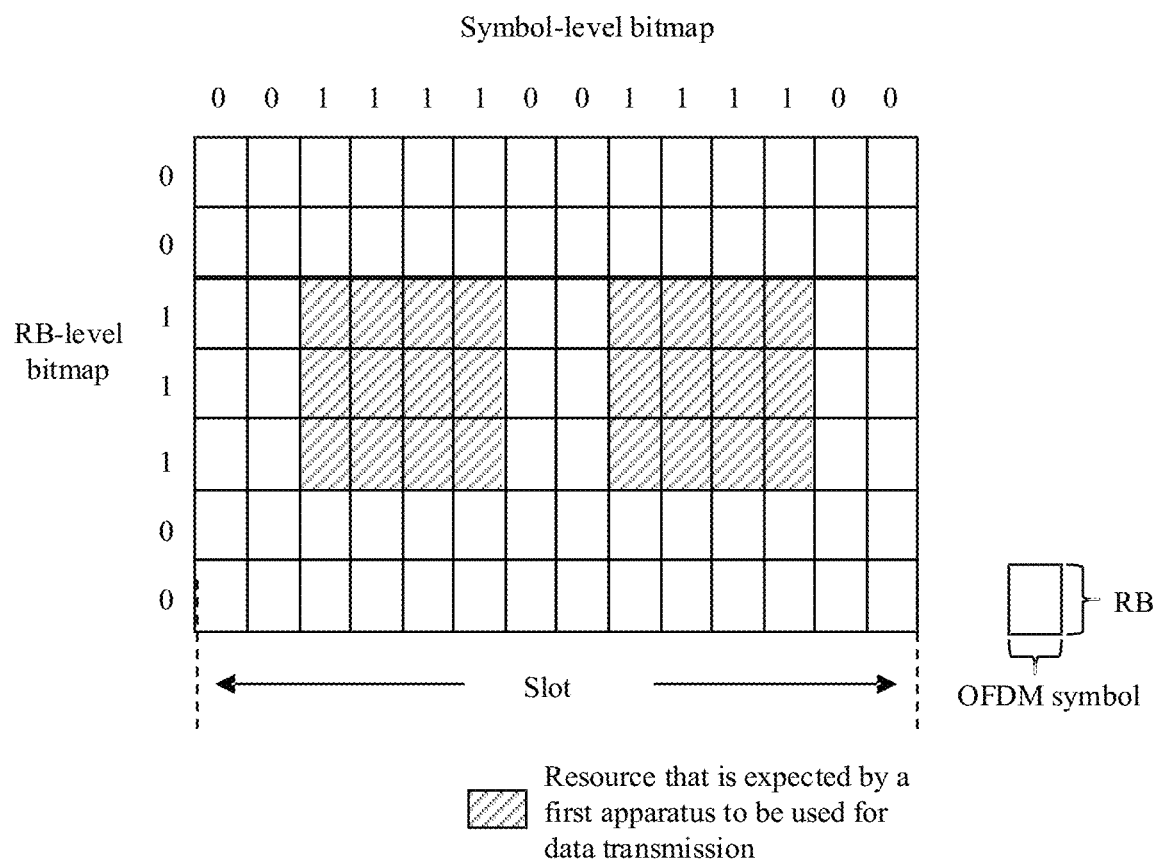
FIG. 12b is a schematic diagram of indicating, by using a bitmap, a resource that is expected by a first apparatus to be used for data transmission according to an embodiment of this application.

For example, as shown in FIG. 12b, in frequency domain, an RB-level bitmap "0011100" indicates that only three middle RBs are used for data transmission. In time domain, a symbol-level bitmap "00111100111100" indicates that only the $2^{nd}$ OFDM symbol to the $5^{th}$ OFDM symbol and the $8^{th}$ OFDM symbol to the $11^{th}$ OFDM symbol are used for data transmission, and other symbols are not used for data transmission.

In an embodiment, the first apparatus sends the third indication information to the second apparatus by using a request message. The request message may be an inter-base station interface Xn message, for example, an Xn Setup Request message or an Xn Configuration Update message. A specific Xn message is not limited herein.

Manner 2: Multilevel Indication

The multilevel indication is to indicate, by using two or more levels of indication information, the resource that is expected to be used for data transmission. A two-level indication is used as an example. A first-level indication is used to indicate a frequency domain position of the resource that is expected by the first apparatus to be used for data transmission, and the frequency domain position of the resource forms a frequency domain pattern, for example, a PRB pattern. A second-level indication is used to indicate whether a frequency domain pattern in the first-level indication is used in each time unit in one time period. In an embodiment, the first-level indication is used to perform indication by using the first field, and the second-level indication is used to perform indication by using the second field. The first field and the second field each are a binary character string.

Figure 13:
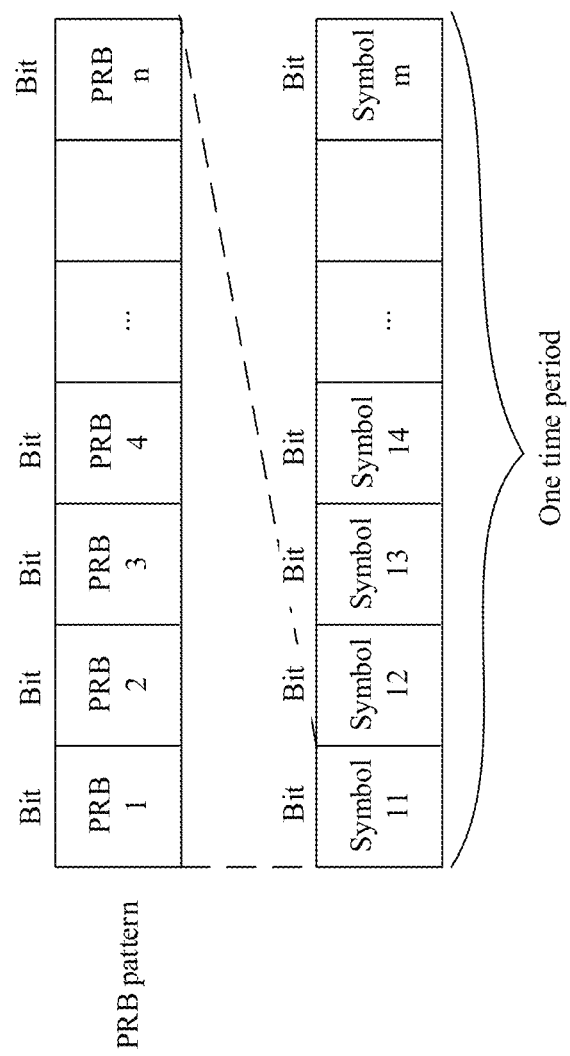
FIG. 13 is a schematic diagram of indicating, by using a PRB pattern, a resource that is expected by a first apparatus to be used for data transmission according to an embodiment of this application.

For example, as shown in FIG. 13, in one time period, the first field is used to indicate a PRB pattern. The PRB pattern includes a total of n PRBs from a PRB 1 to a PRB n, and corresponds to n bits. The bit value "1" indicates that the PRB is used for data transmission, and the bit value "0" indicates that the PRB is not used for data transmission. For example, a character string "0110" indicates that a PRB 2 and a PRB 3 are PRBs used for data transmission, and a PRB 1 and a PRB 4 are not used for data transmission. The second field is used to indicate whether to use the PRB pattern indicated by the first field. For example, when a time domain symbol 11 corresponds to the bit value "1", it is indicated that the PRB pattern is used on the symbol 11, in other words, the PRB 2 and the PRB 3 are used for data transmission on the symbol 11. When the symbol 11 corresponds to the bit value "0", it indicates that the PRB pattern is not used on the symbol 11, to be specific, the PRB 2 and the PRB 3 are not used for data transmission on the symbol 11.

It should be noted that duration of one time period includes but is not limited to one subframe, and the time period may be configured. In addition, each time unit in the time period may be another time granularity, for example, a slot or an OFDM symbol. This is not limited in this embodiment.

Manner 3: Percentage Indication

The percentage indication may be understood as follows: A percentage is used to represent a percentage, to an allocatable resource, of a resource that is expected to be used for data transmission and that is of the first apparatus or the second apparatus. The allocable resource is a resource that remains after the frequency domain resource of the first initial BWP and the frequency domain resource of the second initial BWP are removed from the first candidate shared resource. In an embodiment, the frequency domain resource of the first initial BWP and the frequency domain resource of the second initial BWP do not overlap each other.

For example, in frequency domain, a percentage, to the allocable resource, of a frequency domain resource range expected by the first apparatus to be used for data transmission is indicated by using a percentage. For example, 50% indicates that the first apparatus expects to occupy 50% of the allocable resource for data transmission. Then, other indication information is used to indicate a start position, an end position, or the like of the expected 50% frequency domain range.

In addition, the third indication information further includes indication information of a time domain position. The first apparatus may indicate a percentage of the allocable resource, and the percentage indicates a time domain resource range that is expected to be used within the 50% frequency domain range, for example, 80%. In addition, the third indication information further includes a specific time domain start position, an end position, or a quantity of symbols. For example, it is indicated that the $2^{nd}$ OFDM symbol to the $10^{th}$ OFDM symbol in 14 OFDM symbols in one slot are the time domain resource that is expected by the first apparatus to be used for data transmission. Then, the resource that is expected by the first apparatus to be used for data transmission may be uniquely determined based on information such as a percentage (50%) indicated in frequency domain, a frequency domain start position, or an end position.

In the method provided in this embodiment, the resource that is expected by the first apparatus to be used for data transmission is flexibly indicated in various manners, including Manner 1 to Manner 3, to meet different requirements. For example, a specific resource position may be precisely indicated in Manner 1 or Manner 2. Signaling overheads can be reduced by using the percentage indication in Manner 3. Because only a percentage of a resource that is expected to be used is carried, and other information may be obtained through preconfiguration or agreement, signaling overheads are reduced compared with a precise indication manner in which multilevel transmission is performed.

In the foregoing embodiment, the first apparatus may send the first indication information (operation 101) and send the third indication (operation 103) in the following two manners.

In an implementation, the first apparatus separately sends the first indication information and the third indication information. The first apparatus first sends the first indication information to the second apparatus by using the first request message (operation 101), and then sends the third indication information to the second apparatus by using a second request message (operation 103).

In another implementation, the first apparatus uses one message to carry the first indication information and the third indication information and sends the message to the second apparatus. The method procedure shown in FIG. 7 may evolve into a method procedure shown in FIG. 14, and includes the following operations.

Operation 201: The first apparatus sends a first request message to the second apparatus, where the first request message includes the first indication information and the third indication information.

Content and configuration manners of the first indication information and the third indication information are the same as those in operation 101 and operation 103 of the method in the foregoing embodiment. Details are not described herein again.

In an optional implementation, before or after operation 201, the method further includes: The second apparatus sends a second indication information to the first apparatus, where the second indication information is used to indicate a resource reserved by the second apparatus. Further, the resource reserved by the second apparatus is indicated by using a frequency domain resource of a second initial BWP, the frequency domain resource of the second initial BWP is a resource that is not shared between the second apparatus and the first apparatus, and the frequency domain resource of the second initial BWP is a part of a first candidate shared resource. Further, the second indication information may be sent by using a first response message. To be specific, the first response message includes the second indication information.

Operation 202: The second apparatus receives the first request message from the first apparatus, and determines fourth indication information based on the first indication information and the third indication information in the first request message. The fourth indication information is used to indicate a resource that is expected by the second apparatus to be used for data transmission, and the resource does not overlap a frequency domain resource of a first initial BWP and the frequency domain resource of the second initial BWP.

Operation 203: The second apparatus sends a second response message to the first apparatus, where the second response message includes the fourth indication information.

Content and functions of the first indication information to the fourth indication information are the same as those in operation 101 to operation 104 in the foregoing embodiment. Reference is made to the foregoing detailed description of each piece of indication information and a process in which the first apparatus determines a resource that is expected to be used for data transmission and a shared resource. Details are not described herein again.

In this implementation, the first apparatus sends the first indication information and the third indication information to the second apparatus by using a same request message. Compared with a manner of separately sending the two pieces of indication information, signaling overheads are reduced. In addition, a requirement of a service of an apparatus at each end for the shared resource can be reflected more realistically.

In addition, in the foregoing embodiment, the method further includes: The first apparatus sends an attribute identifier of the first apparatus. The attribute identifier is used to indicate whether the apparatus is a public network device or a private network device (device attribute). The attribute identifier of the first apparatus may be a cell identifier (cell ID).

Further, if the first apparatus is a public network device, the cell identifier is a public network cell identifier (cell ID) list of the first apparatus. The public network cell ID list includes at least one public network cell ID. Each public network cell ID may be an E-UTRAN cell identity (an ID of an LTE cell) or an NR cell identity (an ID of an NR cell). A length of the E-UTRAN cell identity is 28 bits, and a length of the NR cell identity is 36 bits.

If the first apparatus is a private network device, the cell identifier is a private network cell identifier list of the first apparatus. The private network cell ID list includes at least one private network cell ID. For example, the private network cell ID is a closed access group (CAG) ID, a non-public network (NPN) ID, a bit quantity of a private network cell identifier, or a design manner. The NPN ID may be represented by using a public land mobile network (PLMN) and a non-public network indicator (NID), and the PLMN includes a mobile country code (MCC) and a mobile network code (MNC). Further, when the private network cell ID is identified, a value of the MCC is 999.

Further, in operation 201, the first request message sent by the first apparatus further includes an attribute identifier of the first apparatus, so that the first apparatus sends the first indication information and the attribute identifier of the first apparatus to the second apparatus. It can be understood that the second request message may further include the attribute identifier of the first apparatus.

In an embodiment, the first response message sent by the second apparatus to the first apparatus further includes an attribute identifier of the second apparatus. When the second apparatus is a public network device or a private network device, a corresponding cell ID is the same as a cell ID attribute of the first apparatus. This is not described in detail in this embodiment.

Figure 14:
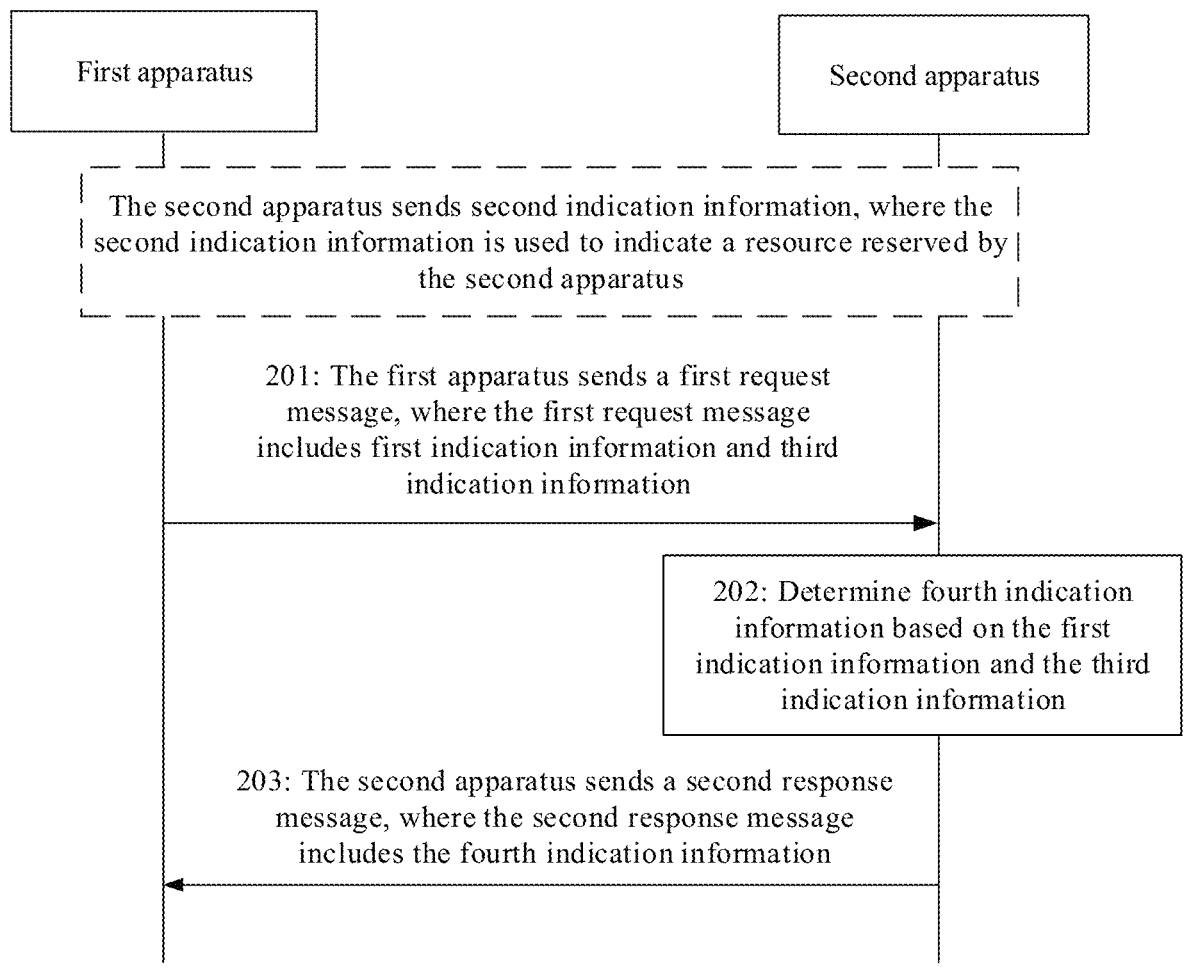
FIG. 14 is a flowchart of another resource sharing method according to an embodiment of this application.

In addition, in this embodiment of this application, in the message interaction procedure shown in FIG. 7 or FIG. 14, each piece of indication information or each request message (including a response message) may be an Xn message, where Xn is an inter-NR base station interface, and the first request message may be an Xn message, for example, an Xn Setup Request message or an Xn Configuration Update message. The first response message may be an Xn Setup Response message, an Xn Configuration Update Acknowledge message, or the like.

Embodiment 2

In this embodiment, an apparatus, for example, a third apparatus, is added based on Embodiment 1. The apparatus is configured to: obtain indication information reported by the first apparatus and the second apparatus, and control and coordinate a spectrum resource of the two apparatuses based on the information, to implement efficient sharing of a public network resource and a private network resource.

In the manner in this embodiment, the third apparatus is a network device, and the network device has a processing function. For example, the third apparatus is a centralized control unit or a centralized controller. Further, the third apparatus may be located in a core network. For example, the third apparatus is a mobility management function (AMF) entity in a 5G network, a mobility management entity (MME) in a 4G network, or a session management function (SMF) entity. Alternatively, the third apparatus may be a new physical entity. Alternatively, the third apparatus may be integrated into the first apparatus or the second apparatus. A specific form and structure of the third apparatus are not limited in this embodiment.

Figure 15:
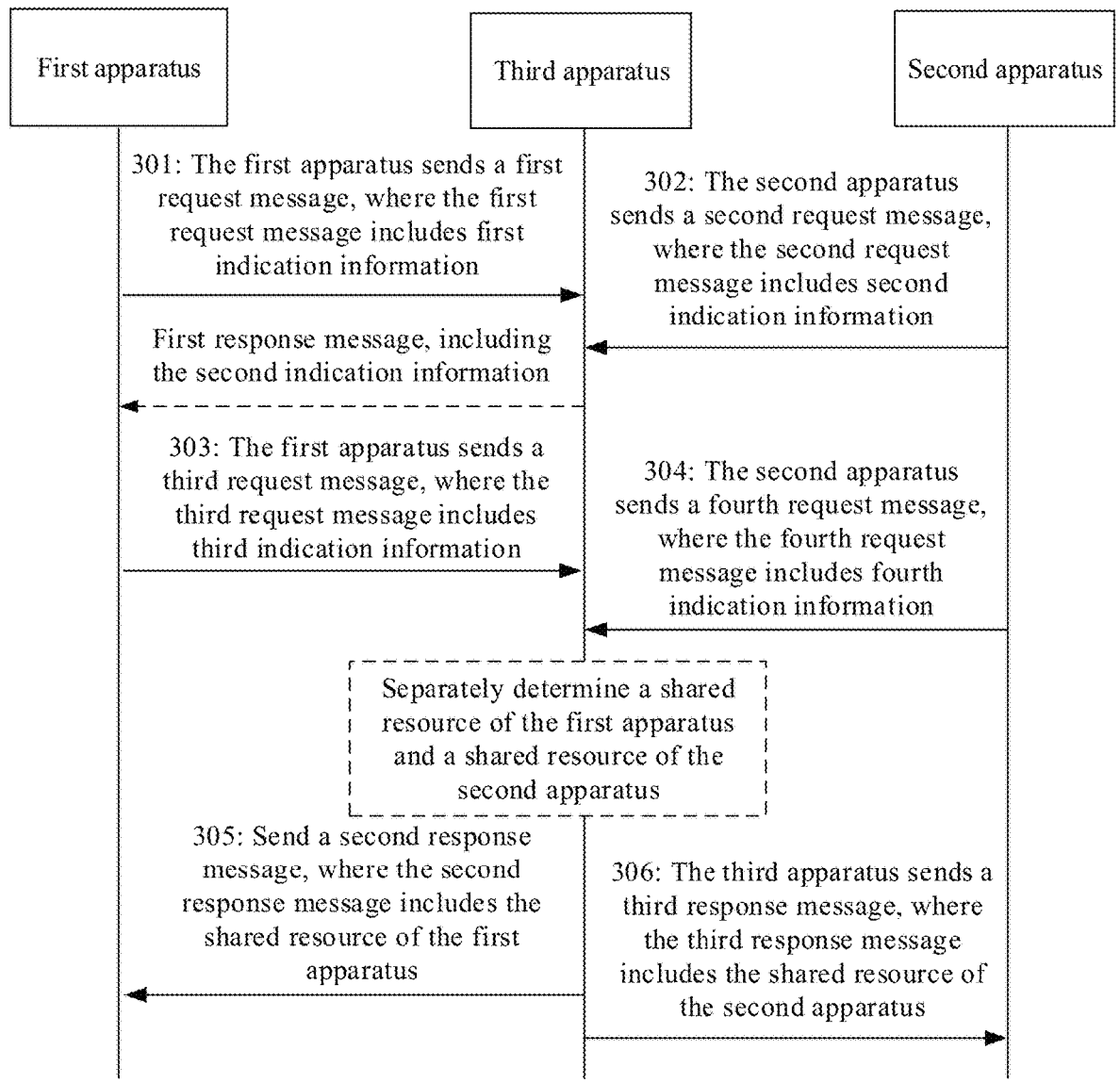
FIG. 15 is a flowchart of still another resource sharing method according to an embodiment of this application.

In a more specific example, as shown in FIG. 15, the method includes the following operations.

Operation 301: A first apparatus sends a first request message, where the first request message includes first indication information, and correspondingly, the third apparatus receives the first request message from the first apparatus.

The first indication information is used to indicate a resource reserved by the first apparatus, and the resource reserved by the first apparatus is the same as the resource reserved by the first apparatus in operation 101 in Embodiment 1. For details, refer to the description in Embodiment 1. Details are not described in this embodiment.

In addition, the first request message further includes an attribute identifier of the first apparatus, for example, a cell ID. The description of the cell identifier is the same as that of the cell ID in Embodiment 1. For details, refer to the description in Embodiment 1. The details are not described again in this embodiment.

In an example, operation 301 includes: The first apparatus periodically sends the first request message to the third apparatus, where the first request message carries the first indication information. Correspondingly, the third apparatus periodically receives the first request message or the first indication information. A sending period may be a preconfigured period, or may be a period obtained by the third apparatus in advance through interaction with the first apparatus.

Operation 302: The second apparatus sends a second request message, where the second request message includes the second indication information, and correspondingly, the third apparatus receives the second request message from the second apparatus.

The second indication information is used to indicate a resource reserved by the second apparatus, the resource reserved by the second apparatus is similar to the resource reserved by the first apparatus, and the resource reserved by the second apparatus may be used to send at least one of a synchronization channel, a broadcast channel, or an initial access channel.

In an embodiment, the second request message further includes an attribute identifier of the second apparatus.

In an example, operation 302 includes: The second apparatus periodically sends the second request message or the second indication information to the third apparatus, and correspondingly, the third apparatus periodically receives the second request message or the second indication information from the second apparatus.

In addition, the method further includes: The third apparatus sends a first response message to the first apparatus, where the first response message includes the second indication information.

The method further includes: After obtaining the first indication information and the second indication information, the third apparatus stores the first indication information and the second indication information, and reserves reserved resources of the first apparatus and the second apparatus in a first candidate shared resource.

In a specific implementation of operations 301 and 302, a resource of a first initial bandwidth part BWP includes the resource reserved by the first apparatus, and a resource of a second initial BWP includes the resource reserved by the second apparatus. Therefore, the frequency domain resource of the first initial BWP and the frequency domain resource of the second initial BWP may be respectively indicated based on the first indication information and the second indication information. Further, the first indication information is used to indicate the frequency domain resource of the first initial BWP, and the second indication information is used to indicate the frequency domain resource of the second initial BWP.

For example, the frequency domain resource of the first initial BWP is a resource that is not shared between the first apparatus and the second apparatus, the frequency domain resource of the first initial BWP is a part of a first candidate shared resource of the first apparatus and the second apparatus, the frequency domain resource of the second initial BWP is a resource that is not shared between the second apparatus and the first apparatus, and the frequency domain resource of the second initial BWP is a part of the first candidate shared resource.

Operation 303: The first apparatus sends a third request message, where the third request message includes third indication information, and correspondingly, the third apparatus receives the third request message from the first apparatus.

The third indication information is used to indicate the time-frequency resource that is in the first candidate shared resource and that is expected by the first apparatus to be used for data transmission. Further, the third indication information is the same as the third indication information in operation 103 in Embodiment 1. For details, refer to the description in Embodiment 1. The details are not described in this embodiment.

In an embodiment, the third apparatus sends a first message to the first apparatus. The first message is used to indicate the first apparatus to report the time-frequency resource that is in the first candidate shared resource and that is expected by the first apparatus to be used for data transmission. After receiving the first message, the first apparatus sends the third indication information or the third request message to the third apparatus.

For example, the first message is a query message. Further, the query message includes at least one of an identifier of the first apparatus and a type of a query resource.

Operation 304: The second apparatus sends a fourth request message, where the fourth request message includes the fourth indication information, and correspondingly, the third apparatus receives the fourth request message from the second apparatus.

The fourth indication information is used to indicate the time-frequency resource that is in the first candidate shared resource and that is expected by the second apparatus to be used for data transmission. Further, the fourth indication information is the same as the fourth indication information in operation 104 in Embodiment 1. For details, refer to the description in Embodiment 1. The details are not described in this embodiment.

In an embodiment, the method further includes: The third apparatus separately determines a shared resource of the first apparatus and a shared resource of the second apparatus from the first candidate shared resource based on one or more of the first indication information, the second indication information, the third indication information, and the fourth indication information. The shared resource of the first apparatus is a time-frequency resource that is actually used by the first apparatus to be used for data transmission, and the shared resource of the second apparatus is a time-frequency resource that is actually used by the second apparatus to be used for data transmission.

In an embodiment, that the third apparatus separately determines a shared resource of the first apparatus and a shared resource of the second apparatus based on the first indication information, the second indication information, and the third indication information includes: If the frequency domain resource of the first initial BWP ranges from 20 MHz to 30 MHz, the frequency domain resource of the second initial BWP ranges from 80 MHz to 90 MHz, and the frequency domain resource that is expected by the first apparatus to be used for data transmission and that is indicated by the third indication information ranges from 30 MHz to 80 MHz, the third apparatus determines that the shared resource of the first apparatus in the first candidate shared resource 20 MHz to 100 MHz ranges from 30 MHz to 80 MHz, and the shared resource of the second apparatus in the first candidate shared resource 20 MHz to 100 MHz ranges from 90 MHz to 100 MHz.

In an embodiment, that the third apparatus separately determines a shared resource of the first apparatus and a shared resource of the second apparatus based on the first indication information, the second indication information, the third indication information, and the fourth indication information includes: As shown in FIG. 10b, if the frequency domain resource of the first initial BWP ranges from 20 MHz to 30 MHz, the frequency domain resource of the second initial BWP ranges from 80 MHz to 90 MHz, the frequency domain resource that is expected by the first apparatus to be used for data transmission and that is indicated by the third indication information ranges from 30 MHz to 80 MHz, and the frequency domain resource that is expected by the second apparatus to be used for data transmission and that is indicated by the fourth indication information ranges from 55 MHz to 80 MHz and from 90 MHz to 100 MHz, the third apparatus determines, based on the foregoing indication information, that the shared resource of the first apparatus in the first candidate shared resource ranges from 30 MHz to 70 MHz, and the shared resource of the second apparatus in the first candidate shared resource ranges from 70 MHz to 80 MHz and from 90 MHz to 100 MHz.

Operation 305: The third apparatus sends a second response message, where the second response message includes the shared resource of the first apparatus, and correspondingly, the first apparatus receives the second response message sent by the third apparatus.

In an embodiment, the shared resource of the first apparatus is indicated by using fifth indication information, and the second response message includes the fifth indication information.

Operation 306: The third apparatus sends a third response message, where the third response message includes the shared resource of the second apparatus, and correspondingly, the second apparatus receives the third response message from the third apparatus.

In an embodiment, the shared resource of the second apparatus is indicated by using sixth indication information, and the third response message includes the sixth indication information.

In a specific example, that the second apparatus sends fourth request message in operation 304 includes the following operation.

Operation 3041: The third apparatus sends a second message to the second apparatus, where the second message is used to indicate the second apparatus to report the time-frequency resource that is in the first candidate shared resource and that is expected to be used for data transmission.

The query message includes at least one of an identifier of the second apparatus and a query resource type.

Operation 3042: After receiving the second message sent by the third apparatus, the second apparatus determines the fourth indication information based on at least one of the identifier of the second apparatus or the query resource type in the second message, and sends the fourth indication information to the third apparatus.

In a sending manner, the second apparatus sends a query response message to the third apparatus. The query response message includes the fourth indication information.

It should be noted that a process of configuring the first indication information to the fourth indication information and content of each piece of indication information in this embodiment are the same as or similar to those of the first indication information to the fourth indication information in Embodiment 1. Reference is made to specific descriptions in Embodiment 1. Details are not described in this embodiment.

According to the method provided in this embodiment, the third apparatus is used to centrally manage and allocate a spectrum resource of the first apparatus and the second apparatus, so that the operator can perform centralized management and charging, to guide the operator to increase a profit through spectrum sharing.

In an embodiment of this application, for the first indication information and the second indication information in Embodiment 1 and Embodiment 2, the first indication information in the foregoing embodiment is used as an example. The first indication information may be used to indicate, in the following manner, the resource reserved by the first apparatus, for example, an SSB resource.

In a specific implementation, the first indication information is used to separately indicate the time domain position and the frequency domain position of the SSB resource. When the first indication information is used to indicate the time domain position of the SSB resource, an indication manner is to indicate the time domain position of the SSB resource by using a pattern index. For example, the first indication information includes either of a pattern index A to a pattern index E, and each pattern index corresponds to one SSB pattern. An SSB pattern may be determined based on a pattern index carried in the first indication information, and a time domain position of each SSB in the SSB pattern is further obtained.

Further, the first apparatus periodically sends the first indication information, and an indication field carried in the first indication information may be ssb-PeriodicityServingCell. First indication information sent in each period may indicate a same pattern index, or may indicate a different pattern index.

Another indication manner is to perform an indication by using an SCS. Because a position of an SSB in time domain is specified in a 5G NR system protocol, and maximum quantities of SSBs that may be supported by different subcarrier spacings (SCS) are further specified. FIG. 3 shows SSB patterns corresponding to different SCSs. Therefore, when the first indication information includes a first SCS, a time domain position of a first SSB is determined based on the first SCS and a correspondence between the first SCS and an SSB pattern. For example, the first SCS indicated in the first indication information is equal to 30 kHz. Based on the correspondences shown in FIG. 3, when the first SCS is equal to 30 kHz, the first SCS corresponds to two SSB patterns in a case B or a case C. In this case, whether the first SCS corresponds to the case B or the case C needs to be further indicated. Usually, the case C is set to be a main pattern when the first SCS is equal to 30 kHz. Therefore, the first indication information further includes indication information of the case C. After receiving the first indication information sent by the first apparatus, the second apparatus may uniquely determine the time domain position of the SSB based on a case in which the first SCS that is carried in the first indication information is equal to 30 kHz and the case C.

In an embodiment, for the foregoing two indication manners, in a specific implementation, the first apparatus may indicate the time domain position of the SSB by using an existing SIB field in 5G NR, for example, an SSB-PositionsInBurst field. The field is used to indicate a time domain position used to transmit the SSB in a half frame including the SSB.

In addition, the first apparatus further sends indication information that is not used to transmit an SSB resource in a period. Therefore, after receiving the indication information, the second apparatus may use, to transmit another resource, for example, a PDSCH resource, the SSB resource that is not used. Further, position indication information that is not used to transmit the SSB resource may be indicated by using an ssb-PositionsInBurst field.

When the frequency domain position of the SSB is indicated by using the first indication information, the frequency domain start position of the SSB may be indicated based on at least one the frequency domain start position, the frequency domain end position, and the frequency domain width of the SSB in Embodiment 1, or based on another parameter, for example, an offset between a reference location and a lower boundary of an operating bandwidth. For a specific process, refer to the description in Embodiment 1. This is not described in detail in this embodiment. When the frequency domain width of the SSB is indicated, the frequency domain width of the SSB may be set to a fixed value, for example, 20 RBs.

According to the method provided in this embodiment, an indication of a more precise time-frequency resource position is allowed. In other words, a specific time domain position of an SSB is indicated by using a pattern index or an SCS. Therefore, an apparatus at each end can perform sharing on a resource in the first candidate shared resource other than a resource of the indicated SSB, to improve resource utilization.

It should be noted that, because the first indication information and the second indication information are information that is used to indicate a reserved resource and that is exchanged by the first apparatus and the second apparatus, a process of configuring and generating the first indication information in this embodiment is also applicable to the second indication information. Therefore, a process in which the second apparatus generates and sends the second indication information is the same as a process in which the first indication information is generated and sent, and the second indication information is not described in detail in this embodiment.

In Embodiment 1 and Embodiment 2 of this application, the first indication information may be used to indicate the resource reserved by the first apparatus in the following specific implementations:

In an embodiment, an indication is performed by using a bitmap. Similar to "Manner 1" the bitmap indication of the third indication information in Embodiment 1, the first candidate shared resource is divided into a plurality of time-frequency blocks, and each time-frequency block is a rectangular area enclosed by a time domain and a frequency domain. In addition, a size of each time-frequency block may be flexibly configured. Further, the resource reserved by the first apparatus is indicated by defining bit values "1" and "0" of a binary character string. For example, a resource block corresponding to the bit value "1" is defined as the reserved resource, and a resource block corresponding to the bit value "0" is not a reserved resource.

Figure 16:
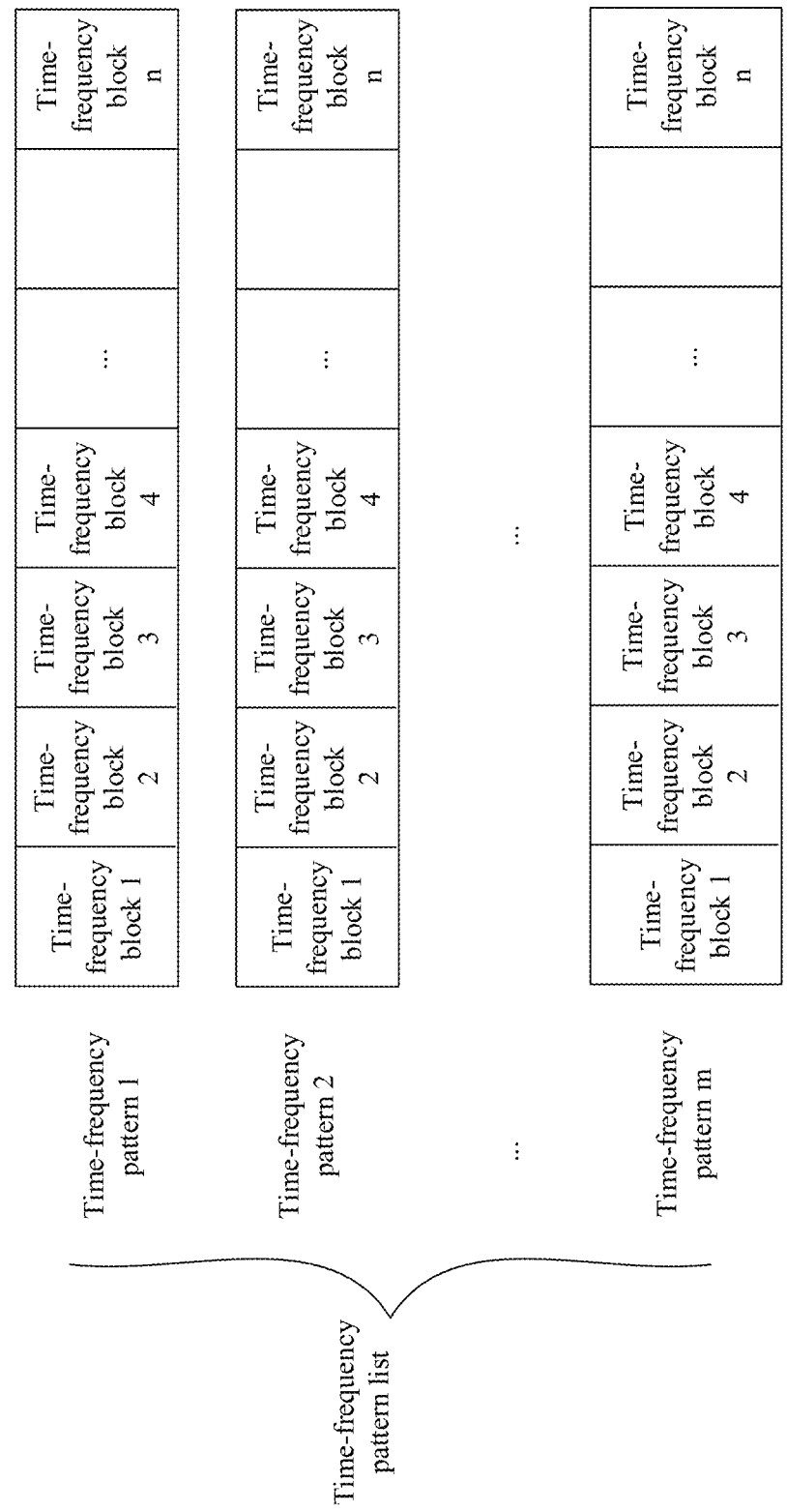
FIG. 16 is a schematic diagram of indicating a reserved resource by using a time-frequency pattern list according to an embodiment of this application.

In another embodiment, indication is performed by using a time-frequency pattern list. The time-frequency pattern list includes at least one time-frequency pattern ID, and each time-frequency pattern ID may be represented by using a binary character string, and correspond to one type of resource. The corresponding one type of resource may be an SSB, a PDCCH, a PRACH, or the like. A specific type of resource is not limited herein. For example, pattern ID=1 corresponds to an SSB time-frequency block information indication, pattern ID=2 corresponds to a common PDCCH time-frequency block information indication, and pattern ID=3 corresponds to a PRACH time-frequency block information indication. As shown in FIG. 16, the time-frequency pattern list includes a time-frequency pattern 1 to a time-frequency pattern m. The time-frequency pattern 1 may include n binary characters in binary, and each binary character represents a time-frequency block. A character string including n characters from 1 to n represents a total of n time-frequency resources from a time-frequency block 1 to a time-frequency block n. In addition, there is a definition: a time-frequency block corresponding to a character whose bit value is "1" is the reserved resource, and a time-frequency block corresponding to a bit value "0" is not a reserved resource.

For example, when the time-frequency pattern ID=1 is used to indicate the SSB resource, for example, when a binary bit value is used to indicate that the time-frequency blocks 1 to 14 are "00111100111100", it indicates that time-frequency blocks 3 to 6 and time-frequency blocks 9 to 12 in one time period (for example, 14 OFDM symbols) are a resource used to transmit an SSB, and other time-frequency blocks 1, 2, 7, 8, 13, and 14 are a resource not used to transmit an SSB. A resource type indicated by each time-frequency pattern ID and/or a value range of the ID may be specified in a protocol. For example, it is specified in the protocol that a maximum value of the ID is 4 or 8.

In this embodiment, the reserved resource is indicated by using a bitmap or a time-frequency pattern list, to achieve a more refined resource indication.

The following describes apparatus embodiments corresponding to the foregoing method embodiments.

Figure 17:
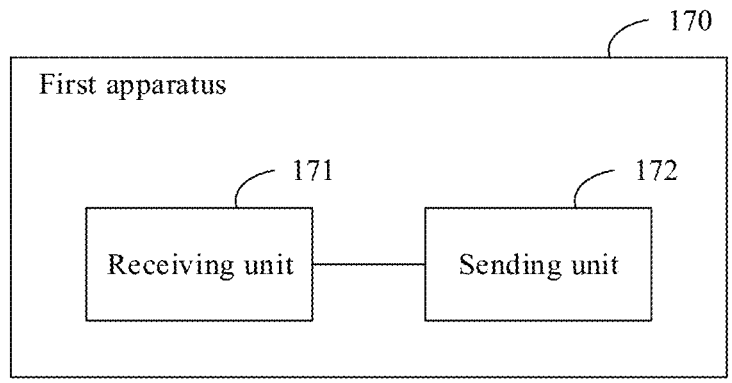
FIG. 17 is a schematic diagram of a structure of a first apparatus according to an embodiment of this application.

FIG. 17 is a schematic diagram of a structure of a resource sharing apparatus according to an embodiment of this application. The apparatus may be the first apparatus or the second apparatus in the foregoing method embodiments, may be a network device, or may be a component, for example, a chip, located in the network device. In addition, the apparatus may implement all functions of the first apparatus or the second apparatus in the foregoing embodiments, and perform all method operations of the first apparatus or the second apparatus.

Further, as shown in FIG. 17, the apparatus 170 may include a receiving unit 171 and a sending unit 172. In addition, the apparatus may further include a processing unit, a storage unit, and another unit or module.

The sending unit 172 is configured to send first indication information to a second apparatus. The first indication information is used to indicate a frequency domain resource of a first initial BWP, the frequency domain resource of the first initial BWP is a resource that is not shared between the first apparatus and the second apparatus, and the frequency domain resource of the first initial BWP is a part of a first candidate shared resource of the first apparatus and the second apparatus.

The receiving unit 171 is configured to receive second indication information from the second apparatus. The second indication information is used to indicate a frequency domain resource of a second initial BWP, the frequency domain resource of the second initial BWP is a resource that is not shared between the second apparatus and the first apparatus, and the frequency domain resource of the second initial BWP is a part of the first candidate shared resource.

The sending unit 172 is further configured to send third indication information to the second apparatus. The third indication information is used to indicate a time-frequency resource that is in the first candidate shared resource and that is expected by the first apparatus to be used for data transmission.

The receiving unit 171 is further configured to receive fourth indication information from the second apparatus. The fourth indication information is used to indicate a time-frequency resource that is in the first candidate shared resource and that is expected by the second apparatus to be used for data transmission.

In an embodiment, the frequency domain resource of the first initial BWP and the frequency domain resource of the second initial BWP do not overlap.

In addition, in a specific implementation of this embodiment, the first indication information is used to indicate at least one of a frequency domain start position of the first initial BWP, a frequency domain end position of the first initial BWP, and a frequency domain width of the first initial BWP. The second indication information is used to indicate at least one of a frequency domain start position of the second initial BWP, a frequency domain end position of the second initial BWP, and a frequency domain width of the second initial BWP.

In another specific implementation of this embodiment, the apparatus further includes a processing unit. The processing unit is configured to determine the frequency domain start position of the first initial BWP or the frequency domain start position of the second initial BWP in the manner described in FIG. 7 in the foregoing embodiments. Details are not described again.

The sending unit 172 is further configured to: when it is indicated that a position changes, send a fifth field by using the second field. The fifth field is used to indicate a position that is of a time-frequency resource that is expected to be used for data transmission and that is obtained after the change. For details, refer to the description in FIG. 7 in the foregoing embodiments. Details are not described again.

In still another specific implementation of this embodiment, the sending unit 172 is configured to send the first indication information and the third indication information to the second apparatus by using a first request message.

In yet another specific implementation of this embodiment, the processing unit is further configured to determine, based on the first initial BWP and the second initial BWP indicated by the second indication information, the time-frequency resource that is in the first candidate shared resource and that is expected to be used for data transmission. For a specific determining process, refer to the description in FIG. 7 in the foregoing embodiments. Details are not described again.

In still yet another specific implementation of this embodiment, the processing unit is further configured to determine, based on the first initial BWP, the second initial BWP, and the time-frequency resource that is expected by the second apparatus to be used for data transmission and that is indicated by the fourth indication information, the time-frequency resource that is in the first candidate shared resource and that is expected by the first apparatus to be used for data transmission. For a specific determining process, refer to the description in FIG. 7 in the foregoing embodiments. Details are not described again.

In a further specific implementation of this embodiment, the processing unit is further configured to determine a shared resource of the first apparatus in the first candidate shared resource based on the first initial BWP, the second initial BWP, and the time-frequency resource that is expected by the second apparatus to be used for data transmission and that is indicated by the fourth indication information; or determine a shared resource of the first apparatus in the first candidate shared resource based on the first initial BWP, the second initial BWP, the time-frequency resource that is expected by the first apparatus to be used for data transmission, and the time-frequency resource that is expected by the second apparatus to be used for data transmission. For a specific determining process, refer to the description in FIG. 7 in the foregoing embodiments. Details are not described again.

For the first indication information, the second indication information, the third indication information, the fourth indication information, the frequency domain resource of the first initial BWP, the frequency domain resource of the second initial BWP, and a specific process such as a process of how the first apparatus determines a shared resource in the first candidate shared resource, refer to the description in FIG. 7 in the foregoing embodiments. Details are not described again.

Figure 18:
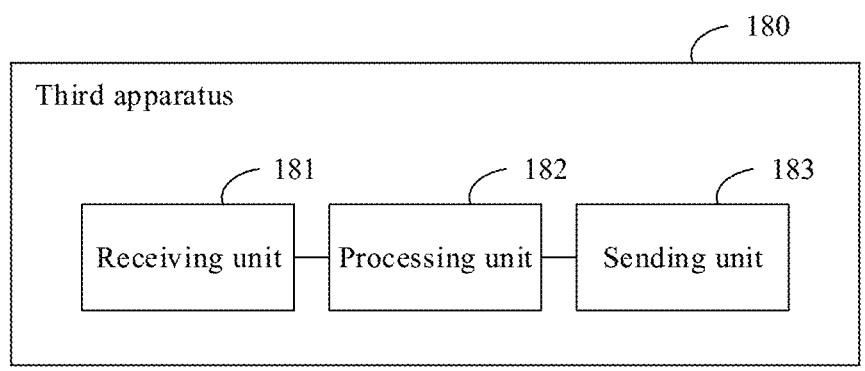
FIG. 18 is a schematic diagram of a structure of a third apparatus according to an embodiment of this application.

As shown in FIG. 18, an embodiment of this application further provides a schematic diagram of a structure of a resource sharing apparatus. The apparatus may be the third apparatus in the foregoing method embodiments, or may be a network device, or may be a component, for example, a chip, located in the network device. In addition, the apparatus may implement all functions of the third apparatus in the foregoing embodiments, and perform all method operations of the third apparatus.

In addition, as shown in FIG. 18, the apparatus 180 may include a receiving unit 181, a processing unit 182, and a sending unit 183. In addition, the apparatus may further include a storage unit, another unit or module, and the like.

The receiving unit 181 is configured to: receive first indication information from a first apparatus, and receive second indication information from a second apparatus. The first indication information is used to indicate a resource reserved by the first apparatus, and the second indication information is used to indicate a resource reserved by the second apparatus.

The receiving unit 181 is further configured to: receive third indication information from the first apparatus, and receive fourth indication information from the second apparatus. The third indication information is used to indicate a time-frequency resource that is in a first candidate shared resource and that is expected by the first apparatus to be used for data transmission, and the fourth indication information is used to indicate a time-frequency resource that is in the first candidate shared resource and that is expected by the second apparatus to be used for data transmission.

The processing unit 182 is configured to: generate a shared resource of the first apparatus in the first candidate shared resource based on one or more of the first indication information, the second indication information, the third indication information, and the fourth indication information, and generate fifth indication information.

The sending unit 183 is configured to send the fifth indication information to the first apparatus. The fifth indication information is used to indicate the shared resource of the first apparatus in the first candidate shared resource.

In a specific implementation of this embodiment, a resource of the first initial bandwidth part BWP includes a resource reserved by the first apparatus, and a resource of the second initial BWP includes a resource reserved by the second apparatus.

The first indication information is used to indicate the frequency domain resource of the first initial BWP, the frequency domain resource of the first initial BWP is a resource that is not shared between the first apparatus and the second apparatus, and the frequency domain resource of the first initial BWP is a part of the first candidate shared resource of the first apparatus and the second apparatus.

The second indication information is used to indicate the frequency domain resource of the second initial BWP, the frequency domain resource of the second initial BWP is a resource that is not shared between the second apparatus and the first apparatus, and the frequency domain resource of the second initial BWP is a part of the first candidate shared resource.

In addition, in a specific implementation of this embodiment, the processing unit 182 is further configured to: determine a shared resource of the second apparatus from the first candidate shared resource in the description manner in FIG. 15 in the foregoing embodiments, and generate and send sixth indication information. Details are not described again.

In a specific implementation of this embodiment, the receiving unit 181 is configured to: periodically receive the first indication information sent by the first apparatus, and periodically receive the second indication information sent by the second apparatus.

In a specific implementation of this embodiment, the sending unit 183 is further configured to send a second message to the second apparatus before receiving the fourth indication information from the second apparatus. For a specific process, refer to the description in FIG. 15 in the foregoing embodiments. Details are not described again.

Figure 19A:
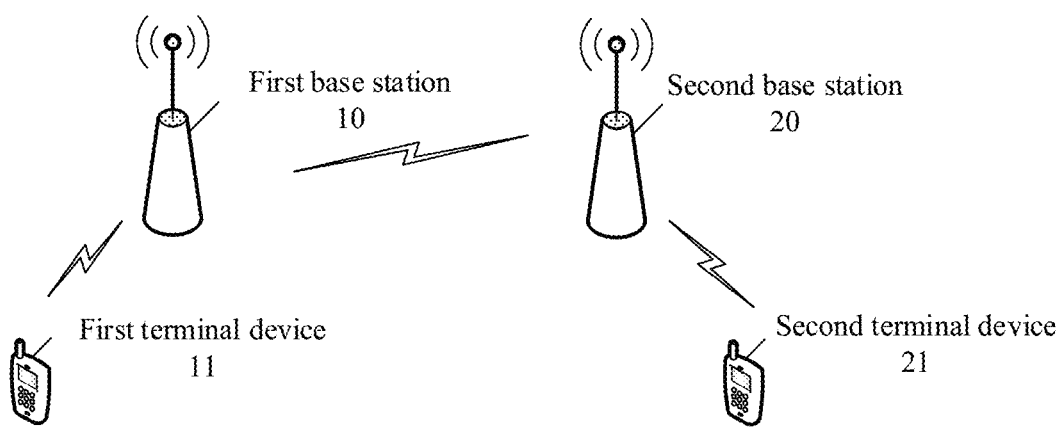
FIG. 19a is a schematic diagram of a scenario of an application environment according to an embodiment of this application.

In terms of a specific hardware implementation, the technical solutions in the foregoing embodiments of this application may be applied to a 5G mobile communications system, an NR communications system, a future mobile communications system, or the like. A 5G NR system is used as an example. As shown in FIG. 19*a*, the system includes at least one network device and at least one terminal device. For example, the system includes a first base station 10 and a second base station 20, the first base station 10 is associated with a first terminal device 11, and the second base station 20 is associated with a second terminal device 21.

Further, the first base station (BS) 10 or the second base station 20 may be a base transceiver station (BTS) in a global system for mobile communications (GSM) or code division multiple access (CDMA), may be a NodeB in wideband code division multiple access (wideband-CDMA, WCDMA), may be an evolved NodeB (evolutional NodeB, eNB/e-NodeB) in LTE, or an evolved NodeB (next generation eNB, ng-eNB) in next generation LTE, a gNB in NR, a base station in a future mobile communications system, or an access node in a wireless fidelity (wireless fidelity, Wi-Fi) system. A specific technology and a specific device form used for the network device are not limited in this embodiment of this application. In this application, the network device may be a radio access network device.

The terminal device in the embodiments of this application may be a device that provides services and/or data connectivity to a user, a handheld device with a wireless connection function, or another processing device connected to a wireless modem, for example, a wireless terminal. Further, the wireless terminal may communicate with one or more nodes over a radio access network (RAN). The wireless terminal may be a mobile terminal, such as a mobile phone (also referred to as a "cellular" phone) and a computer with a mobile terminal, for example, may be a portable, pocket-sized, handheld, computer built-in, or in-vehicle mobile apparatus, which exchanges a language and/or data with the radio access network. For example, the wireless device may be a device such as a personal communications service (PCS) phone, a cordless telephone set, a session initiation protocol (SIP) phone, a wireless local loop (WLL) station, or a personal digital assistant (PDA). The wireless terminal may alternatively be a subscriber unit, a subscriber station, a mobile station, a remote station, an access point, a remote terminal, an access terminal, a user terminal, a user agent, a user device, user equipment (user equipment, UE), or the like. A specific technology and a specific device form that are used by the terminal device are not limited in the embodiments of this application.

The first base station 10 and the second base station 20 in this embodiment may be used as the first apparatus and the second apparatus in the foregoing embodiments, and are configured to implement all method operations of the first apparatus and the second apparatus.

Figure 19B:
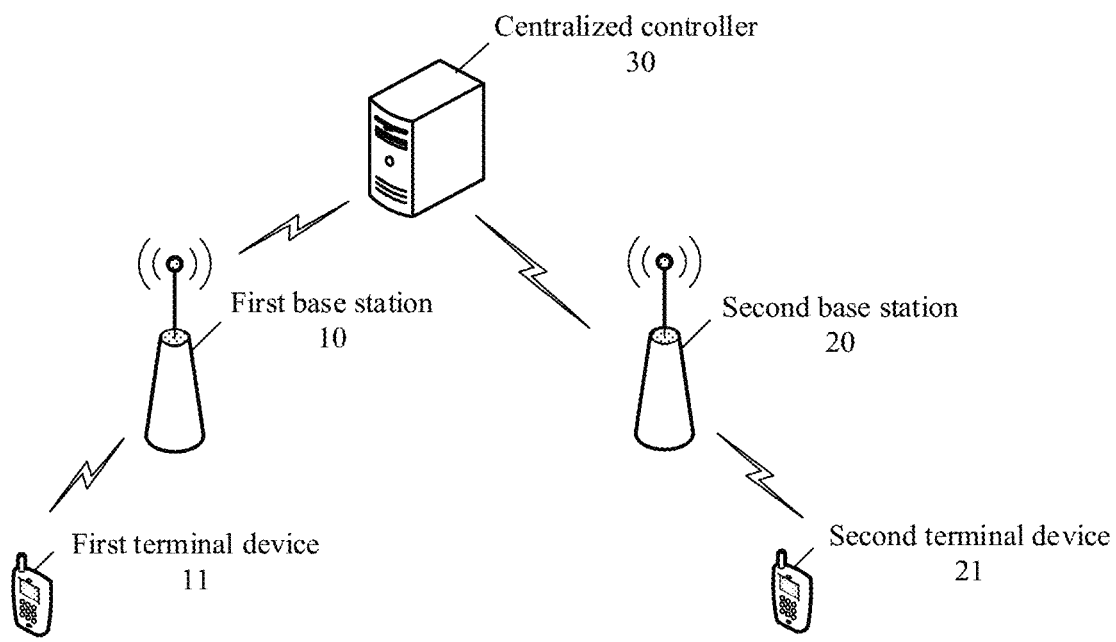
FIG. 19b is a schematic diagram of a scenario of another application environment according to an embodiment of this application.

In addition, the technical solution in Embodiment 2 of this application may be further applied to an application scenario shown in FIG. 19*b*. A system in the application scenario further includes a third network device, for example, a centralized controller 30. The centralized controller 30 is configured to implement all method operations of the third apparatus in the foregoing embodiments.

Further, the centralized controller 30, or referred to as a centralized control unit, may be located in a core network. For example, the centralized controller 30 is an AMF entity in a 5G network, an MME in a 4G network, or a session management entity, for example, an SMF entity in 5G. Alternatively, the centralized controller 30 may be a new physical entity, or may be integrated into the first base station 10 or the second base station 20. A specific form and structure of the centralized controller 30 are not limited in this embodiment.

Figure 20:
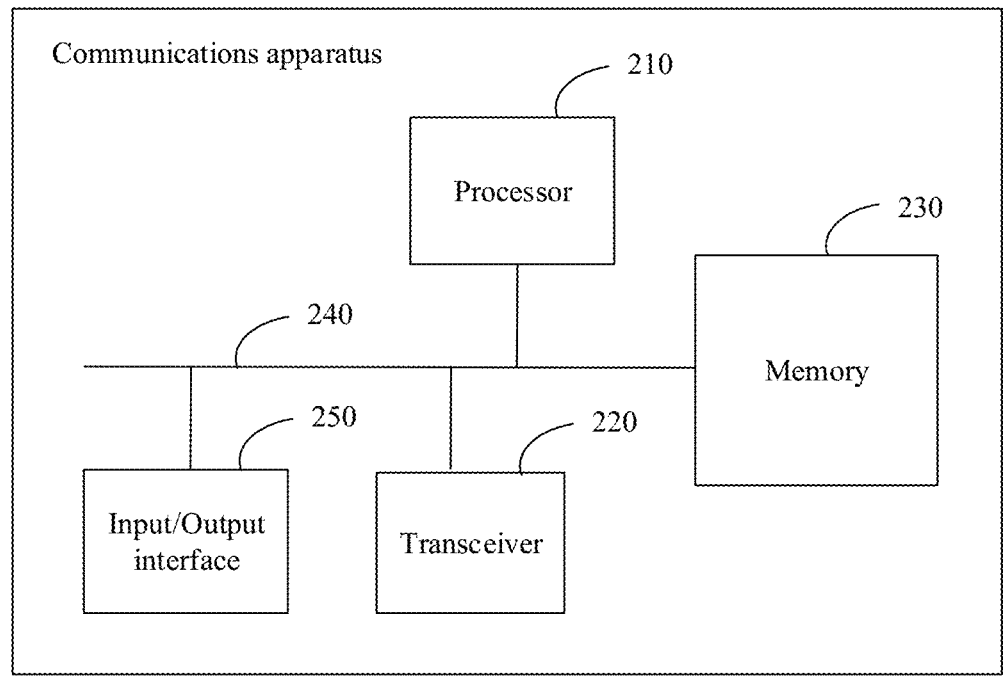
FIG. 20 is a schematic diagram of a structure of a communications apparatus according to an embodiment of this application.

In a hardware implementation, as shown in FIG. 20, this application further provides a communications apparatus. The apparatus may be a network device, or any one of the first apparatus, the second apparatus, or the third apparatus described above. Further, the communications apparatus includes a processor 210, a transceiver 220, a memory 230, a communications bus 240, and an input/output interface 250.

The processor 210 may include one or more processors, and the memory 230 may include one or more memories. The memory 230 stores instructions (or stores a computer program). The processor 210 is connected to the transceiver 220 through the input/output interface 250. When the instructions stored in the memory 230 are executed by the processor 210, the processor controls the transceiver 220 to send or receive data, and the processor 210 processes to-be-sent data and received data. The data received by the transceiver 220 under control reaches the processor 210 through the input/output interface 250. The processor 210 sends the to-be-sent data to the transceiver 220 through the input/output interface 250, and then the transceiver 220 sends the to-be-sent data.

In addition, the communications apparatus may further include more or fewer other components, or combine some components, or different components. This is not limited in this embodiment of this application.

The transceiver 220 is configured to establish a communications channel, so that the communications device is connected to a network through the communications channel, to implement communication transmission between the communications apparatus and another device. The transceiver 220 may be a module that completes a transceiver function. For example, the transceiver may include a communications module such as a wireless local area network (WLAN) module, a Bluetooth module, or a baseband module and a radio frequency (RF) circuit corresponding to the communications apparatus, and is configured to perform wireless local area network communication, Bluetooth communication, infrared communication, and/or cellular communications system communication, such as wideband code division multiple access (WCDMA) and/or high speed downlink packet access (HSDPA). The transceiver is configured to control communication between components in the communications device, and may support direct memory access.

In different implementations of this application, transceiver modules in the transceiver 220 generally appear as integrated circuit chips, and may be combined selectively, and not all of the transceiver modules and corresponding antenna groups are necessarily included. For example, the transceiver may include only a baseband chip, a radio frequency chip, and a corresponding antenna, to provide a communication function in a cellular communications system. The communications apparatus may be connected to a cellular network or the Internet through a communications connection, for example, wireless local area network access or WCDMA access, that is established by the transceiver.

The communications bus 240 may include a path for transferring information between the foregoing components.

The processor 210 is a control center of the communications apparatus, connects all parts of the entire device apparatus through various interfaces and lines, runs or executes a software program and/or a unit stored in the memory 903, and invokes data stored in the memory 230, to perform various functions and various functions of the communications apparatus and/or to process data. Further, the processor 210 may include an integrated circuit (IC), for example, may include a single packaged IC, or may include a plurality of connected packaged ICs that have a same function or different functions. For example, the processor may include only a combination of a central processing unit (CPU), a digital signal processor (DSP), and a control chip (for example, a baseband chip) in the transceiver.

The memory 230 may include a volatile memory, for example, a random access memory (RAM), and may further include a non-volatile memory, for example, a flash memory, a hard disk drive (HDD), or a solid-state drive (SSD). The memory may further include a combination of the foregoing types of memories. The memory may store a program or code, and the processor 901 may implement a function of the communications apparatus by executing the program or the code. In addition, the memory 230 may exist independently, and is connected to the processor 210 through the communications bus 240. Alternatively, the memory 903 may be integrated with the processor 901.

When the communications apparatus shown in FIG. 20 is a chip, a function/implementation process of the input/output interface 250 may be further implemented by using a pin, a circuit, or the like. The memory 903 is a storage unit in the chip, for example, a register or a cache. The storage unit may alternatively be a storage unit located outside the chip.

In this embodiment, when the communications apparatus is used as the first base station 10 or the second base station 20, the method operations of the first apparatus or the second apparatus shown in FIG. 7, FIG. 14, and FIG. 15 in the foregoing embodiments may be implemented. In addition, functions of the receiving unit 171 and the sending unit 172 in the apparatus embodiment shown in FIG. 17 may be implemented by the transceiver 220 and the input/output interface 250, or controlled by the processor 210. A function to be implemented by the processing unit may be implemented by the processor 210. A function of the storage unit may be implemented by the memory 230.

When the communications apparatus is a first apparatus, the transceiver 220 is configured to: send first indication information to a second apparatus, receive second indication information from the second apparatus, send third indication information to the second apparatus, receive fourth indication information from the second apparatus, and the like. Further, content and a configuration process of the first indication information to the fourth indication information are the same as those in the foregoing method embodiments. Details are not described again.

In addition, in an implementation, the processor 210 is further configured to: determine a frequency domain start position of a first initial BWP in Manner 1 and Manner 2 in the foregoing method embodiments, and determine a frequency domain start position of a second initial BWP in Manner 3 and Manner 4. For a specific process, refer to the foregoing method embodiments. Details are not described again.

In an implementation, the transceiver 220 is further configured to send the first indication information and the third indication information to the second apparatus by using a first request message.

In a specific implementation, the processor 210 is further configured to determine, based on the first initial BWP, the second initial BWP, and a time-frequency resource that is expected by the second apparatus to be used for data transmission and that is indicated by the fourth indication information, a time-frequency resource that is in the first candidate shared resource and that is expected by the communications apparatus to be used for data transmission.

In an implementation, the processor 210 is further configured to determine: a shared resource of the first apparatus in the first candidate shared resource based on the first initial BWP, the second initial BWP, and the time-frequency resource that is expected by the second apparatus to be used for data transmission; or determine, by the first apparatus, a shared resource of the first apparatus in the first candidate shared resource based on the first initial BWP, the second initial BWP, a time-frequency resource that is expected by the first apparatus to be used for data transmission, and the time-frequency resource that is expected by the second apparatus to be used for data transmission.

For a specific determining process in various implementations of the processor 210, refer to the implementations in Embodiment 1 and FIG. 7 of the specification. Details are not described herein again in this embodiment.

When the communications apparatus is used as the centralized controller 30, the method operations of the third apparatus shown in FIG. 18 in the foregoing embodiments may be implemented, and functions of the receiving unit 181 and the sending unit 183 in the foregoing apparatus embodiment shown in FIG. 18 may be implemented by the transceiver 220 and the input/output interface 250, or implemented by the processor 210 under control. A function to be implemented by the processing unit 182 may be implemented by the processor 210. A function of the storage unit may be implemented by the memory 230.

When the communications apparatus is a third apparatus, the transceiver 220 is configured to: receive first indication information from a first apparatus and second indication information from a second apparatus; and receive third indication information from the first apparatus, and receive fourth indication information from the second apparatus. The processor 901 is configured to: determine a shared resource of the first apparatus in the first candidate shared resource based on one or more of the first indication information, the second indication information, the third indication information, and the fourth indication information, and generate fifth indication information. The transceiver 220 is further configured to send the fifth indication information to the first apparatus. The fifth indication information is used to indicate the shared resource of the first apparatus in the first candidate shared resource.

In addition, in an implementation, the transceiver 220 is further configured to send sixth indication information to the second apparatus. The processor 210 is further configured to determine a shared resource of the second apparatus in the first candidate shared resource based on one or more of the first indication information, the second indication information, the third indication information, and the fourth indication information.

In an implementation, the transceiver 220 is configured to: periodically receive the first indication information from the first apparatus; and periodically receive the second indication information from the second apparatus.

In an implementation, the transceiver 220 is further configured to send a message to the second apparatus before receiving the fourth indication information from the second apparatus. The message is used to indicate the second apparatus to report a time-frequency resource that is in the first candidate shared resource and that is expected by the second apparatus to be used for data transmission.

For a specific determining process in various implementations of the transceiver 220 and the processor 210, refer to the implementations in Embodiment 2 and FIG. 15 of the specification. Details are not described herein again in this embodiment.

It should be noted that, in this embodiment, a structure of the terminal device may be the same as a structure of the communications apparatus shown in FIG. 20. For example, the terminal device includes a communications interface, a communications bus, a transceiver, a processor, and a memory, and may further include another component or unit module. Structures and components of specific communications devices are not limited in this embodiment.

In addition, an embodiment of this application further provides a computer storage medium. The computer storage medium may store a program, and when the program is executed, some or all of the operations in the embodiments of the resource sharing method provided in this application may be included. The storage medium may be a magnetic disk, an optical disc, a read-only memory ROM, a random access memory RAM, or the like.

All or some of the foregoing embodiments may be implemented by using software, hardware, firmware, or any combination thereof. When the software is used to implement the embodiments, all or some of the embodiments may be implemented in a form of a computer program product.

The computer program product includes one or more computer instructions, such as handover instructions. When a computer loads and executes the computer program, all or some of the procedures or functions are generated according to the embodiments of this application. The computer may be a general-purpose computer, a dedicated computer, a computer network, or another programmable apparatus.

The computer instructions may be stored in a computer-readable storage medium, or may be transmitted from a computer-readable storage medium to another computer-readable storage medium. For example, the computer instructions may be transmitted from a network node, a computer, a server, or a data center to another website, computer, or server in a wired or wireless manner.

The computer-readable storage medium may be any usable medium accessible by a computer, or a storage device, such as a server or a data center, integrating one or more usable media. The usable medium may be a magnetic medium, for example, a floppy disk, a hard disk, a magnetic tape, an optical medium (for example, a DVD), a semiconductor medium, for example, a solid-state drive SSD, or the like.

In the specification, claims, and the accompanying drawings of this application, the terms "first", "second", and the like are intended to distinguish between similar objects but do not necessarily indicate a specific order or sequence. It should be understood that data termed in such a way is interchangeable in appropriate circumstances, so that the embodiments described herein can be implemented in other orders than the order illustrated or described herein. In addition, the terms "include", "have" and any other variants mean to cover the non-exclusive inclusion. For example, a process, method, system, product, or device that includes a list of operations or units is not necessarily limited to those operations or units that are expressly listed, but may include other operations or units that are not expressly listed or inherent to such a process, method, product, or device.

A person skilled in the art may clearly understand that, the technologies in the embodiments of this application may be implemented by using software in addition to a necessary general hardware platform. Based on such an understanding, the technical solutions of this application essentially or the part contributing to the conventional technology may be implemented in a form of a software product. The computer software product may be stored in a storage medium, such as a ROM/RAM, a magnetic disk, and an optical disc, and includes several instructions for instructing a computer device (which may be a personal computer, a server, a network device, or the like) to perform the methods described in the embodiments or some parts of the embodiments of the present invention.

For same or similar parts in the embodiments of this specification, refer to each other. Especially, the embodiments related to the network device/node or apparatus device are basically similar to the method embodiments, and therefore are described briefly. For related parts, refer to the descriptions in the method embodiments.

The foregoing implementations of this application are not intended to limit the protection scope of this application.

What is claimed is:

1. A resource sharing method, wherein the method comprises:
sending, by a first apparatus, first indication information to a second apparatus, wherein the first indication information is to indicate a frequency domain resource of a first initial bandwidth part (BWP), wherein the frequency domain resource of the first initial BWP is not shared between the first apparatus and the second apparatus, but is a part of a first candidate shared resource of the first apparatus and the second apparatus;

receiving, by the first apparatus, second indication information from the second apparatus, wherein the second indication information is to indicate a frequency domain resource of a second initial BWP, wherein the frequency domain resource of the second initial BWP is not shared between the second apparatus and the first apparatus, but is a part of the first candidate shared resource;

sending, by the first apparatus, third indication information to the second apparatus, wherein the third indication information is to indicate a time-frequency resource that is in the first candidate shared resource and that is expected by the first apparatus to be used for data transmission; and receiving, by the first apparatus, fourth indication information from the second apparatus, wherein the fourth indication information is to indicate a time-frequency resource that is in the first candidate shared resource and that is expected by the second apparatus to be used for data transmission.

2. The method according to claim 1, wherein the frequency domain resource of the first initial BWP and the frequency domain resource of the second initial BWP do not overlap.

3. The method according to claim 1, wherein the first indication information is to indicate at least one item selected from the group consisting of a frequency domain start position of the first initial BWP, a frequency domain end position of the first initial BWP, and a frequency domain width of the first initial BWP; and wherein the second indication information is to indicate at least one item selected from the group consisting of a frequency domain start position of the second initial BWP, a frequency domain end position of the second initial BWP, and a frequency domain width of the second initial BWP.

4. The method according to claim 3, wherein the frequency domain start position of the first initial BWP is determined based on a frequency domain start position of a first downlink bandwidth and an offset between the frequency domain start position of the first downlink bandwidth and the frequency domain start position of the first initial BWP, or based on a frequency domain start position of a synchronous broadcast block (SSB), an offset between the frequency domain start position of the SSB and a frequency domain start position of a first downlink bandwidth, and an offset between the frequency domain start position of the first downlink bandwidth and the frequency domain start position of the first initial BWP; and wherein the frequency domain start position of the second initial BWP is determined based on a frequency domain start position of a second downlink bandwidth and an offset between the frequency domain start position of the second downlink bandwidth and the frequency domain start position of the second initial BWP, or based on a frequency domain start position of an SSB, an offset between the frequency domain start position of the SSB and a frequency domain start position of a second downlink bandwidth, and an offset between the frequency domain start position of the second downlink bandwidth and the frequency domain start position of the second initial BWP.

5. The method according to claim 3, wherein the frequency domain width of the first initial BWP satisfies a formula:

$$RIV1 = N_{BWP1}^{size} \times (L_{RBs1} - 1) + RB_{start1}, \text{ wherein}$$

$L_{RBs1}$ is a quantity of consecutive RBs occupied by the frequency domain width of the first initial BWP, RIV1 is a first resource indication value parameter, $RB_{start1}$ is a start resource block position of the first initial BWP, and $N_{BWP1}^{size}$ represents a quantity of first resource blocks RBs; and the frequency domain width of the second initial BWP satisfies a formula:

$$RIV2 = N_{BWP2}^{size} \times (L_{RBs2} - 1) + RB_{start2}, \text{ wherein}$$

$L_{RBs2}$ is a quantity of consecutive RBs occupied by the frequency domain width of the second initial BWP, RIV2 is a second resource indication value parameter, $RB_{start2}$ is a start resource block position of the second initial BWP, and $N_{BWP2}^{size}$ represents a quantity of second RBs.

6. The method according to claim 1, wherein the time-frequency resource that is expected by the first apparatus to be used for data transmission and that is indicated by the third indication information does not comprise the frequency domain resource of the first initial BWP and the frequency domain resource of the second initial BWP.

7. The method according to claim 1, wherein the third indication information comprises a first field and a second field;

wherein the first field is to indicate a resource type of the time-frequency resource that is expected by the first apparatus to be used for data transmission, wherein the resource type comprises at least one type selected from the group consisting of an uplink UL resource type, a supplementary uplink SUL resource type, and a downlink DL resource type; and wherein the second field is to indicate a position of a time-frequency resource corresponding to each resource type.

8. The method according to claim 7, wherein the third indication information further comprises a third field, and the third field is used to indicate an effective moment of a time-frequency resource that is in the second field and that is expected to be used for data transmission.

9. The method according to claim 7, wherein the second field further comprises a fourth field, wherein the fourth field is to indicate whether the position of the time-frequency resource corresponding to each resource type changes; and when the fourth field indicates that the position changes, the second field further comprises a fifth field, wherein the fifth field is to indicate a position that is of a time-frequency resource that is expected to be used for data transmission and that is obtained after the position changes.

10. The method according to claim 1, wherein the sending, by a first apparatus, of the first indication information to the second apparatus and the sending, by the first apparatus, of the third indication information to the second apparatus comprise:

sending, by the first apparatus, the first indication information and the third indication information to the second apparatus by using a first request message.

11. A first apparatus, comprising:
at least one processor; and
a memory coupled to the at least one processor and having program instructions stored thereon which, when executed by the at least one processor, cause the apparatus to:
send first indication information to a second apparatus, wherein the first indication information is to indicate a frequency domain resource of a first initial bandwidth part BWP, wherein the frequency domain resource of the first initial BWP is not shared between the first apparatus and the second apparatus, but is a part of a first candidate shared resource of the first apparatus and the second apparatus;
receive second indication information from the second apparatus, wherein the second indication information is to indicate a frequency domain resource of a second initial BWP, wherein the frequency domain resource of the second initial BWP is not shared between the second apparatus and the first apparatus, but is a part of the first candidate shared resource;
send third indication information to the second apparatus, wherein the third indication information is to indicate a time-frequency resource that is in the first candidate shared resource and that is expected by the first apparatus to be used for data transmission; and
receive fourth indication information from the second apparatus, wherein the fourth indication information is to indicate a time-frequency resource that is in the first candidate shared resource and that is expected by the second apparatus to be used for data transmission.

12. The apparatus according to claim 11, wherein the frequency domain resource of the first initial BWP and the frequency domain resource of the second initial BWP do not overlap.

13. The apparatus according to claim 11, wherein
the first indication information is to indicate at least one item selected from the group consisting of a frequency domain start position of the first initial BWP, a frequency domain end position of the first initial BWP, and a frequency domain width of the first initial BWP; and
wherein the second indication information is to indicate at least one item selected from the group consisting of a frequency domain start position of the second initial BWP, a frequency domain end position of the second initial BWP, and a frequency domain width of the second initial BWP.

14. The apparatus according to claim 13, wherein the program instructions further cause the apparatus to:
determine the frequency domain start position of the first initial BWP based on a start position of a first downlink bandwidth and an offset between a frequency domain start position of the first downlink bandwidth and the frequency domain start position of the first initial BWP, or based on a frequency domain start position of a synchronous broadcast block SSB, an offset between the frequency domain start position of the SSB and a frequency domain start position of a first downlink bandwidth, and an offset between the frequency domain start position of the first downlink bandwidth and the frequency domain start position of the first initial BWP; and
determine the frequency domain start position of the second initial BWP based on a frequency domain start position of a second downlink bandwidth and an offset between the frequency domain start position of the second downlink bandwidth and the frequency domain start position of the second initial BWP, or based on a frequency domain start position of an SSB, an offset between the frequency domain start position of the SSB and a frequency domain start position of a second downlink bandwidth, and an offset between the frequency domain start position of the second downlink bandwidth and the frequency domain start position of the second initial BWP.

15. The apparatus according to claim 13, wherein
the frequency domain width of the first initial BWP satisfies a formula:

$RIV1 = N_{BWP1}^{size} \times (L_{RBs1} - 1) + RB_{start1}$, wherein $L_{RBs1}$ is a quantity of consecutive RBs occupied by the frequency domain width of the first initial BWP, RIV1 is a first resource indication value parameter, $RB_{start1}$ is a start resource block position of the first initial BWP, and $N_{BWP1}^{size}$ represents a quantity of first resource blocks RBs; and the frequency domain width of the second initial BWP satisfies a formula:

$RIV2 = N_{BWP2}^{size} \times (L_{RBs2} - 1) + RB_{start2}$, wherein $L_{RBs2}$ is a quantity of consecutive RBs occupied by the frequency domain width of the second initial BWP, RIV2 is a second resource indication value parameter, $RB_{start2}$ is a start resource block position of the second initial BWP, and $N_{BWP2}^{size}$ represents a quantity of second RBs.

16. The apparatus according to claim 11, wherein the time-frequency resource that is expected by the first apparatus to be used for data transmission and that is indicated by the third indication information does not comprise the frequency domain resource of the first initial BWP and the frequency domain resource of the second initial BWP.

17. The apparatus according to claim 11, wherein the third indication information comprises a first field and a second field;
wherein the first field is to indicate a resource type of the time-frequency resource that is expected by the first apparatus to be used for data transmission, wherein the resource type comprises at least one type selected from the group consisting of an uplink UL resource type, a supplementary uplink SUL resource type, and a downlink DL resource type; and
wherein the second field is to indicate a position of a time-frequency resource corresponding to each resource type.

18. The apparatus according to claim 17, wherein the third indication information further comprises a third field, wherein the third field is to indicate an effective moment of a time-frequency resource that is in the second field and that is expected to be used for data transmission.

19. The apparatus according to claim 17, wherein the second field further comprises a fourth field, and the fourth field is to indicate whether the position of the time-frequency resource corresponding to each resource type changes; and
wherein the program instructions cause the apparatus to:
when the fourth field indicates that the position changes, send a fifth field by using the second field, wherein the fifth field is to indicate a position that is of the time-frequency resource that is expected to be used for data transmission and that is obtained after the position changes.

20. A non-transitory computer-readable storage medium storing programming instructions for execution by at least one processor, wherein the programming instructions, when executed, cause the at least one processor to:
- send first indication information to a second apparatus, wherein the first indication information is to indicate a frequency domain resource of a first initial bandwidth part (BWP), wherein the frequency domain resource of the first initial BWP is not shared between the first apparatus and the second apparatus, but is a part of a first candidate shared resource of the first apparatus and the second apparatus;
- receive second indication information from the second apparatus, wherein the second indication information is to indicate a frequency domain resource of a second initial BWP, wherein the frequency domain resource of the second initial BWP is not shared between the second apparatus and the first apparatus, but is a part of the first candidate shared resource;
- send third indication information to the second apparatus, wherein the third indication information is to indicate a time-frequency resource that is in the first candidate shared resource and that is expected by the first apparatus to be used for data transmission; and
- receive fourth indication information from the second apparatus, wherein the fourth indication information is to indicate a time-frequency resource that is in the first candidate shared resource and that is expected by the second apparatus to be used for data transmission.

* * * * *

UNITED STATES PATENT AND TRADEMARK OFFICE
CERTIFICATE OF CORRECTION

PATENT NO. : 12,114,300 B2  
APPLICATION NO. : 17/680696  
DATED : October 8, 2024  
INVENTOR(S) : Haifeng Yu, Bo Lin and Kun Yang Page 1 of 1

It is certified that error appears in the above-identified patent and that said Letters Patent is hereby corrected as shown below:

In the Claims

In Claim 5, Column 52, Line 7, delete "RIV1=$N_{BWP1}^{size}$×($L_{RBs1}$–1)+RB$_{start}$, wherein" and insert -- $RIV1 = N_{BWP1}^{size} \times (L_{RBs1} - 1) + RB_{start1}$, wherein--.

In Claim 15, Column 54, Line 13, delete "RIV1=$N_{BWP1}^{size}$×($L_{RBs1}$–1)+RB$_{start}$, wherein" and insert -- $RIV1 = N_{BWP1}^{size} \times (L_{RBs1} - 1) + RB_{start1}$, wherein--.

Signed and Sealed this  
Twenty-eighth Day of January, 2025

Coke Morgan Stewart  
*Acting Director of the United States Patent and Trademark Office*